United States Patent [19]
Andrews et al.

[11] Patent Number: 4,623,244
[45] Date of Patent: Nov. 18, 1986

[54] COPY PRODUCTION MACHINES

[75] Inventors: Donald R. Andrews; Roger E. Kuseski, both of Longmont; Terence Travis, Boulder, all of Colo.

[73] Assignee: International Business Machines Corporation, Armonk, N.Y.

[21] Appl. No.: 768,651

[22] Filed: Feb. 14, 1977

Related U.S. Application Data

[63] Continuation-in-part of Ser. No. 729,534, Oct. 4, 1976, abandoned.

[51] Int. Cl.[4] .................... G03B 27/32

[52] U.S. Cl. .................... 355/24; 355/3 R; 355/14 R; 355/46

[58] Field of Search .................... 355/14, 23-26, 355/3 R, 77, 46; 364/200 MS File, 900 MS File

[56] References Cited

U.S. PATENT DOCUMENTS

| | | | |
|---|---|---|---|
| 3,397,628 | 8/1968 | Granzow et al. | 355/8 |
| 3,597,071 | 8/1971 | Jones | 355/3 |
| 3,681,527 | 8/1972 | Nishiyama et al. | 358/294 |
| 3,684,279 | 8/1972 | Heimlicher | 271/64 |
| 3,848,995 | 11/1974 | Gauronski | 355/26 |
| 3,978,454 | 8/1976 | Willard | 340/172.5 |
| 4,042,962 | 8/1977 | Yamaji et al. | 358/300 |
| 4,099,860 | 7/1978 | Connin | 355/14 |

FOREIGN PATENT DOCUMENTS

| | | |
|---|---|---|
| 2426500 | 12/1975 | Fed. Rep. of Germany . |
| 52-20833 | 2/1977 | Japan . |

OTHER PUBLICATIONS

IBM Technical Disclosure Bulletin, vol. 19, No. 3, Aug. 1976, "Laser Copier/Printer", G. T. Williams, p. 806.

IBM Technical Disclosure Bulletin, vol. 19, No. 4, Sep. 1976, "Laser Erase"; C. E. Branham et al, pp. 1396-1397.

*Primary Examiner*—L. T. Hix
*Assistant Examiner*—David M. Gray
*Attorney, Agent, or Firm*—Herbert F. Somermeyer; Carl M. Wright

[57] ABSTRACT

Copy production machine having a print mode for making copies under automatic control interruptible by a copy mode of making copies. In the print mode images to be copied are automatically supplied to a copy production portion. In the copy mode, a variety of image supplying techniques may be employed. Copy output means separate copies made from the two modes. In the print mode images are preferably precollated whereas in the copy, mode produced copies are collated. In a print mode plural image sources may be employed, such sources being activated ad seriatim.

165 Claims, 17 Drawing Figures

| INSTR | SEQ 1 CL | SEQ 1 ALU | SEQ 2 CL | SEQ 2 ALU | SEQ 3 CL | SEQ 3 ALU | SEQ 4 CL | SEQ 4 ALU | SEQ 5 CL | SEQ 5 ALU | SEQ 6 CL | SEQ 6 ALU |
|---|---|---|---|---|---|---|---|---|---|---|---|---|
| AR SR LR | IBL | M | (TB⇒IB) IRH | M X | PCI | M NOTE 4 | (TERM) | NOTE 4 | | | | |
| LRE LRD | IBL | M | (TB⇒IB) IRH | M X | PCI | M NOTE 5 | WRT IRL | NOTE 5 | WRT IRH | TBNS (XX→DB) ACH + DO | (TERM) | TBNS |
| STR | PCI | M | (TB⇒IB) WRT IRH | X (X→DB) ACH→DO | WRT IRL | ACL→DO | (TERM) | TBNS | | | | |
| AI SI | PCI | M | PCI | M NOTE 1 | (TERM) | NOTE 5 | | | | | | |
| CI GPI [LI XI OI NI] | PCI | M ← PREVIOUS INSTRUCTION → | PCI | M ACL x TB → DO → [ACL] | (TERM) | X | | | | | | |
| CB [AB SB LB XB OB NB] | PCI | M | TB | M (ACL→DO) | (TB⇒IB) PCI | X | (TERM) | ACL : TB → DO → [ACL] | | | | |
| STB | PCI | M | WRT TB | ACL→DO | (TB⇒IB) PCI | X | (TERM) | X | | | | |
| AI SI SHL SHR | PCNI | M | (TB⇒IB) PCI | M NOTE 2 | (TERM) | NOTE 2 | | | | | | |
| TRA | PCI | M | (TERM) | NOTE 3 | | | | | | | | |
| CLA [IC] | PCI | M CL AC SET IC | (TERM) | X COT* → EQ | | | | | | | | |
| TBP [TBR] | PCI | M | (TERM) | ACL M → DO → [ALL] | | | | | | | | |
| POR (IJD) | | | | | | | TB → "CLA" POR CODE | X RST LOGIC 32 → DO | | | | |

TIME Ø2 220 Ø1 Ø2 Ø1 Ø2 Ø1 Ø2 Ø1 Ø2 Ø1 Ø2 Ø1 Ø2

NOTE 1: ACL ± TB, + DB → ACH, ACH → DO → ACL
NOTE 2: ACL MODIF → DB → ACH; ACH → DO → ACL
NOTE 3: ACL → DB → ACH; ACH → DO → ACL
NOTE 4: ACL ÷ TB → DB → ACH; ACH → DO → ACL
NOTE 5: ACL + △ → BB → ACH; ACH → DO → ACL

FIG. 5

| INSTR | SEQ 1 CL | SEQ 1 ALU | SEQ 2 CL | SEQ 2 ALU | SEQ 3 CL | SEQ 3 ALU | SEQ 4 CL | SEQ 4 ALU | SEQ 5 CL | SEQ 5 ALU | SEQ 6 CL | SEQ 6 ALU |
|---|---|---|---|---|---|---|---|---|---|---|---|---|
| BAL | PCI | ← PREVIOUS INSTRUCTION → | IB SET PCI | (ACH → DO) ACL → DB | NOTE 7 | PCL → DO | WRT IRH | PCH - 1 + CR → DO | NOTE 9 | NOTE 10 | (TERM) | SET TRA |
| RTN | IBL | | IRH | NOTE 5 | IRL + 8 | (ACH → DO) ACL → DB | NOTE 8 | NOTE 10 | PCI | NOTE 11 | (TERM) | (ACL → DO) |
| BØØ | PCNI | | NOTE 3 | PCH - 1 → [AOH] | PCI | X | (TERM) | X | | | | |
| $\overline{B\emptyset\emptyset}$ | PCI | | PCI | X | (TERM) | X | | | | | | |
| IJO | PCNI | | NOTE 4 | PCH - 1 → [ACH] | PCI | X | (TERM) | X | | | | |
| $\overline{IJO}$ | PCI | | (TERM) | X | | | | | | | | |
| BLI | IBL | | (TB → IB) IRH | NOTE 5 | PCI | (ACH → DO) ACL → DB | ACL → AOH TB → AOL | NOTE 10 | (TERM) | ITAL | | |
| BSI | IBL | | (TB → IB) IRH | NOTE 5 | PCI | (ACH → DO) ACL → DB | WRT ACL → AOH TB → AOL | NOTE 10 | (TERM) | TBNS | | |
| IN | PCI | | OUT 1st IO WRT TB | NOTE 6 | OUT 2nd IO WRT TB | ACL → DO | (TB → IB) PCI | X | (TERM) | IOD AC7* → EQ | | |
| OUT | PCI | | OUT 1st IO WRT TB | NOTE 6 | OUT 2nd IO WRT TB | ACL → DO | (TB → IB) PCI | X | (TERM) | IOD AC7* → EQ | | |
| INTERUPT 1-5 | NOTE 1 | | STR ACH WRT 4H | NOTE 5 | STR LOW AC WRT 4L | ACL → DB ACH → DO | STR OLD STAT WRT 8L | TBNS STAT → DO → ACL | HI ADD READ 12 H | TBNS PCL → DO → ACL | (TERM) | |
| INTERUPT 6-10 | NOTE 2 | ACL - 1 → DO | STR PCH WRT OH | PCH - 1 + CR → DO | NEW STAT 8H | X | NOTE 9 | NOTE 10 | PCI | UPDATE STAT | (TERM) | |

220 Ø1 Ø2 Ø1 Ø2 Ø1 Ø2 Ø1 Ø2 Ø1 Ø2 Ø1 Ø2

NOTE 1: LOW ADDRESS READ 12L
NOTE 2: STR PCL WRT OL
NOTE 3: CAL HIGH BITS; TB → AOL
NOTE 4: CAL HIGH BITS, IB → AOL
NOTE 5: ACL → DB → ACH, ACH → DO → ACL
NOTE 6: TB (MODIFIED) → DO
NOTE 7: SET IB TO "TRAP", WRITE IRL
NOTE 8: UPDATE PC, ACL → ACH, TB → ACL
NOTE 9: UPDATE PC, ACL → AOH, TB → AOL
NOTE 10: ACL → AOH, DB → ACH, ACH → DO → ACL
NOTE 11: (ACL → DO) STAT
UPDATE IF REGO GRPO

FIG. 6

COPY PRODUCTION MACHINES

This is a continuation-in-part of application Ser. No. 729,534, filed Oct. 4, 1976, now abandoned.

DOCUMENTS INCORPORATED BY REFERENCE

U.S. Pat. No. 3,898,627 shows a laser type image generator usable with the present application in the laser input (LI) portion 12B (FIG. 1A) of original input optics 12 (FIG. 1B).

Nonvolatile store NVS 19 (FIG. 1A) is preferably a magnetic disk digital data signal recorder. U.S. Pat. Nos. 3,668,658 and 3,879,757 show disk media and apparatus suitable for NVS 19. U.S. Pat. No. 3,503,060 shows recording and head control for a disk apparatus, the teachings of which may be applied to NVS 19.

U.S. Pat. No. 3,588,242 shows a convenience plain paper copier having a programmable relay controller usable in the copy production portion CPP 13 (FIG. 1B) with the understanding that the illustrated computer machine control circuits replace the programmable relay controller of U.S. Pat. No. 3,588,242.

BACKGROUND OF THE INVENTION

The present invention relates to copy production machines and more particularly to copy production machines having a plurality of modes of operation.

Ever since Gutenberg's invention of the printing press, man has continually improved and modified the processes and machines for producing image bearing copies. Today, a wide variety of copy production machines exist for producing copies under varying conditions and at diverse speeds. Many of the copy production machines are of the so-called convenience copier class wherein a relatively small number of copies are made from a given original. Other copy production machines produce a greater number of copies per original image through varying copy production processes, such as offset printing, transfer electrographic techniques, thermal techniques, noncontact printing, such as by ink jets, and impact printing.

Since the advent of power typing and utilization of magnetic memory tapes cards, as well as optical systems, a set of diverse techniques for word processing has evolved. A main thrust to word processing is to relieve the typist from repetitive typing in the same manner that copy production machines have relieved man from manual copy production. Both of such systems are commonly used independently in business and other types of offices. The functions have been treated as independent office functions. It is believed that such independent usage may not optimally use the capabilities of these apparatus.

SUMMARY OF THE INVENTION

It is an object of the present invention to combine word processing and copy production in a new and efficient manner for office systems.

A feature of the present invention is a copy production machine having a plurality of independent modes of operation. The plurality of independent modes include a print mode and a copy mode. In the print mode, original images are automatically manipulated for producing a set of image bearing copies in accordance with the original image manipulations. A second or copy mode is a less automatic mode more akin to a convenience copier operation. In this copy mode, original documents are preferably not automatically manipulated; rather, a given number of copies of one original image are produced at a time. If collation is desired, then the copies made in the copy mode are collated, as opposed to preferred precollation in the print mode. For normal operation the machine is in the print mode, wherein the print mode may operate as a succession of copy jobs. In accordance with the invention, one of the modes is interruptible during a job for performing an interleaved copy job in another mode. Preferably the print mode is interruptible by the copy mode. In the print mode, one of a plurality of image sources is selected in accordance with a given priority.

The foregoing and other objects, features, and advantages of the invention will be apparent from the following more particular description of preferred embodiments of the invention as illustrated in the accompanying drawings.

THE DRAWINGS

FIGS. 5 and 6 are charts showing the instruction execution of the pipelined processors.

DETAILED DESCRIPTION

Figure 1:
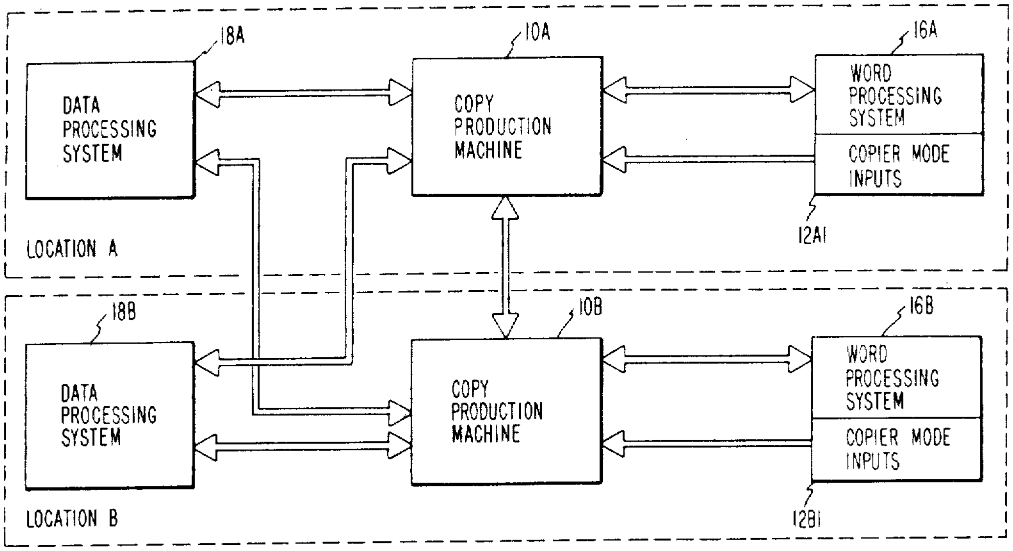
FIG. 1 is a block diagram of a system in which the present invention may be advantageously employed.

In the drawings, like numerals indicate like parts and features in the various diagrams. FIG. 1 shows communication and copy production network employs machines constructed using the present invention. Location A is physically remote from location B. Each location A and B has a copy production machine 10A and 10B, respectively, constructed in accordance with the present invention. Furthermore, each location A and B includes a word processing system 16A, 16B, respectively, copier mode input 12A1, 12B1, respectively, and data processing systems 18A and 18B, respectively. The various illustrated units are interconnected by the copy production machine which includes word processing capabilities and data processing capabilities in addition to copy production capabilities. The machines 10A and 10B can intercommunicate for transferring image indicating signals such that signals originating in machine 10A can result in copies produced in machine 10B. Similarly, copy production machines 10A and 10B also provide computer output from either of the illustrated data processing systems 18A, 18B. These machines can also receive word processing indicating signals from systems 16A and 16B as well as supply word processing indicating signals to such systems. The copier mode inputs 12A and 12B create images from original documents for the production of copies by the machines 10A and 10B, respectively. Scanners may be employed to transmit original documents using either digital or slow-scan video (analog) techniques. Accordingly, in practicing the present invention in the manufacture of copy production machines, such machines can be advantageously employed in complex image transferring communication networks as will become more readily apparent.

Figure 1A:
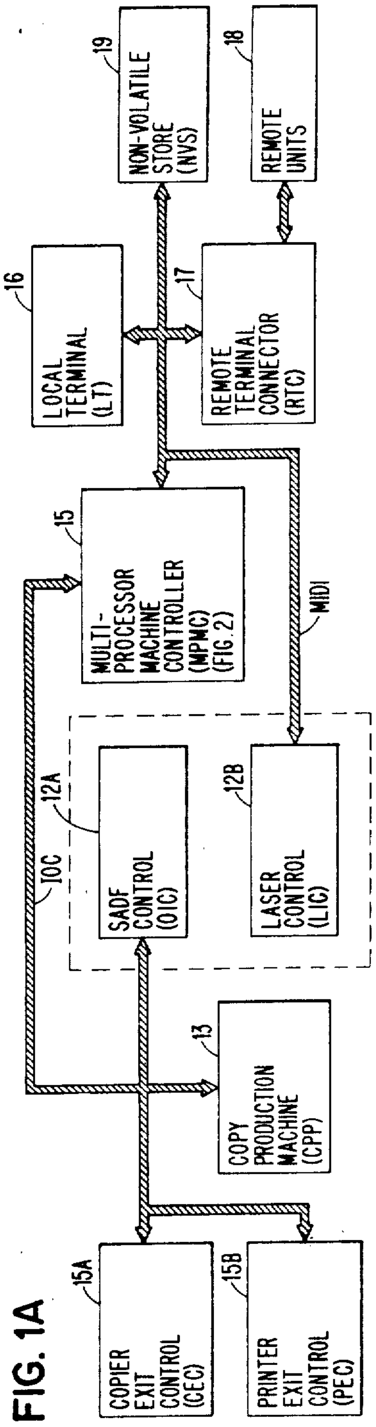
FIG. 1A is a block diagram of control circuits implementing the present invention.
Figure 1B:
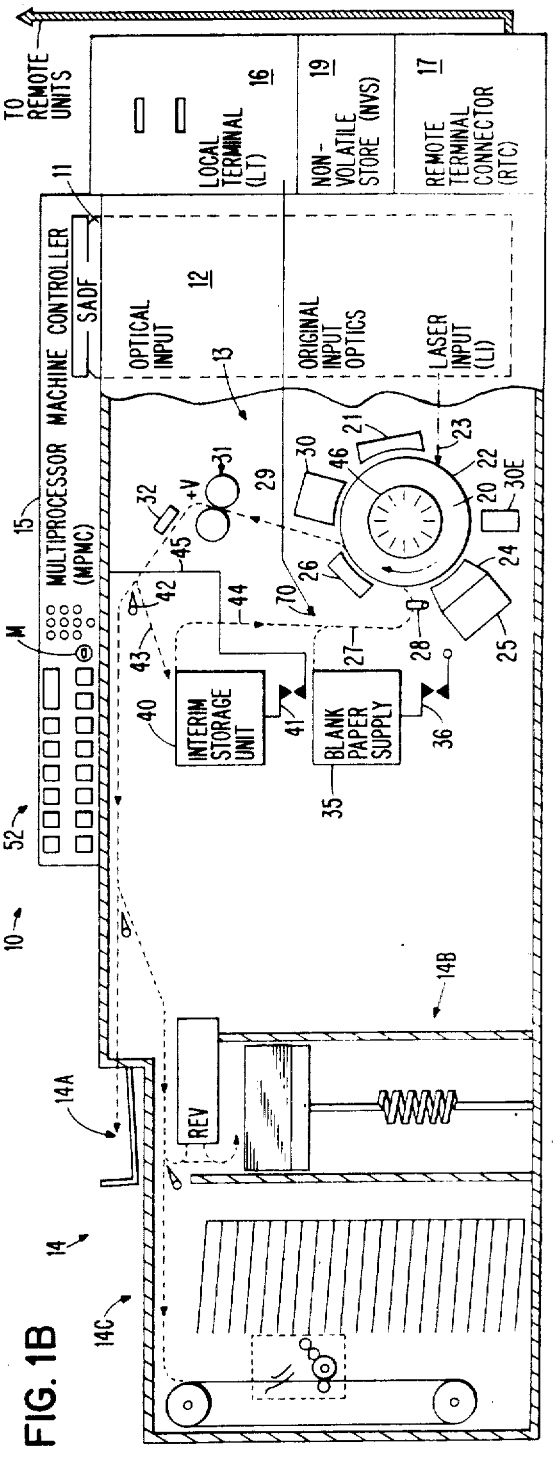
FIG. 1B is a diagrammatic showing of a machine incorporating the present invention and controlled by the FIG. 1A illustrated control circuits.

FIGS. 1A and 1B, respectively, show a copy production machine 10 constructed using the principles of the present invention and which may be advantageously employed in the FIG. 1 illustrated image communication network. The copy production machine includes a copy production portion CPP 13. CPP 13 is illustrated as a transfer electrographic copy production portion, but no limitation thereto is intended. A plurality of image inputs are provided to CPP 13. Such inputs, selectively denoted by numeral 12, include a document scannng optical input in optical communication with a semiautomatic document feed SADF 11. SADF 11 includes a document glass on which an original document may be placed either manually by lifting a SADF lid (not shown) or semiautomatically by document feed from input tray (not shown). The optical image from SADF 11 is transmitted to CPP 13 using known optical techniques commonly found in convenience copiers of several types. Additionally, original input optics 12 include a laser input LI which receives word processing indicating signals for creating an optical image as an image input to CPP 13 via common input 23. The original input optics 12 include a SADF control OIC 12A as well as a laser input control 12B.

The laser input can receive signals from a local terminal LT 6 which is a word processing terminal for receiving word processing signal-bearing magnetic cards at input slot 137 and for ejecting such cards at output slot 137A. Signals from LT 16 are temporarily stored in nonvolatile store NVS 19. Additionally, for communication in an image communication network as shown in FIG. 1, a remote terminal connector RTC 17 provides signal communication to various remote units, collectively denoted by numeral 18. In FIGS. 1A and 1B, numeral 18 indicates the remainder of the network as shown in FIG. 1. The word processing signals from LT 16 or RTC 17 are initially stored in memory 64. From memory 64 (FIG. 2)) multiprocessor machine controller MPMC 15 effects transfer of the signals to LIC 12B for generating an image to be transferred to CPP 13, as will become more readily apparent, as well as to NVS 19. In producing a first set, signals from memory 64 actuate LIC 12B. In second and higher numbered sets, signals stored in NVS 19 go to memory 64 for being supplied to LIC 12B for image generation. In one embodiment, print jobs received by RTC 17 and LT 16 are alternated. A priority scheme could be employed if desired.

Copy production machine 10 also includes a copy output portion 14 having a plurality of copy receiving units. When laser input LI 12 supplies images to CPP 13, the copies produced are directed toward output portion 14B as will be later more fully described. When SADF 11 is used as an input to optics 12, the copy production machine 10 is in what is termed a copy mode wherein the copies produced by CPP 13 are directed either to copy exit tray 14A or to copy collator 14C. The output unit 14B in a constructed embodiment was reserved for copies produced in the print mode.

MPMC 15 controls all units in copy production machine 10. The various closely controlled units such as LIC 12B, NVS 19, RTC 17, and LT 16 are controlled by a pair of later described unidirectionally busses collectively denoted by MIDI in FIG. 1A. The other units are those related to copy production and which are supervised by MPMC. Communication is by a bidirectional data bus IOC shown connected to the copier exit control CEC 15A, printer exit control PEC 15B, CPP 13, SADF control 12A. These interactions of the various units of copy production machine 10 will become apparent from a continued reading.

CPP 13

Before proceeding further with the description of the invention, the operation of CPP 13 is described as a preferred construction embodiment employing xerographic transfer electrographic techniques. Photoconductor drum member 20 rotates in the direction of the arrow past a plurality of xerographic processing stations; the first station 21 imposes either a positive or negative electrostatic charge on the surface of photoconductor member 20. It is preferred that this charge be a uniform electrostatic charge over a uniform photoconductor surface. Such charging is done in the absence of light such that projected optical images, indicated by dash line arrow 23, alter the electrostatic charge on the photoconductor member in preparation for image developing and transferring. The projected optical image from original input optics 12 exposes the photoconductor surface in area 22. Light in the projected image electrically discharges the surface areas of photoconductor member 20 in proportion to the light intensity. With minimal light reflected from the dark or printed areas of an original document, for example, there is no corresponding electrical discharge. As a result, an electrostatic charge remains in those areas of the photoconductive surface of member 20 corresponding to the dark or printed areas of an original document in SADF 11 (semiautomatic document feed) or of the image created. This charge pattern is termed a "latent" image on the photoconductive surface. Interimage erase lamp 30E discharges photoconductor member 20 outside defined image areas.

The next xerographic station is developer 24 which receives toner (ink) from toner supply 25 for being deposited and electrostatically on the photoconductive surface still having an electrical charge. The developer station receives the toner with an electrostatic charge of polarity opposite to that of the charged areas of the photoconductive surface. Accordingly, the toner particles adhere electrostatically to the charged areas, but do not adhere to the discharge areas. Hence, the photoconductive surface, after leaving station 24, has a toned image corresponding to the dark and light areas of an original document in SADF 11 or of the image supplied by LI laser input.

Next, the toner is transferred to copy paper in transfer station 26. The paper is brought to the station 26 from an input paper path portion 27 via synchronizing input gate 28. In station 26, the copy paper is charged and brought into contact with the toned image on the photoconductive surface which will result in a transfer of the toner to the copy paper. After such transfer, the sheet of image bearing copy paper is stripped from the photoconductive surface for transport along path 29. Next, the paper has the electrostatically carried image fused thereon in fusing station 31 for creating a permanent image on the copy paper. The copy paper receives electrostatic charges in station 26 which can have an adverse effect on copy handling. Accordingly, the copy paper is electrically discharged at station 32 before transfer to output portion 14.

After the image area on member 20 leaves transfer station 26, there is a certain amount of residual toner on the photoconductive surface. Accordingly, cleaner station 30 has a rotating cleaning brush (not shown) to remove the residual toner for cleaning the image area in preparation for receiving the next image projected by original input optics 12. The cycle then repeats by charging the just-cleaned image area by charging station 21.

The production of simplex copies or the first side of duplex copies by portion 13 includes transferring a blank sheet of paper from blank paper supply 35, to transfer station 26, then to fuser 31, and, when in the simplex mode, directly to the output copy portion 14. Blank paper supply 35 has an empty sensing switch 36 which inhibits operation of portion 13 in a known manner whenever supply 35 is out of paper.

When in the duplex mode, duplex diversion gate 42 is actuated by the duplex controlling circuits (not shown) to the upward position for deflecting single-image copies to travel over path 43 to the interim storage unit 40. These duplex controlling circuits (not shown) are actuated by MPMC 15. The partially produced duplex copies (image on one side only) are stored in the interim storage unit 40 until the next single-image run during which the copies receive the second image. The copies residing in interim storage unit 40 in an intermediate copy production state.

During the aforesaid next single-image run, initiated by inserting a document into SADF 11 or by MPMC 15, the copies are removed one at a time from the interim storage unit 40, transported over path 44, to path 27 for receiving a second image as previously described. The two-image duplex copies are then transferred into output copy portion 14. Switch 41 of interim storage unit 40 detects whether there are any copies or paper in interim storage unit 40. If so, an intermediate copy production state signal is supplied over line 45 to later described control circuits.

The copy production machine has a control panel 52, including a plurality of lights and switches (most not shown), connected to MPMC 15 for operating the entire machine 10 synchronously with respect to the movement of the image areas of photoconductor member 20. Billing meter M counts images processed for billing purposes. For example, paper release gate 28 is actuated synchronously with the image areas moving past developer station 24. Such controls are well known in the art and are not described here for purposes of brevity.

MPMC 15

Figure 2:
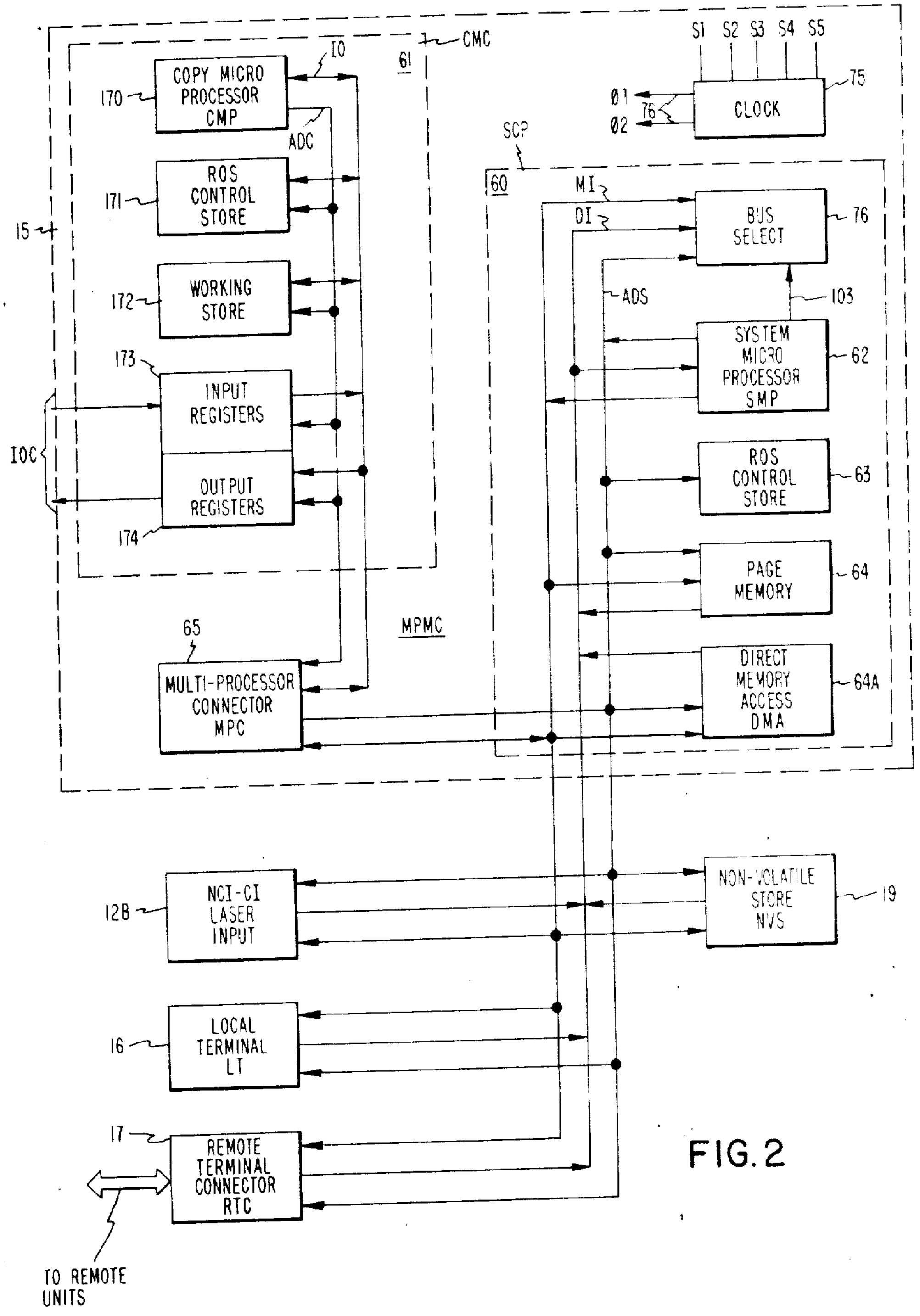
FIG. 2 is a block diagram of a multiprocessor machine controller used in the FIG. 1A control circuits.

The multiprocessor machine controller MPMC 15 is shown in block diagram form in FIG. 2. MPMC 15 includes a production machine controlling subsystem SCP 60 and a copy production machine controlling subsystem CMC 61. SCP 60 includes a system microprocessor SMP 62 which executes a set of control programs contained in control store 63 (either ROS or RAM or a combination of both) and uses page memory 64 as a main or working store. SMP 62 communicates with the other units in SCP 60 as well as peripheral units as later discussed, via a set of three unidirectional data transfer busses. The bus DI transfers data signals from the other units to SMP 62. In a preferred constructed embodiment, DI was eight bits wide (one character) plus parity, signals emanating from SMP 62 were carried over bus MI to all of the other units. Address signals for selecting which units send or receive signals with respect to SMP 62, as well as the other units, are provided by SMP 62 over sixteen bit wide address bus ADS. The above-described bus interconnections also provide signal communication between SCP 60 and the nonvolatile store 19, laser input 12B, local terminal LT 16, remote terminal connector RTC 17, and CMC 61 via multiprocessor connector MPC 65.

CMC 61 is constructed similar to SCP 60. It includes a copy microprocessor CMP 170 plus a control store 171 containing programs for operating CPP 13, a working store 172 for use as a main memory, and input/output registers 173, 174. Signal communication between these units is via a bidirectional eight bit data bus I/O under addressing control from CMP 70 via sixteen bit address bus ADC. CMP 170 supplies address signals over bus ADC for selecting the source and destination of signals with respect to CMP 170. Such selection includes an address to multiprocessor connector MPC 65. The I/O bus is preferably a character wide (eight bits) while ADC is preferably two characters wide or sixteen bits. CMC 61 via MDC 65 appears as an I/O device to the SCP 60 in the same manner as units 19, 12B, 16, and 17 appear as I/O devices. Processor intercommunication via MPC 65 requires a plurality of memory cycles in both SCP 60 and CMC 61. A clock 75 times SCP 60 and CMC 61 on a memory cycle synchronized basis. That is, page memory 64 and working store 172 have identical length memory cycles. The operation of the memories is synchronized under control of a two phase clock, phase 1, phase 2 and supplied over lines 76 to all units within MPMC 15. Timing connections are not shown for purposes of brevity. Additionally, clock 75 issues a series of S pulses, S1 through S5, for timing instruction execution of CMP 170 and SMP 62.

Additionally, it may be desired, under program control, to logically interconnect the busses MI, DI and ADS for enabling signal transfers in later described desired paths. To achieve this result, bus select circuit 76 under SMP 62 control provides communication between the various busses. For example, signals received from MPC 65 on bus MI can be transferred through bus select circuit 76 to bus DI for receipt of SMP 62. Other permutations of signal transfers via the busses can be easily envisioned.

Figure 3A:
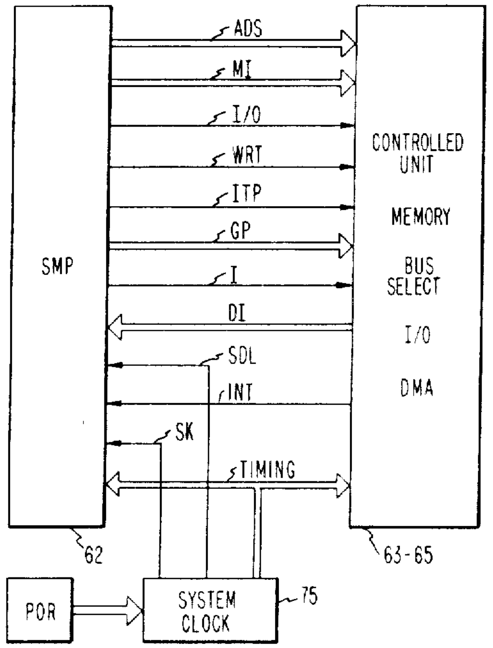
FIGS. 3A and 3B are schematic block diagrams of interconnections between a controlling digital computer and a controlled unit as connected for use in the FIG. 2 illustrated controller, respectively, for SCP 60 and CMC 61.

In FIG. 3A, the logical interconnections are shown between SMP 62 and controlled units 63–65 and so forth. All of the signals on the busses and individual control lines go to all units with the ADS and GP signals selecting which controlled unit is to respond for either receiving data signals or supplying data signals, respectively. SMP 62 supplies addressing signals over bus ADS to all units. If the instruction supplied over bus GP indicates data is to be transferred from SMP 62 to a controlled unit, the I/O line carries a binary one indicating signals are to be transferred to the microprocessor over DI or a binary zero indicating microprocessor SMP 62 supplies a signal over MI. Write line WRT indicates to the page memory that signals are to be stored in the memory. The signal ITP indicates an interrupt is in process, i.e., the microprocessor 62 program had been interrupted and is handling that interrupt. The I signal is an interrupt request. The signal SDL is received from system clock 75, and denotes data latch, which will be later explained with respect to FIG. 4. The signal SK denotes sliver-killer which is a control signal for eliminating extraneous signals commonly referred to as slivers which result in interference between successively actuated bistable circuits termed latches. Other timing signals for coordinating operation of all of the units in the MPMC 15 are received from system clock 75. Additionally, power-on reset circuit POR activates system clock 75 to send out timing signals and control signals for resetting all of the units to a reference state in a manner well known in the computer arts.

In the CMC 61 the decoding circuits and logic circuits which respond to the above-described signals are those normally used in conjunction with interconnecting controlling and controlled units. Since such circuits and design principles are well known, on further description of these details are required.

Figure 3B:
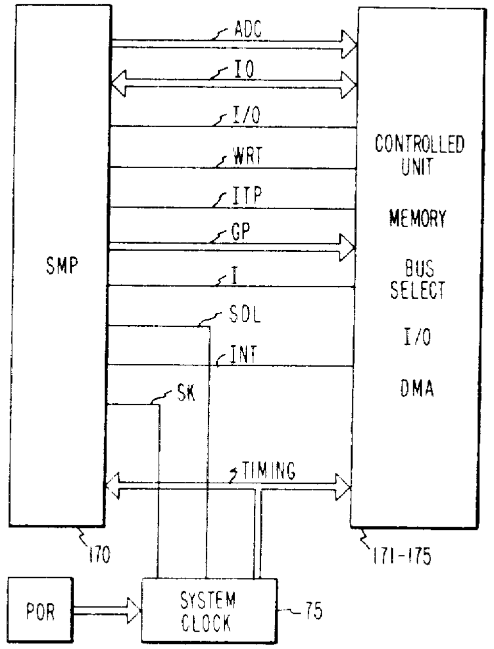

In FIG. 3B, the logical interconnections between microprocessor 170 and controlled units 171–175 are shown. The signals shown in FIG. 3B perform the same functions as those described in FIG. 3A.

The Microprocessors 62 and 170

Figure 4:
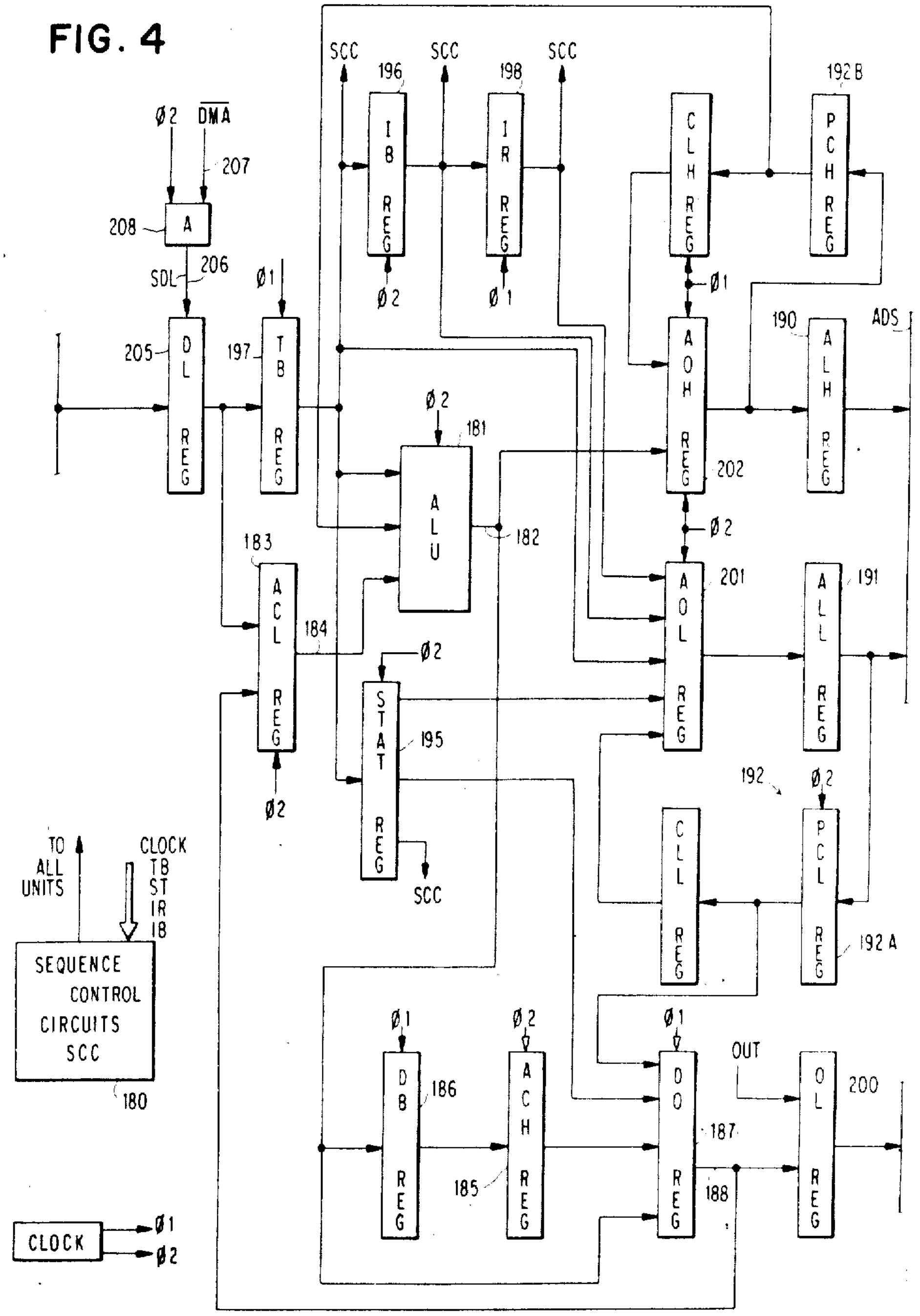
FIG. 4 is a block diagram showing a digital computer used in the FIG. 2 illustrated controller.

In FIG. 4, the data flow of the microprocessor 170 is detailed. The data flow and operation of SMP 62 are identical. The sequence control circuits 180 are those logic circuits designed to implement the now to be described functions performable in the timing context of the following description. Such sequence control circuits SCC 180 include instruction decoders, memory latches and the like, for sequencing the operation of the FIG. 6 illustrated data-flow circuits, using a two-phase clock, $\phi 1$, $\phi 2$ from clock 176. The processor contains an eight bit wide (one character wide) arithmetic and logic unit ALU 181. ALU 181 receives signals to be combined during a $\phi 2$ and supplies static output signals over ALU output bus 182 during each phase 1. Operatively associated with ALU 181 is a sixteen bit accumulator consisting of two registers, a low register ACL 183 which has its output connections over eight bit wide bus 184 as one input to ALU 181. The second register of the accumulator is ACH register 185. When the microprocessor 170 operates with a two character or two-byte word, the functions of ACL 183 and ACH 185 alternate. That is, in a first portion of the operation, which requires two complete microprocessor 170 cycles as later described, ACL 183 contains the lower order eight bits of a sixteen-bit word, and ACH 185 contains the upper eight bits of the sixteen bit word. ALU 181 first operates on the lower eight bits received over ACL bus 184 and supplies the result signals over ALU output bus 182 to DB register 186. During this transferring action, ACH 185 is supplying the upper eight bits through DO register 187, thence over DO bus 188 to ACL 183. During the next ALU cycle, the upper eight bits are operated upon. In the preferred and constructed embodiment, ALU 181 operates with two's-complement notation and can perform either eight-bit or sixteen-bit arithmetic as above described. Eight bit logical operations are also performed.

ALU 181 contains three indicating latches (not shown) which store the results of arithmetic and logical functions for use in latter processor cycles, such as conditional jumps or branches and input carry instructions. These three indicators are low, equal (EQ), and carry. Utilization of these indicators will be better understood by continued reading of the specification. Processor sequence control circuits 180 can control a single level of interrupt and includes an internal interrupt mask register (not shown) for disabling interrupts as is well known in the computer arts. The low order bits of the address signals supplied to bus ADS by the ALH register 190 (high order bits of the address) and ALL register 191 (the low order bits of the address) are designated as work registers. These registers are divided into 32 groups of 16 two-byte logical registers. A portion of ALL register 191 supplies GP signals for selecting which groups of registers are accessible by microprocessor 170.

As will be later detailed, microprocessor 170 requires two processor cycles for processing an I/O instruction. The first cycle is a set-up cycle and the second cycle is a data transfer cycle. When an I/O operation requires a transfer of a succession of bytes, then the first cycle sets up a unit 171–175 for transferring a plurality of bytes such that the I/O operation appears as a set-up cycle followed by a plurality of data transfer cycles. The microprocessor 170 is designed to operate with a plurality of relatively slow acting devices i.e., copy production machine 10. The time required for the microprocessor 170 to perform its functions is relatively short compared with the time required by the controlled devices. Accordingly, under clock 176 control, the microprocessor 170 can be effectively turned off to allow a controlled device to have exclusive use of the IO bus.

From examination of FIG. 6, it can be seen that all of the registers, being latches, will maintain their respective signal states whenever the clock phases, $\phi 1$ and $\phi 2$, are not supplied. Therefore, upon an interruption of the microprocessor 170 functioning by a controlled device 171–175, the signal state of the processor 170 enables it to begin operating again as if there had been no interruption.

The other registers in the microprocessor 170 are described with the instructions set for facilitating a better understanding of the interaction of these registers. The microprocessor employs instructions of variable length, 1, 2, or 3 bytes. The first byte of any instruction always includes the operation code; succeeding bytes, numbered 2 or 3, contain address data or immediate operand data.

The fastest instruction execution requires one microprocessor cycle and the longest instruction requires six processor cycles. An interrupt requires ten cycles to process. In all designations, bit 0 is the least significant bit.

Instruction Repertoire

The instruction repertoire is described in groups of instructions, all of which have defined instruction word formats. The instructions are defined by the title, mnemonic, number of cycles required by the microprocessor to execute the instruction, number of operands (OP), and the number of bytes in the instruction word. Additionally, breakdown of the command structure of the first byte is given.

| REGISTER ARITHMETIC | | | | |
|---|---|---|---|---|
| Instruction | Mnemonic | Cycles | OP | Bytes |
| Add | AR | 3 | 1 | 1 |
| Subtract | SR | 3 | 1 | 1 |
| Load | LR | 3 | 1 | 1 |
| Store | STR | 3 | 1 | 1 |
| Load/Decrement | LRD | 5 | 1 | 1 |
| Load/Bump | LRB | 5 | 1 | 1 |

The instruction byte is divided into two portions. The most significant four bits indicate the instruction code and the least significant four bits select a register within a group of sixteen registers as the operand source. All operations' results are stored in the accumulator register. The Register Arithmetic is two-byte arithmetic.

| BYTE ARITHMETIC | | | | |
|---|---|---|---|---|
| Instruction | Mnemonic | Cycles | OP | Bytes |
| Add | AB | 3 | 1 | 2 |
| Subtract | SB | 3 | 1 | 2 |
| Load | LB | 3 | 1 | 2 |
| Store | STB | 3 | 1 | 2 |
| Compare | CB | 3 | 1 | 2 |
| And | NB | 3 | 1 | 2 |
| Or | OB | 3 | 1 | 2 |
| Xor | XB | 3 | 1 | 2 |

The most significant byte of the instruction indicates the instruction command. The second byte indicates one of 256 byte addresses in memory to be used in the arithmetic operations. The difference between register arithmetic and byte arithmetic is that byte arithmetic obtains the operand from memory.

| IMMEDIATE ARITHMETIC | | | | |
|---|---|---|---|---|
| Instruction | Mnemonic | Cycles | OP | Bytes |
| Add | AI | 2 | 1 | 2 |
| Subtract | SI | 2 | 1 | 2 |
| Load | LI | 2 | 1 | 2 |
| Compare | CI | 2 | 1 | 2 |
| And | NI | 2 | 1 | 2 |
| Or | OI | 2 | 1 | 2 |
| Xor | XI | 2 | 1 | 2 |
| Group | GI | 2 | 3 | 2 |

The format is the same as for byte arithmetic with the second byte being the operand data. In the last instruction, Group, GI, the immediate data selects the registers in the register group as will become apparent.

| ACCUMULATOR ARITHMETIC | | | | |
|---|---|---|---|---|
| Instruction | Mnemonic | Cycles | OP | Bytes |
| Add 1 | A1 | 2 | 0 | 1 |
| Subtract 1 | S1 | 2 | 0 | 1 |
| Shift Left | SHL | 2 | 0 | 1 |
| Shift Right | SHR | 2 | 0 | 1 |
| Clear | CLA | 1 | 0 | 1 |

-continued

| ACCUMULATOR ARITHMETIC | | | | |
|---|---|---|---|---|
| Instruction | Mnemonic | Cycles | OP | Bytes |
| Transpose | TRA | 1 | 0 | 1 |
| Input Carry | IC | 1 | 0 | 1 |

All bits of byte 1 are used to denote the function to be performed. All operations are conducted within the accumulator. Transpose instruction, TRA, swaps the high and low order register contents of accumulator registers 183 and 185.

| INDIRECTS | | | | |
|---|---|---|---|---|
| Instruction | Mnemonic | Cycles | OP | Bytes |
| Store | STN | 4 | 1 | 1 |
| Load | LN | 4 | 1 | 1 |

This is an indirect addressing set of instructions wherein the most significant five bits indicate the function and the least significant three bits signify which of eight registers contain the address in memory to be accessed.

| BIT CONTROL | | | | |
|---|---|---|---|---|
| Instruction | Mnemonic | Cycles | OP | Bytes |
| Test/Preserve | TP | 1 | 1 | 1 |
| Test/Reset | TR | 1 | 1 | 1 |

The five most significant bits of the instruction byte indicate the function and the three least significant bits indicate which bit is to be tested in the accumulator register.

| INPUT/OUTPUT | | | | |
|---|---|---|---|---|
| Instruction | Mnemonic | Cycles | OP | Bytes |
| Input | IN | 4 | 1 | 2 |
| Output | OUT | 4 | 1 | 2 |

These two instructions use the first byte as a command and the second byte to address one of the 256 possible addresses on the busses, MI, DI, or IO.

| BRANCHES | | | | |
|---|---|---|---|---|
| Instruction | Mnemonic | Cycles | OP | Bytes |
| JUMP | J | 3 | 1 | 1 |
| JUMP NOT EQUAL | JNE | 3/1 | 1 | 1 |
| JUMP EQUAL | JE | 3/1 | 1 | |
| BRANCH | B | 3 | 1 | 2 |
| BRANCH NOT EQUAL | BNE | 3/2 | 1 | 2 |
| BRANCH NOT LOW | BNL | 3/2 | 1 | 2 |
| BRANCH EQUAL | BE | 3/2 | 1 | 2 |
| BRANCH HIGH | BH | 3/2 | 1 | 2 |
| BRANCH AND LINK | BAL | 6 | 2 | 3 |
| RETURN | RTN | 5 | 1 | 1 |
| INTERRUPT | — | 10 | | — |

The first three JUMP instructions are identified by the three most significant bits. A fourth bit indicates whether the four least significant bits, indicating the jump length, designate forward or backward jump.

In the BRANCH instructions, except for the BRANCH AND LINK the most significant four bits with the least significant two bits, indicate the function of the first byte. The other two bits indicate whether 256 is to be added or subtracted from the high address positions or not changed. The BRANCH AND LINK, a three byte instruction, selects one of four registers with the least significant two bits of the first byte and uses the most significant six bits as a function indicator. The other two bytes are a fifteen bit address for designating the branch address, the second byte being the eight least significant bits and the third byte being the seven most significant bits. The RETURN instruction is a one-byte instruction having a similar format as the BRANCH AND LINK command byte. The interrupt is not an instruction, but a routine activated by a signal received over interrupt request line I.

ALU CONDITION CODES

The table below indicates the condition code in the ALU low, equal (EQ), or carry set as a result of the executed class of instructions as set forth in the table below.

| Instruction Class | Low | Equal (EQ) | Carry |
|---|---|---|---|
| Register Arithmetic | 16th bit = 1 | All bits (0–15) = 0 | Carry from 16th bit |
| Byte Arithmetic | 8th bit = 1 | All bits (0–7) = 0 | Carry from 8th bit |
| Bit Control | All bits exclusive of bit being tested = 0 | Tested bit = 0 | Unchanged |
| Shift Left | All bits = 0 | 0 was shifted out of the 16th bit | 1 was shifted out of the 16th bit |
| Shift Right | All bits = 0 | 0 was shifted out of the 1st bit | 1 was shifted out of the 1st bit |
| *Logical OR | Results of OR equals all ones | Bits set by OR were all 0's | Unchanged |
| **Logical AND | Preserved bits are all ones | Result of AND equals all 0's | Unchanged |
| Logical XOR | Result all ones | Result all zeroes | Unchanged |
| Input | All bits exclusive of bit 8 = 0 | 8th bit = 0 (Data Input and Output) | Unchanged |
| Input Carry | Always Reset | Carry = 0 | Unchanged |
| Compare | Number compared is greater than the byte of accumulator | Number compared equals the contents of the low byte of accumulator | Carry from 8th bit |

*Test the set of bits (set by "OR") to be all 0's, and the result for all ones. Does TBS of individual bits. The set bits are indicated by ones in the mask (logical OR).
**Test the preserved bits to be all 0's, all ones, or mixed. The preserved bits are indicated by ones in the mask (logical AND).

A JUMP instruction does not modify the accumulator 183, 185 or indicator bits whether taken or not. The program counter has had one added to it since it addressed the JUMP instruction. The program counter 192 includes PCL register 192A and PCH register 192B, hereinafter referred to as counter 192. If a jump is taken, the least significant four bits of the instruction replace the least significant four bits of the program counter 192 and the most significant eleven bits are modified if indicated. The range of the instruction address change is −15 to +17 bytes measured from the JUMP instruction address. If the destination is within this range, it is only necessary to specify the least significant four bits absolutely of the destination address and to use a bit to describe the direction (0 for +2 to +17 or 1 for −15 to +0, the +1 condition is not realizable). The +1 condition is not useful because the processor goes to +1 if the jump is not taken. Therefore, if it were valid, the processor would go to +1 if the jump was taken or not.

In a BRANCH instruction, the program counter 192 has been incremented to point to the second byte of the branch instruction word. The least significant eight bits absolute of the destination program address are coded in the data byte (second byte). A code to modify the most significant seven bits of the program counter is coded into the instruction byte to leave the high 8 bits the same, to add one to the most significant eight bits, or to subtract one from the most significant byte (plus 256 or minus 256).

BRANCH ON EQUAL and BRANCH ON NOT EQUAL test only the condition of the ALU 181 EQ indicator. BRANCH ON NOT LOW tests only the condition of the low indicator.

BRANCH ON HIGH requires that both the EQ and low indicators be in the reset condition.

The BRANCH AND LINK instruction is an unconditional branch that specifies the fifteen bit absolute branch address of the program destination and a two-bit number indicating a register to be used. The address of the next executable instruction (following the BAL) is stored in the register specified by the two-bit number.

INTERRUPT is not a programmable instruction but is executed whenever the Interrupt Request line INT is activated by an external device and an interrupt mask in STAT register 195 is equal to zero. INTERRUPT stops the execution of the program between instructions, reads the new status (register group, interrupt mask, EQ, LOW, CARRY) from the high byte of REGISTER 8, stores the old status in the low byte of REGISTER 8, stores the address of the next instruction to be performed in REGISTER 0, stores the accumulator in REGISTER 4 (without altering the accumulator), and branches to the address specified by the contents of REGISTER 12. The processor always specifies REGISTER GROUP 0 for interrupt. Interrupt requires ten processor cycles to complete. Register groups will be later described.

RETURN is an unconditional branch to a variable address stored in a register specified by the instruction and can be used in conjunction with the BRANCH AND LINK to return to the main program after having been interrupted. Two bytes are read from the specified register to define the absolute branch address. A RETURN using register 0 or register group 0 is defined as a return from interrupt. In this case, the new status (EQ, LOW, CARRY, interrupt mask and register group) is read from the low order byte of REGISTER 8.

Arithmetic Group instructions operate with the sixteen bit accumulator 183, 185 and eight bit arithmetic-logic unit ALU 181 that are capable of performing various arithmetic and logical operations. Three condition indicators (LOW, EQ, CARRY) are set according to the results of some operations. Two's-complement sixteen bit arithmetic is performed except for byte operations and some immediate operations which are two's-complement eight bit operations. The high order bit is the sign bit; negative numbers are indicated by a one in the sign bit position. Subtraction is accomplished by two's -complement addition. Any arithmetic operation that results in a CARRY will set the CARRY latch even though the accumulator may not be changed.

Double Byte Arithmetic is performed with registers 0–15 of the current group for the Add, Subtract, Load and Store instructions. Load Register and Bump (add +1) uses registers 4–7 and registers 12–15. Load Register and Decrement uses registers 0–3 and registers 8–11. In the add register and subtract register instructions, Ar and SR, the sixteen bits of the addressed or specified register are added to or subtracted from the accumulator and the result is placed in the accumulator. EQ is set if the result is all zeroes. Low is set if the high order bit is a one.

Load Register instruction LR loads sixteen bit signal contents from the specified register into the accumulator 183, 185. The contents of the addressed register are unchanged. The ALU 181 indicators are not altered. The Store Register instruction, STR, stores the sixteen bit contents from the accumulator 183, 185 into the specified register. The contents of the accumulator 183, 185 and the ALU 181 indicators are not altered.

In the Load Register and Bump, LRB, and Load Register and Decrement, LRD, instructions, an absolute one is added to or subtracted from the contents of the specified register, respectively. The result is placed in the accumulator 183, 185 and the specified register. The indicators are updated as for an add or subtract, AR and SR.

For the Byte Arithmetic instructions, bytes 0–511 of memory 64 are addressable by the Byte Arithmetic instructions. The directly addressable memory 172 is divided into sections: bytes 0–255 which are addressable when register groups 0–7 are selected, and bytes 256–511 which are addressable when register groups 8–15 are selected. Bytes 512–767 and 768–1023 are two additional groups. This sectioning yields 32 register groups in memory from which the processor operates.

In the instructions AB, SB, CB, LB and STB, the eight bit contents of the specified byte are added to, subtracted from, compared with, loaded into, or stored from the accumulator register ACL 183, respectively. The high order byte of the accumulator in ACH register 185 is not disturbed. The ALU 181 condition indicators are set on the result of the single byte arithmetic; add, subtract, and compare. The results of all of the byte operations except compare CB and store STB are placed in the accumulator register 183. Store alters the specified byte in the active byte group. Compare is a subtract operation that does not alter the contents of the accumulator 183, 185. Byte arithmetic is eight bit signed arithmetic.

In the byte NB, OB and XB instructions, the specified byte is logically ANDed, ORed, or EXCLUSIVE-ORed with the accumulator register 183 contents, respectively. The result is kept in the accumulator register 183. The EQ ALU 81 indicator is set:

for the AND operation if the result of the AND equals all 0's;

for the OR operation if the bits set by the OR were all 0's; and for the EXCLUSIVE-OR operation if there is identity between the byte and accumulator (result=all 0's). The LOW indicator is set:

for the AND operation if the preserved bits are all 1's; and for the EXCLUSIVE-OR operation if the byte and accumulator are bit for bit opposites (result=all 1's). The logical AND can test the selected mask to be all zeroes, all ones or mixed. The selected mask bits are indicated by ones in the corresponding positions of the byte used as the mask. The logical AND tests the bits that are preserved, and the logical OR tests the bits that are then set to one in the result. If only one bit is selected, then the logical OR does a test bit and set.

The Immediate Arithmetic instructions AI, SI, CI, LI, NI, OI and XI are the same as the byte operations except that eight bits of immediate data are used instead of the contents of an addressed byte and the Add and Subtract operations are sixteen bit signed arithmetic rather than eight bit signed.

The Group Immediate instruction GI takes eight bits of immediate data to alter the contents of the status indicator register 195 to select register groups and to enable or to inhibit interrupt. LOW, EQ, and CARRY condition indicators in ALU 181 are not altered. The immediate data (byte two) is divided into five parts. BITS 0–3 are the new register group bits (new register group is coded in binary). BIT 5 is the command bit to put BITS 0–3 into the internal register group buffer if the command bit is a zero. BIT 7 is the new interrupt mask (a one masks out interrupts). BIT 6 is the command bit to put BIT 7 into the internal interrupt mask if the command bit is a zero.

The accumulator arithmetic instructions A1 and S1, respectively add or subtract an absolute one to or from the contents of the accumulator 183, 185, and the result is left in the accumulator 183, 185. This is sixteen bit signed arithmetic and the ALU 181 condition indicators are set depending on the result.

The accumulator instructions SHL and SHR shift the signal contents of the accumulator 183, 185 left or right one digit position or binary place, respectively. For shift left, the high order bit is shifted into the CARRY latch (not shown) in ALU 181 and a zero is shifted into the low order bit except when the previous instruction was an input CARRY. After an input CARRY, the CARRY latch condition before the shift is shifted into the low order bit. For shift right, the low order bit is shifted into the CARRY latch, and the state of the high order bit is maintained. When SHIFT RIGHT is preceded by input CARRY, the state of the CARRY latch before the shift is shifted into accumulator 183, 185 BIT 15. EQ condition indicator of ALU 181 is set if a 0 is shifted to the carry latch. LOW condition indicator of ALu 181 is set if the resulting contents of the accumulator 183, 185 is all zeros.

The accumulator instruction, CLA, clears the accumulator 183, 185 to all zeros. Transpose, TRA, exchanges the low order register 183 with the high order byte register 185 signal contents. The ALU 181 indicators are unchanged.

The accumulator instruction IC transfers the signal state of the CARRY latch to the low order bit of the arithmetic-logic unit 181 on the next following instruction if the next instruction is an add, subtract, bump, decrement, shift left, or compare operation. CARRY is set into to BIT 15 on a shift right instruction. Interrupt is inhibited by this instruction until the next instruction is performed. The ALU 181 low indicator is reset and the EQ indicator is set if the carry latch is a 0. If the input carry precedes any instruction other than the ones mentioned above, it will have no effect on instruction execution. If the instruction following the input carry changes the ALU 181 condition indicators, then the indicator information from the input carry is destroyed.

The two Indirect Data Transfer instructions STN and LN can access registers 8-15. Load Indirectly instruction accesses the specified register and uses its contents as an address to fetch a byte of data and load it into the low eight bits (register 183) of the accumulator without disturbing the high order eight bits (register 185). Store Indirectly accesses the specified register and uses its contents as an address to store thelow order eight bits of the accumulator register 183 into the specified byte. The ALU 181 indicators are not altered.

The Bit Test or control instructions, TR and TP, test the specified bit of the low order byte of the accumulator register 183. The ALU 181 condition indicator EQ is set if the bit is a 0. Concurrently, the bit is either reset or preserved in the accumulator, respectively.

The Input/Output instructions, IN, OUT and respectively, transfer data to the accumulator register 183 from an I/O device (CPP 13, for example) and from the accumulator to an I/O device (CPP 13, for example). These instructions are two cycle operations. The first cycle puts the modified device code on the data out lines, and the second cycle is the actual data transfer cycle; the low order eight bits of the accumulator register 183 are gated to data in lines, and the device code is gated to the address lines ADC. An OUT instruction does not change the ALU 181 indicators. On an IN instruction, EQ is set if the high order bit of the data inputted is a 0. LOW is always reset. The Input/Output instructions can specify one of 256 possible devices each for data transfer. Generally, an I/O device will require more than one device address to specify different types of operations such as READ and TEST STATUS, etc.

A Power On Reset POR initialization places the processor in the following state:

Accumulator = $\phi$
Register Group = $\phi$
Interrupt Mask = 1
LOW, EQ, CARRY = X (unknown)

The microprocessor 170 will begin operation by reading memory location 65,533.

MICROPROCESSOR INSTRUCTION EXECUTION

The processor 170 is pipelined to allow the memory 172 a full processor cycle for access time. To do this, the microprocessor 170 requests a read from memory several cycles before it needs a data byte. Several restrictions are maintained throughout the instruction set.

1. Each instruction must fetch the same number of bytes as it uses.

2. Each instruction must leave the microprocessor with the next instruction in the INSTRUCTION BUFFER, IB register 196.

3. At "Phase Two Time" at the beginning of Sequence Two, as later described, the TEMPORARY BUFFER (TB) 197 must contain the byte following the current instruction. (Note that this byte was fetched by the previous instruction.)

4. Each instruction decodes "TERM" (Terminate) as later described, which resets the instruction sequence counter (not shown) in clock 176 for CMP 176 and a separate sequence clock (not shown) for CMP 170 to Sequence one, allows the next fetch to be done from the IB 196 and loads the next instruction into IR 198.

5. At "Phase Two Time" at the beginning of instruction Sequence Two, the low accumulator register 183 and the high accumulator register 18 must contain the appropriate signals. (Note that the previous instruction may have had other data in these registers during its execution.)

Microprocessor 170 is built exclusively of latch logic. $\phi$2 signals are the output of latches (or static decodes using the output of latches) that are strobed (sampled or transferred by a clock signal called a strobe) at $\phi$2 time. $\phi$1 signals are the outputs of latches (or static decodes using the outputs of latches) that are strobed at $\phi$1 time. $\phi$1 signals are used as the inputs to $\phi$2 latches and $\phi$2 signals are used as the inputs to $\phi$1 latches.

Figure 7:
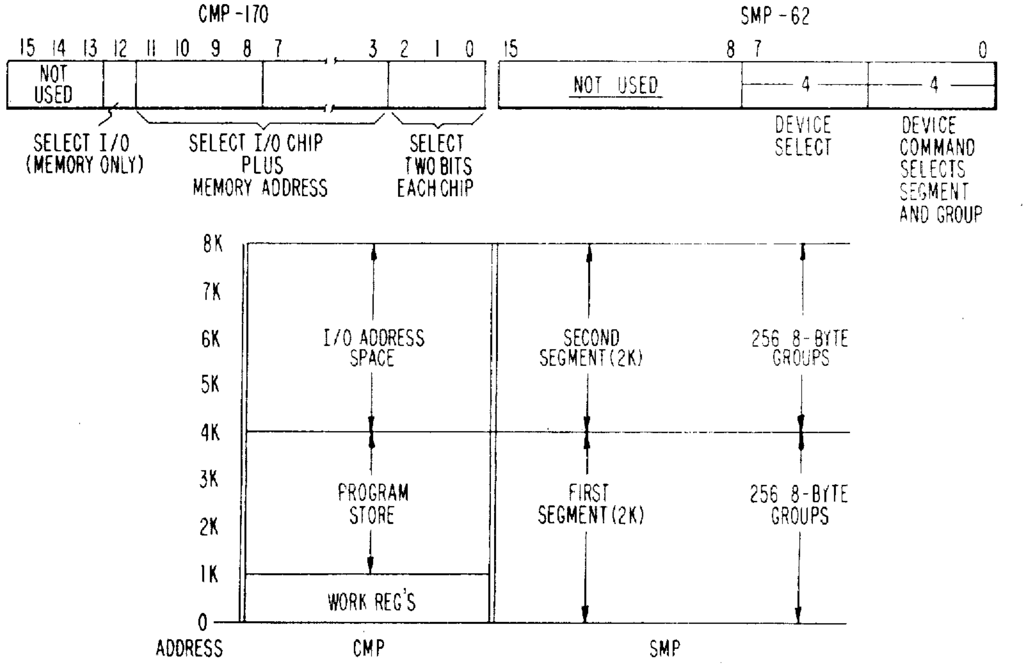
FIG. 7 is a diagram showing interprocessor address space in the memory of CMC 61.
Figure 8:
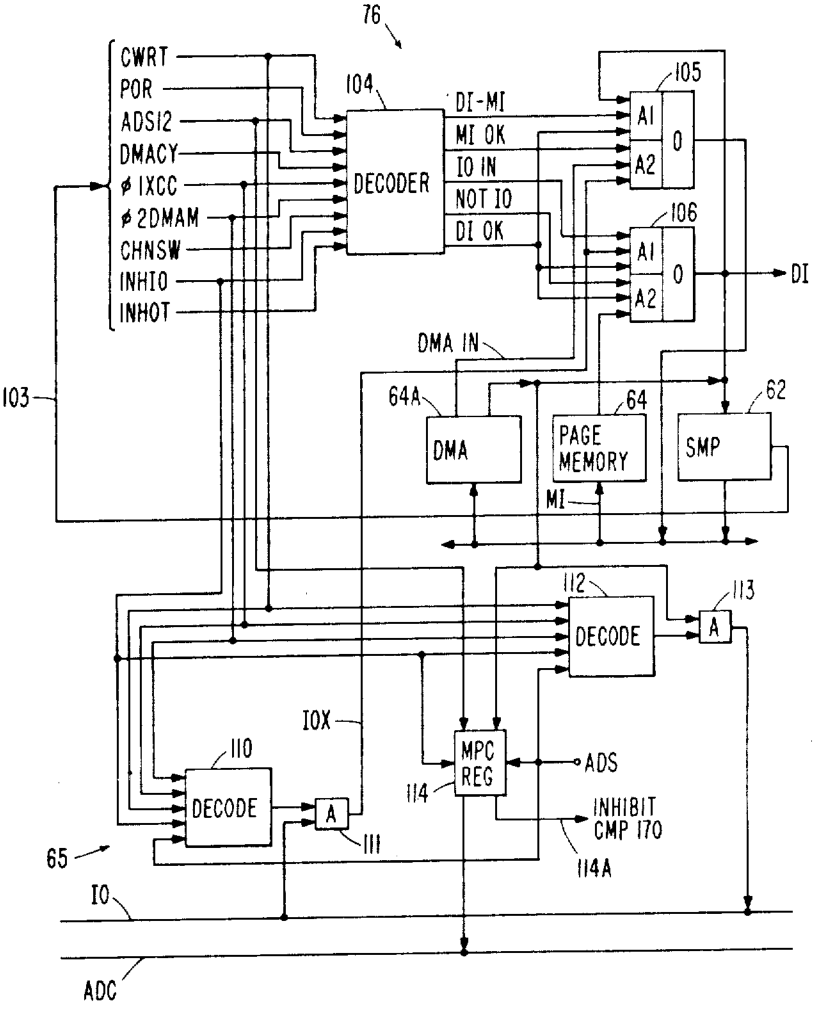
FIG. 8 is a simplified diagrammatic showing of MPC 65 and bus select circuit 76 bus connections and control.

The fetch decodes (memory references) are done from the IB register 196 at SEQUENCE 1 (SEQ 1) because the IR register 198 is loaded at $\phi$1, SEQ 1 (FIGS. 7 & 8). At sequences other than SEQ 1, the fetch decode is done from IR register 198. The fetch decodes are $\phi$2 signals and therefore are strobed at $\phi$1. The output of the fetch decodes are strobed into registers ALL 191, ALH 190, OL 200 and SCC 180. The program counter 192 is updated from registers AOL 201 and AOH 202 at a $\phi$2 time. The execution and designation decodes are 100 1 decodes from the IR 198. These decodes are strobed at $\phi$2 time into SCC 180 to set up the ALU 181 and DESTINATION strobes which occur at $\phi$1 time. The output signals of ALU 181 are strobed into DB 186, DO 187 or AOH 202 in accordance with the instruction being executed. Then ACL 183 and ACH 185 are updated at $\phi$2 so another ALU 181 cycle can begin. It takes three processor cycles from the start of a fetch decode to the time that the accumulator 183, 185 is updated. A pipelined configuration means that in some cases a processor can be executing three separate instructions at the same time as is known in the computer arts.

Instruction Sequences

An instruction sequence chart in FIGS. 5 and 6 is a convenient shorthand catalog of the internal operation of the processor 170 during each sequence of each instruction. It can be a very useful tool in understanding the processor's operation. This glossary of terms provides the information necessary for proper interpretation of these charts.

General Information

The processor 170 is pipelined. While it is executing one instruction, it reads the next two bytes from memory 172. The first byte is valid in IB 196 at the beginning of SEQ 1 and is used during SEQ 1 to provide three SEQ 1 decodes in SCC 180. At $\phi$1, SEQ 1, IB→TR where it remains until the next $\phi$1, SEQ 1. All remaining instruction decodes are done from IR 198.

The second byte is in TB 197 at the beginning of SEQ 2. This byte may contain immediate data for the current instruction or it may be a next instruction byte. If it is a next instruction byte, then the current instruction needs to read only one byte from memory to provide the required two bytes. This two byte read occurs for all one byte instructions.

All memory 172 accesses begin at $\phi 1$. The memory data is valid in the data latch register DL 205 via bus IO for CMP 170 by $\phi 2$, i.e., one and one-half instruction execution sequences later. In the table below, the memory timings for all instructions are set out together with the register destination (DEST) from data latch register 205.

WRITE-WRT

Indicates that a write into memory is initiated at $\phi 1$ rather than a read. A read is the default condition and requires no decodes. The WRT output line (FIG. 5) is active when WRT appears in the chart.

MEMORY REFERENCE TIMING TABLE

| | 1 | | 2 | | 3 | |
|---|---|---|---|---|---|---|
| INSTRUCTION | START | DEST | START | DEST | START | DEST |
| LR AR SR | 1 | TB | 2 | TB | 3 | TB |
| LRE LRD | 1 | ACL | 2 | ACL | 3 | TB |
| STR | 1 | TB | — | — | — | — |
| AI SI | 1 | TB | 2 | TB | — | — |
| CI GPI LI | | | | | | |
| XI OI NI | 1 | TB | 2 | TB | — | — |
| CB AB SB | | | | | | |
| LB XB OB | | | | | | |
| NB | 1 | TB | 2 | TB | 3 | TB |
| STB | 1 | TB | 3 | TB | — | — |
| AI SI SHL | | | | | | |
| SHR | 1 | TB | 2 | TB | | |
| TRA CLA | | | | | | |
| IC TBP TBR | 1 | TB | | | | |
| BAL | 1 | ACL | 2 | X | 5 | TB |
| RTN | 1 | TB | 2 | ACL | 3 | TB |
| | 4 | TB | | | | |
| BØØ IJO | 1 | TB | 2 | TB | 3 | TB |
| $\overline{\text{BØØ}}$ $\overline{\text{IJO}}$* | 1 | TB | 2 | TB | | |
| INTERRUPT | 1 | TB | 5 | ACL | 8 | TB |
| | 9 | TB | 10 | TB | | |
| BLI | 1 | TB | 2 | ACL | 3 | TB |
| | 4 | ACL | | | | |
| BSI | 1 | TB | 2 | ACL | 3 | TB |
| IN OUT | 1 | TB | 3 | ACL | 4 | TB |

| Code | Operation (Phase 2) | Decode |
|---|---|---|
| TB | DL→TB, ACL unchanged | None |
| ACL | DL→ACL, TB unchanged | TACL* or ITAL |
| X | None. ACL and TB are unchanged. Data will be lost unless SDL on line 206 is inhibited by DMA active on line 207. AND circuit 208 blocks Ø2 from generating SDL signals on line 206. DMA means direct memory access as by registers 173, 174. | NOTB* or TBNS |

*A bar over a jump or branch instruction indicates jump or branch was not taken.

If IR 198 still contains the current instruction byte, the decodes are static. If the decode is for the overlap cycle of SEQ 1 (with the next instruction byte in IR 198), the ALU 181 condition latches are set during the last sequences (3-5) of the current instruction execution. The designated register is decoded by SCC 180. This special case is shown on the instruction sequence charts, FIGS. 7 and 8, by the terms TBNS or ITAL in the ALU columns.

The operation of the processor 170 in each sequence is divided into two catagories: Control Logic (CL) of SCC 180 and ALU and Destination (ALU). The position of these two blocks within the sequence, i.e., left half or right half has no meaning. Operations can occur at $\phi 1$ or $\phi 2$ in either catagory. $\phi 1$ occurs in the middle of a sequence. The $\phi 2$ is always a sequence boundary.

Control Logic Glossary

This is a list of terms which appear in the control logic CL columns.

OUTPUT 1ST I/O-OUT 1IO

Indicates that the first cycle I/O code is placed on the output lines IO at $\phi 1$. Address lines AL9 and AL11 of ADC are driven by the decode IOC1. I/O line is active (FIG. 5).

OUTPUT 2ND I/O-OUT 2IO

Indicates that the second cycle I/O code is placed on the output lines IO to $\phi 1$. Address lines AL10 and AL11 of ADS are driven by IOC2. I/O line is active (FIG. 5).

TB→IB

At each $\phi 2$, SEQ 1 of every instruction, the signal contents of TB register 197 are transferred to IB register 196. The signal contents represent the next successive instruction following the current instruction.

IB SET

Same operation as TB→IB but the intent is to stop IB 196 from following TB 197 rather than to save the contents of the TB 197. It is followed at the next $\phi$1 by IB SET TO "TRA".

IB SET TO "TRA"

Indicates that the reset inputs (not shown) on the IB 196 latches (not shown) are driven at $\phi$1. CNT OR PORX drives an overlapping set on bits 0, 3, and 5, producing a "TRA" instruction code. BAL, POR then execute a TRA to complete their respective operations.

(TERM)

Indicates the end of the instruction. SEQ 1 begins at the doubled line 220 on the chart. The sequence counter (not shown S1-S6) in clock 176 is reset by the decode TERM*.

PCI

Indicates a read from memory and a Program Counter Increment. This action is a default condition and no decodes are needed.

$\phi$1: PC+1→AO $\phi$2: AO→PC

PCNI

A "NO OP". Same as PCI except the PC 192 is not updated at $\phi$2. The next PCI reads the same location again as though the first read did not occur. It is used because the processor lines signify something every $\phi$1 and some instructions have no Read/Write or I/O requirements during SEQUENCE 1. SPC (Set PC) is inhibited for the jumps and branches, for the shift instructions, and for A1 and S1 instructions.

IBL, IRL, IRH

Indicates a memory access (read or write) to a register. IR (IB) means the register is specified by the low order four bits of IR (IB). IB must be used during SEQ 1. IR 198 is used during all other sequences. L means the access is to the low byte of the register, H specifies the high byte. The decode IRSL* (IR selected) controls the formation of the address at $\phi$1.

| Operation | Control |
|---|---|
| IB (0-3)→AO (0-3) | IBX (SEQ 1 only) |
| IR (0-3)→AO (0-3) | IRX (all other sequences) |
| L=0, H=1→AO (4) | ILH |
| GP (0-2)→AO (5-7) | RGX |
| GP (3)→AO (8) | R3 |
| 0→AO (9-14) | TBIR |

TB

Indicates a memory access using the contents of TB 197 as the address. The decode TBSL* (TB selected) controls the formation of the memory address at $\phi$1.

| Operation | Control |
|---|---|
| TB (0-7)→AO (0-7) | TBX |
| GP (3)→AO (8) | R3 |
| 0→AO (9-14) | TBIR |

IRL+8

Same as IRL exept 1→AO(3). It is used only in the RTN instruction to read the new status from memory. A one is placed on AL(3).

CAL HIGH BITS, TB→AOL

Indicates a memory access to a location being branched to. The decodes TBSL* and AOSL* control address formation at Phase 1. The high bits are calculated by the counter logic CL for PCH+1 and PCH and by the ALU for PCH−1.

| Phase 1: | |
|---|---|
| Operation | Control |
| TB (0-7)→AO (0-7) | TBX |
| PCH+1→AO (8-14) | AOSL*=1, BNF=1 |
| PCH→AO (8-14) | AOSL*=1, BNF=0 |
| PCH−1→AO (8-14) | AOSL*=0 |

Phase 2: AO→PC

CAL HIGH BITS, IR→AOL

Similar to TB→AOL above except only the low four bits of the IR are used, and bits 4 through 7 are calculated by the counter logic. The decodes IRSL* and AOSL* control address formation by driving other control lines.

| Phase 1: | |
|---|---|
| Operation | Control |
| IR (0-3)→AO (0-3) | IRX |
| CL (4-7)→AO (4-7) | None (default) |
| PCH+1→AO (8-14) | AOSL*=1, JF8=1 |
| PCH→AO (8-14) | AOSL*=1, JF8=0 |
| PCH−1→AO (8-14) | AOSL*=0 |

Phase 2: AO→PC

OL, OH, 4L, 4H, 8L, 8H, 12L, 12H

Indicates a memory access to a register directly specified by the control SCC 180. Occurs only during interrupt. L indicates the low byte, H indicates the high byte;

| Phase 1: | |
|---|---|
| Operation | Control |
| Register→AO (0-3) | CN2, CN3 |
| L=0, H=1→AO (4) | ILH |
| 0→AO (5-13) | TBIR |
| 1→AO (14) | R9 |

Update PC, ACL→AOH, TB→AOL

Indicates a memory 172 access to an address specified by the contents of TB and ACL. The address is also placed in PC 192 at $\phi$2. The address formation is controlled by AOTB* which drives other control lines. ACL 182 go through ALU 181.

| Phase 1: | |
|---|---|
| Operation | Control |
| TB (0-7)→AO (0-7) | TBX |
| ACL (0-6)→AO (8-14) | SAO |

Phase 2: AO→PC

ACL→AOH, TB→AOL

Same as above except PC 92 is not updated at Phase 2.

Destination (Dest) Glossary

Items with boxes around them (e.g., ACL to DO→ACL) do not always occur. On Branch or Jump taken, the boxed destination occurs only when PCH 192B must be decremented to produce the proper address. The decrement always occurs, but loaded only when it isn't needed. On all other instructions, the boxed destination occurs if the instruction is also boxed.

Items in parentheses are "don't care" conditions which occur but are not part of the desired operation.

There are seven standard data transfers:

| | Phase 1 | Phase 2 | Decodes |
|---|---|---|---|
| 1. | ALU→DO | — | None (Default) |
| 2. | ALU→DO | DO→ACL | BF3 |
| 3. | ALU→DB | — | DBDS* |
| | ACH→DO | — | |
| 4. | ALU→DB | DB→ACH | BF2 |
| | ACH→DO | DO→ACL | |
| 5. | ALU→AOH | — | AOTB* |
| | TB→AOL | DB→ACH | |
| | ACH→DO | DO→ACL | |
| 6. | PCL→DO | — | PCSL.PSX |
| 7. | STATUS→DO | — | STSL.PSX |

Any variations of these are decoded separately as exceptions.

MISCELLANEOUS OPERATIONS

Update Status

The new status (REG GROUP, EQ, CARRY, LOW, INT MASK) which has been read from memory replaces the old status.

| | Operation | Decode |
|---|---|---|
| (Phase 1) | TB→STATUS | UPST*, CHST, CHST* |
| (Phase 2) | — | |

Clear ACL & ACH

ACL 182 & ACH 185 are reset to zero by driving the reset inputs of the register latches (not shown).

| | | |
|---|---|---|
| (Phase 1) | — | |
| (Phase 2) | 0→ACL, 0→ACH | CLAC |

Processor Forced to Execute TRA

The IB 196 has been reset to a TRA instruction. The sequence counter (not shown) in clock 176 is reset to SEQ 1 and the processor executes the TRA before the next instruction from memory.

Interrupt is prevented from occurring until after the TRA is completed.

AC7*→EQ

The EQ indicator is set by AC7* (used by I/O instruction), the bit 7 of ACL 183.

IC SETS IC

The Input Carry instruction sets the IC latch (not shown) in ALU 181.

"32"→DO

1→DO(5). Part of POR code.

ALU GLOSSARY

This is a list of terms which appear in the ALU category. CL X

ALU NO-OP. No ALU decodes are provided. ALU 181 output at 182 defaults to all 1's

ACL±TB

ALU 181 output is either ACL plus TB 197 or ACL 183 minus TB 197 depending on whether instruction was an ADD or a SUBTRACT.

ACL×TB

ALU output is some logical combination of ACL and TB which is dependent on the actual instruction.

ACL

ALU output is ACL.

TB

ALU output is TB.

(MODIF)

ALU output is modified in some manner depending on the instruction. Example: On an IN or OUT instruction TB→DO except for bits 5 and 6 which are modified to reflect 0 and OUT respectively. ALU output is shown as TB (MODIF).

ACL INCR/DECR

ALU output is ACL plus 1 or ACL minus 1 depending on the instruction.

PCH−1

ALU output is PCH minus 1.

PCH−1+CR

Same as PCH−1 except carry is added.

TBNS, ITAL

ALU NO-OP. The destination of data signals entering the processor at the end of SEQUENCE 1 via register 105 must be specified by the previous instruction (although that instruction is no longer in the machine). To accomplish this action, two sets of latches are necessary. The ALU latches are used as the first set. The ALU latches drive the second set, TBNS and ITAL.

ITAL specifies the ACL as the destination. TBNS specifies no destination. The default condition (no decodes) specifies the TB as the destination.

CMP WORKING STORE 172 ADDRESSING

Either SMP 62 or CMP 170 can access working store 172 and input and output registers 173, 174. SMP 62 accesses the registers and working store 172, 173, 174 via MPC 65 as will be later described. As shown in the FIG. 7, the sixteen bit address for bus ADC is not completely used for accessing the registers in store 172 or the input/output registers 173, 174. Bit 12 of the CMP address space selects whether working store 172 or registers 173, 174 are accessed. When bit 12 is a binary 1, then registers 173, 174 are selected as represented by the I/O address space from addresses 4K to 8K. When bit 12 is a zero, then the working store 172 address space from zero to 4K is selected. The least significant twelve bits select the address space within the two sections using known address decoding techniques. For the I/O address space, bits 3 through 11 select which I/O semiconductive chips constituting the input and output registers 173, 174 are selected, and bits 0 through 2 select bit positions within the chips forming the registers 73, 74 as will be later described. For working store 172, bits 0 through 11 designated continuous address space.

SMP 62 addressing accesses working store 172 and registers 173, 174 in two segments with eight byte group fetching for each access, i.e., the SMP 62 command to MPC 65 minimum access is for eight bytes of signals in CMC 61. The first segment corresponds to the address space of working store 172 and the second segment corresponds to the address space for registers 173, 174. Selection of the first and second segments as well as the byte groups will be better understood from a reading of description of MPC 65. In the address space bits 0 to 7 of the ADS address bus from SMP 62 are used for controlling MPC 65. The upper four bits perform a device select and the lower four bits perform a command select which selects the segment and groups for initializing MPC 65 for data transfer. The address space shown in FIG. 7 for SMP 62 is for the first type of a two-byte command as will become apparent.

Bus Controls

MPC 65 and bus select circuit 76 are both shown in FIG. 8. Bus select circuit 76 includes decoder 104 responding to signals from SMP 62 via control lines 103. Decoder 104 output signals in turn control a pair of A0 circuits 105, 106 for selectively interconnecting the byte busses MI and DI and connecting page memory 64 to DI via A0 106. With these connections, SMP 62 completely controls the bus interconnections and hence the data flow in MPMC 15 under microcode or software control. The lines 103 include CWRT which, when active, indicates that SMP 62 is supplying signals to be written either in page memory 64 or to input/output. Line POR signifies that hardware circuits (not shown) are initiating a power on reset and that the bus connections are to be set up for initializing MPMC for operation. In general, POR control causes a write into page memory 64 from MI as received from NVS 19. ADS 12 signal line signifies that the cycle of SMP 62 is in the address cycle, i.e., a memory address is being sent to page memory 64. DMACY indicates that DMA 64A has access to page memory 64. $\phi$1XCC, and $\phi$2DMAM are timing cycles corresponding respectively to $\phi 1$ and $\phi 2$ phases of the system clock. Additional gating for generating these signals is not shown for brevity. CHNSW carries a signal defining the time that data on DI is valid during system clock $\phi 2$. Lines INHDI and INHIO are special test control signals for testing the circuits and are beyond scope of the present description.

Decoder 104 responds to the various lines 103 signals to actuate the A0s 105, 106 as described. The A1 input portion of A0 105 connects DI to MI in that the other inputs to the A1 input portion are DI and the output is directly connected to MI. Similarly, A1 input portion of A0 105 interconnects DI to MI under DMA memory access control. Additionally, decoder 104 detects from SMP 62 control signals that it may connect to DI.

A0 106 selectively connects IOX from MPC 65 to MI or the output from page memory 64 to MI. The A1 input portion passes the IOX receive signal whenever the IO in DI OK line from decoder 104 are active. Furthermore, the A2 input portion is activated when decoder 104 signifies NOT IO, i.e., it is a memory reference.

With regard to the above statements, page memory 64 is continuously cycled and A0 106 selectively inhibits it outputs from bus DI during input operations, i.e., when signals from IOX are being transferred to MI.

MPC 65 is constructed using a similar design philosophy. Decode 110 responds to SMP 62 lines 103 signals as indicated in the drawing and to the ADS address signals to activate AND circuits 111 to pass signals from bus IO of CMC to cable IOX for gating by A0 106. Similarly, decode 112 responds to the SMP 62 control lines 103 signals and to the ADS signals to activate AND circuits 113 to pass the signals of bus DI to IO bus of CMC. In general, MPC 65 operates in two phases. The first phase is the addressing phase; the second phase is the data transfer phase. The address of the memory in CMC which includes ROS control store 171, working store 172, and registers 173, 174 is set forth in MPC register 114 at ADS 12 time from bus ADS. Additional control signals are supplied over DI. MPC register 114 supplies its output signals to bus ADC for addressing the above-mentioned modules in CMC. On the next and successive cycles, data is transferred through AND circuits 113 from DI to IO bus as indicated by the addresses supplied to ADC from MPC register 114.

MPC register 114 includes a control bit (not shown) that inhibits CMP 170 by supplying an inhibit signal over line 114A. This inhibit signal makes memory space of CMC 61 available to SMP 62 for exercising complete control, obtaining information, and performing diagnostics and program loading.

The Print Mode

CPP 13 produces copies independent from the operational mode of the copy production machine 10, the mode differences being the selection of the image source as either SADF 11 or laser input L1 12B and of the output portions 14B or 14A, 14C, respectively. Before printing, SMP 62 determines whether the machine is in the copy mode or the print mode. The characteristics of these two modes are first described. In the copy mode, which is a foreground operational mode, i.e., the one most readily available to an operator of the machine, SADF 11 supplies optical images to CPP 13 for production of copies to be deposited in either exit tray 14A or to be collated in output portion 14C. A feature of the copy mode is that all collation is done in the output portion and that the input optics scan an original document to be reproduced. Such scanning can be by the usual convenience copier optics, flying spot scanner, laser scanner, or any other form of scanning instrument. For example, the image on the document in SADF 11 may be scanned by a digitized scanner which converts the image into noncoded information (NCI) which in turn operates laser input LI 12B for reproducing the document via area 22 of photoconductor drum 20. The other mode, the print mode, selects word processing or data processing inputs in the form of image indicating signals normally stored in non-volatile store NVS 19. These signals are buffered in page memory 64 and interpreted at the laser input to generate images in accordance with the signal indications to produce what is termed "print copies" for deposit in output portion 14B. Reverser REV may be used in conjunction with duplex copy production for use in connection with either 14B or 14C as is well known in the arts. A distinguishing feature of the print mode from the copy mode as embodied in copy production machine 10 is that all collation of the images being produced in the print mode is done before the images are processed by photoconductor drum 20. This mode of operation may be conveniently termed precollation. Precollation is performed by manipulating the image indicating signals received from data processing or word processing input in such a manner that the print copies exit from CPP 13 in a proper collated order. In this manner, a single output at 14B receives fully collated copy sets in the print mode.

From the above, it is readily seen that in the copy mode there is a SADF 11 image source which shares the CPP 13 with other image sources yet has its own unique output portions 14A, C. In this manner, the copy mode and the print mode insofar as input and output are concerned are completely independent which facilitates sharing CPP 13 between the two modes of operation. Since the copy mode is the foreground mode, i.e., the most convenient mode insofar as operators are concerned, during a power on reset (POR) copy production machine 10 is initially selected to be in a copy mode. This copy mode is inactive whenever no copies are actually being produced by CPP 13 or being transported to output portions 14A, C. When the copy mode is inactive, a request from a data processor or a word processing station to print copies takes precedence, bringing the background print mode into a foreground operating state. Initiation of the print mode activity, taking it from a background state to a foreground operating state, is described shortly. The background print mode can be maintained in the foreground operating state until the copy mode is selected or until the print mode becomes inactive when the copy production machine 10 automatically reverts to the foreground copy mode. In the print mode, local terminal 16, nonvolatile store 19, and remote terminal connector 17 cooperate with MPMC 15 and LI 12B for producing print copies in CPP 13. A print mode request is initiated by an operator language called OCL (operator control language) which contains information enabling copy production machine 10 to produce a requested number of print copies in a predetermined format, also as defined by OCL. OCL language includes definitions of margins, font selection, tab stops, number of lines per page, and the like as is well known in the word processing industry. To initiate a word processing input, word processing recorded magnetic cards are inserted into local terminal 16 hopper 137 such as a unit built by International Business Machines Corporation, Armonk, N.Y., and identified as a Magnetic Card Model II automatic typewriter. This recorder unit senses the word processing image indicating signals and transfers them under program control to memory 64, and SMP 62 performs word processing functions or text processing functions on the received image indicating signals. Such text processing functions are necessary to convert the word processing input into a textual format suitable for use by LI 12B. The details of such text processing become immensely complicated and are dispensed with for purposes of brevity, it being understood that known text processing techniques may be used for converting the received word processing image indicating signals to a format including control signals for use by the copy production machine 10. This mode continues until the hopper 137 of the local terminal 16 is empty. A switch (not shown) in hopper 137 signals to CMP 62 via DI bus that hopper 137 is empty. This signal signifies that all image indicating signals from word processing unit LT 16 have been transferred into copy production machine 10. The hopper empty signal is transferred to SMP 62 for later use as will be described below.

Figure 9:
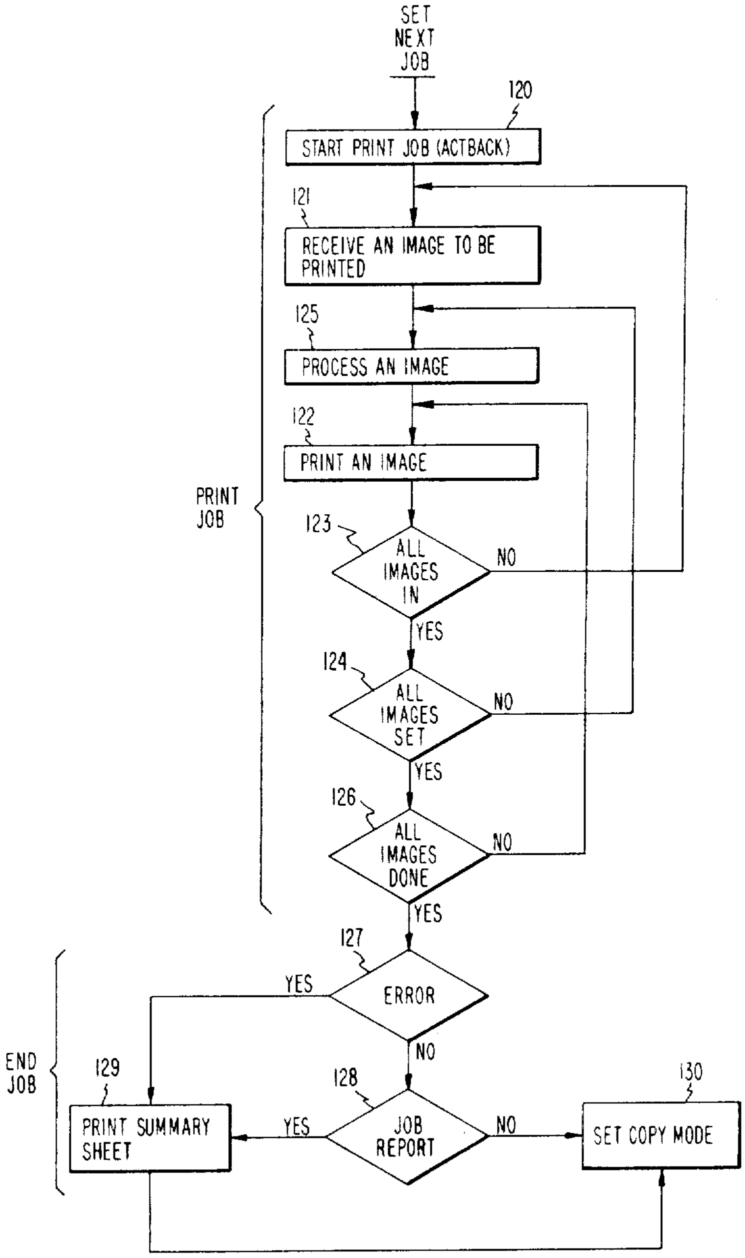
FIG. 9 is a flow chart illustrating a noninterrupted flow of a background print job and automatic reversion to the foreground copy mode.

The programming of SMP 62 in connection with the initiation of a print mode as requested by LT 16 receiving magnetic record cards (not shown) and actuation of "read" button 155 is shown in FIG. 9 and further explained with respect to the code listings included in the specification. It is to be understood that the supplied code listings are those necessary to provide the functions set forth in the claims and do not show all of the functions performed by SMP 62 in supervising the operating copy production machine 10. For example, test processing has been dispensed with as well as diagnostic and other supervisory functions usually performed by programmable computers in connection with controlling machines. Further, source code not necessary to an understanding of the claimed subject matter and which is interleaved with the listed codes has been omitted for purposes of more clearly describing the claimed invention.

Upon receipt of a print job initiating OCL, SMP 62 enters a start print job subroutine via a program path termed "set next job" which corresponds to memory address E874 in Table I below. The start print job at 120 is termed "ACTBACK" which is a shorthand name for activate background print mode. The details of ACTBACK 120 are shown in the Table I below in source code language operable on the above described pipeline processor. In Table I and all other source code tables in this specification, the left hand column entitled "LOC" indicates the actual memory location of the instruction word; "OBJ" is the object code itself; the terms "OP1" and "OP2" refer to operands 1 and 2, respectively; and the source statement is the wide right hand column which defines the function being performed by the object code using operands 1 and 2.

MICROCODE TABLE I - ACTIVATE PRINT MODE

| LOC | OBJ | OP1 OP2 | | | SOURCE STATEMENT |
|---|---|---|---|---|---|
| E874 | EF | 000F | ACTBACK | LR | STATER |
| | | | | EXP2 | NI,P (BDDSTF,DDSTF) TEST 2 BITS-ZERO ALL OTHERS |
| E875 | AB88 | 0088 | | | |
| E877 | 46 | E886 | | JE | NOTDRK BOTH BITS = 0 |
| | | | | EXP2 | XI,P (BDDSTF,DDSTF) |
| E878 | AD88 | 0088 | | | |
| E87A | 3D91 | E891 | | BE | DUPALT BOTH BITS = 1 |
| E87C | EF | 000F | | LR | STATER STATE = 0/1\|1/0 |
| E87D | 97 | 0007 | | TP | BDDSTF |
| E87E | 61 | E811 | | JNE | CDRK |

-continued

MICROCODE TABLE I - ACTIVATE PRINT MODE

| LOC | OBJ | OP1 OP2 | | | SOURCE STATEMENT |
|---|---|---|---|---|---|
| E87F | 96 | 0006 | | TP | BLDSTF |
| E880 | 6D | E88D | | JNE | CLT |
| | | | CDRK | TSMR | FLCNTLR,P(CHNGDRKF) FRGND LT, BCKGND DRK-SO CHANGE |
| E881 | E8 | 0008 | | | |
| E882 | AF08 | 0008 | | | |
| E884 | 88 | 0008 | | | |
| | | | *** | | HARDWARE WILL TURN OFF LT DOC |
| E885 | 01 | E891 | | J | DUPALT |
| E886 | EF | 000F | NOTDRK | LR | STATER |
| | | | | EXP2 | NI,P (BLDSTF,LDSTF) |
| E887 | AB44 | 0044 | | | |
| E889 | 41 | E891 | | JE | DUPALT BOTH = 0, NO CHANGE REQUIRED |
| | | | | EXP2 | XI,P (BLDSTF,LDSTF) |
| E88A | AD44 | 0044 | | | |
| E88C | 41 | E891 | | JE | DUPALT BOTH = 1 SO NO CHANGE REQUIRED |
| | | | CLT | TSMR | FLCNTLR,P (CHNGLTF) FRGND DRK, BCKGND LT-SO CHANGE |
| E88D | E8 | 0008 | | | |
| E88E | AF04 | 0004 | | | |
| E890 | 88 | 0008 | | | |
| | | | *** | | HARDWARE WILL TURN OFF DARK DOC |
| | | E891 | DUPALT | DC | * |
| | | | * | | 1. SET UP DUPLEX FOR PRINT |
| E891 | EF | 000F | | LR | STATER |
| | | | | EXP2 | NI,P(BDSTF,DSTF) |
| E892 | AB11 | 0011 | | | |
| E894 | 4C | E89C | | JE | GOOD1 BOTH OFF SO NO CHANGE |
| | | | | EXP2 | XI,P(BDSTF,DSTF) |
| E895 | AD11 | 0011 | | | |
| E897 | 4C | E89C | | JE | GOOD1 BOTH ARE ON NO CHANGE |
| | | | | TSMR | FLCNTLR,P(CHNGDUPE) ONE OR THE OTHER IS ON |
| E898 | E8 | 0008 | | | |
| E899 | AF01 | 0001 | | | |
| E89B | 88 | 0008 | | | |
| | | | ** | | SO TOGGLE STATE OF DUPLEX |
| | | | * | | 1. SET UP SUPPLY BIN FOR PRINT |
| E89C | EF | 000F | GOOD1 | LR | STATER |
| | | | | EXP2 | NI,P(BSSSTF,SSSTF) |
| E89D | AB22 | 0022 | | | |
| E89F | 47 | E8A7 | | JE | GOOD2 BOTH ARE OFF-SO NO CHANGE |
| | | | | EXP2 | XI,P(BSSSTF,SSSTF) |
| E8A0 | AD22 | 0022 | | | |
| E8A2 | 47 | E8A7 | | JE | GOOD2 BOTH ARE ON-SO NO CHANGE |
| | | | | TSMR | FLCNTLER,P(CHNGALTF) ONLY ONE WAS ON-SO TOGGLE |
| E8A3 | E8 | 0008 | | | |
| E8AR | AFO2 | 0002 | | | |
| E8A6 | 88 | 0008 | | | |
| | | | * | | 1. RESET LIGHTS FOR NUM. PAGES & ADJUST |
| | | | GOOD2 | TRMR | LIGHTSR,P(ADJUSLTF,NUMPGLTF) |
| E8A7 | E9 | 0009 | | | |
| E8A8 | AB9F | 009F | | | |
| E8AA | 89 | 0009 | | | |
| | | | * | | 1. SETUP ADJUST * NUMBER PAGES STATES |
| | | | *C | | (NUMPGF ADJUSTF) |
| E8AB | A63F | 023F | | LBL | STATE1B |
| | | | | EXP2 | NI,P(NUMPGF,ADJUSTF) |
| E8AD | AB60 | 0060 | | | |
| E8AF | A729 | 0229 | | OBL | $LITES2B |
| E8B1 | A129 | 0229 | | STBL | $LITES2B |
| | | | * | | 1. RESTORE OLD STATES-THIS CLEARS THE |
| | | | *C | | BACKGRND STATES |
| E8B3 | 25 | | | CLA | *** |
| E8B4 | A62F | 022F | | LBL | STATE2B |
| | | | | SHRM | 4 |
| E8B6 | 2F | | | | |
| E8B7 | 2F | | | | |
| E8B8 | 2F | | | | |
| E8B9 | 2F | | | | |
| E8BA | A12F | 022F | | STBL | STATE2B |
| | | | * | | 1. RESET READ AND RECEIVE FLASH (READFLF |
| | | | *C | | RECVFLF) |
| | | | | TRMBL | $LITESFB,P(READFLF,RECVFLF) |
| E8BC | A638 | 0038 | | LB | $PEK874 |
| | | | | NI | X'FF'-($CA1875+$CA2875+$CA3875+$CA4875+$CA5875+ |
| | | | | | $CA6875+$X |
| E8BE | AB6F | 006F | | | CA7875+$CA8875) |
| E8C0 | A138 | 0038 | | STB | $REK874 |
| | | | * | | 1. RESET COPY LIGHT (COPYLTF) |
| | | | | TRMBL | $LITES1B,P(COPYLTF) |
| E8C2 | A639 | 0039 | | LB | $REK878 |
| E8C4 | B6 | 0006 | | TR | COPYLTF |

-continued

MICROCODE TABLE I - ACTIVATE PRINT MODE

| LOC | OBJ | OP1 OP2 | | | SOURCE STATEMENT |
|---|---|---|---|---|---|
| E8C5 | A139 | 0039 | | STB | $REK878 |
| | | | * | | 1. SET COPIES REQUESTED=SETS REQUESTED |
| | | | *C | | (CPYREQR = PRNTREQR) |
| E8C7 | E5 | 0005 | | LR | PRNTREQR |
| E8C8 | 84 | 0004 | STR | CPYREQR | |
| | | | * | | 1. IF RECORD LIGHT IS ON SOLID |
| | | | *C | | (RECRDLTF=1) |
| | | | * | | 1. THEN |
| E8C9 | 97 | 0007 | | TP | RECRDLTF |
| E8CA | 40 | E8D0 | | JE | XMIT |
| | | | * | | 2. RESET RECORD FLASH (RECRDFLF) |
| | | | | TRMBL | $LITESFB,P(RECRDFLF) |
| E8CB | A638 | 0038 | | LB | $REK880 |
| E8CD | B1 | 0001 | | TR | RECRDFLF |
| E8CE | A138 | 0038 | | STB | $REK880 |
| | | | * | | 1. ENDIF |
| | | | * | | 1. IF TRANSMIT IS ON SOLID (XMITLTF=1) |
| | | | * | | 1. THEN |
| E8D0 | A639 | 0239 | XMIT | LBL | $LITES1B |
| E8D2 | 92 | 0002 | | TP | XMITLTF |
| E8D3 | 49 | E8D9 | | JE | LGTSGD |
| | | | * | | 2. RESET TRANSMIT FLASH (XMITFLF) |
| | | | | TRMBL | $LITESFB,P(XMITFLF) |
| E8D4 | A638 | 0038 | | LB | $REK882 |
| E8D6 | B5 | 0005 | | TR | XMITFLF |
| E8D7 | A138 | 0038 | | STB | $REK882 |
| | | | * | | 1. ENDIF |
| | | | * | | 1. TURN DOCUMENT LAMP OFF (DOCLMPF=1) |
| | | | * | | 1. SELECT PRINT EXIT POCKET (SELPRNTF=1) |
| | | | LGHTSGD | TSMR | FLCNTLR,P(SELPRNTF,DOCLMPF) |
| E8D9 | E8 | 0008 | | | |
| E8DA | AF90 | 0090 | | | |
| E8DC | 88 | 0009 | | | |
| | | | * | | 1. SET CHANGES ACTIVE FLAG (CHNGACTF) |
| | | | | TSMBL | STATE1B,P(CHNGACTF) |
| E8DD | A63F | 003F | | LB | $REK887 |
| | | | | OI | $CA1888+$CA2888+$CA3888+$CA4888+$CA5888+$CA6888+ $CA7888+X |
| E8E1 | A13F | 003F | | STB | $REK887 |
| | | | * | | 1. RESET INHIBIT PRINTING FLAG (PRNTINHF) |
| E8E3 | EC | 000C | | LR | SOFTJOBR |
| E8E4 | B3 | 0003 | | TR | PRNTINHF |
| E8E5 | A12C | 022C | | STBL | JOBFLGB |
| | | | * | | 1. SUBROUTINE EXIT |
| E8E7 | 21 | 0001 | ACTEND | RTN | BAL1 |
| | | | * | | ENDBEGIN ACTBACK |

In the above Table I the first part of the table shows SMP 62 readjusting the copy production machine 10 to accommodate the print mode, for example, the change from light or dark background copier settings to a normal setting. Also the duplex mode is selected if requested by OCL, such as at E891 memory address. The copy mode light is extinguished by an instruction at E8C2. The number of copies per set and the number of sets requested are set by an instruction at E8C7 and other controls incidental to effecting a print job are initialized in ACTBACK 120.

Next, copy production machine 10 receives an image to be printed as at 121. This image can be supplied through LT 16 or through RTC 17. In either event, the first image to be printed has to be received and placed in page memory 64 after suitable text processing (not described) effected via SMP 62. Once an image is in place in page memory 64, copy production machine proceeds to print an image at 122. Since steps 121 and 122 are a part of the print job and are not a part of the controls for switching between print jobs and copy jobs, the actual processing at the instruction level is dispensed with for purposes of brevity, it being understood that any suitable known text processing and image processing type of control may be used.

Upon printing an image as by imposing an image on photoconductor drum 22, and even before the imaged copy sheet has left fuser 31, SMP 62 checks to ensure that the print job is not over and determines the state thereof for determining the next action. FIG. 9 shows the overall view of how this is achieved while the details of it will be explained later with respect to FIG. 10. First, SMP 62 at 123 checks whether all images had been received. If not, SMP 62 actuates copy production machine 10 to receive another image to be printed. In this regard it should be noted that the images in page memory 64 may be transferred to nonvolatile store 19 in accordance with precollation techniques as will be later discussed. If all the images are in, i.e., LT 16 has completed its job or RTC 17 has completed its job, then SMP 16 determines whether all of the images are set as at 124. This means that all of the text processing has been performed by SMP 62 and that most of the image indicating signals have been stored in NVS 19. It should be understood that the image indicating signals per image are shuttled between page memory 64 and NVS 19 for printing successive precollated copies. If all of the images are not set, then SMP 16 returns to the first part of the program to process by text processing another image as at 125. It should be noted herein that before any image is printed, text processing functions are performed on it, no limitation thereto intended. If, on the other hand, all images had been text processed (set), SMP 62 then proceeds to check whether all of the images have been imaged on photoconductor drum 20, as at 126. If not, another image is printed. If all of the images had been impressed upon photoconductor drum 20, i.e., all copies have been started and all that remains is for copy production machine 10 to transport the imaged copy sheets to output portion 14. Then, no more imaging is performed and SMP 62 proceeds to terminate the print job.

In terminating a print job, SMP 62 first determines at 127 whether there were any error conditions occurring during the print job. If so, error conditions will be printed on a so-called summary sheet which is another imaged copy sheet supplied with the imaged print copies for use by the machine operator. Typically, a printed summary sheet would be text from NVS 19 and memory 64 containing error data and operational problems printed as a regular print copy in a predetermined format. Such summary sheets assist the operator in successfully operating copy production machine 10, particularly when certain errors have occurred. A collection of such summary sheets is an efficient diagnostic aid to maintenance personnel for maintaining successful operation of copy production machine 10.

If there are no errors detected at 127, SMP 62 then proceeds to branch instruction at 128 to determine whether OCL initiating the print job had requested a job report in the form of a summary sheet. If so, copy production machine 10 prints the summary sheet indicating no errors and indicating parameters of the print job such as margin setting and the like.

SMP 62, after having determined the last printed copy sheet has successfully been transported to output portion 14B, sets the copy mode at 130. It should be noted herein that the summary sheet being printed at 129 does not start until SMP 62 has determined successful completion of the print job which includes depositing the last copy sheet successfully in output portion 14B. For purposes of simplicity, the wait loop necessary for SMP 62 to hold the print job summary sheet initiation is dispensed with because wait loops are well known.

Before the "set next job" can be performed as at 120 by SMP 62, it must verify that the copy mode switch 135 (FIG. 1B) has not been actuated. If actuated, a copy mode job will be performed. This determination is achieved in a three instruction subroutine shown below in Microcode Table II Sense Copy Mode Switch. This routine merely consists of an input instruction which receives the switch 135 setting via input registers 173 (FIG. 2) and then branches upon the input instruction either to set next job at 120 or to perform copy mode operations (not herein described).

Furthermore, the set copy mode 130 is shown in Microcode Table III Begin Print Job End. If this microcode routine senses that the drive motor of the copy production machine which rotates photoconductor 20 is not being energized (drive low), this state indicates an end of a print job has occurred, then SMP 62 executes branch instruction 128 to print summary sheet 129. After the summary sheet is printed, the copy mode will be reinstalled as an inactive foreground state. These actions are shown in Microcode Table III below.

MICROCODE TABLE II - SENSE COPY MODE SWITCH

| LOC | OBJ | OP1 | OP2 | | | SOURCE STATEMENT |
|---|---|---|---|---|---|---|
| E263 | A637 | 0237 | | NTCK | LBL | SWST3B |
| E265 | 92 | 0002 | | | TP | COPYSWF |
| E266 | 356E | E36E | | | BE | CHKINV |

MICROCODE TABLE III - BEGIN PRINT JOB END (PROJBEND)

| LOC | OBJ | OP1 | OP2 | | | SOURCE STATEMENT |
|---|---|---|---|---|---|---|
| | | | | ** | | |
| | | | | * | | BEGIN PRJOBEND |
| | | | | * | | 1. IF DRIVE IS LOW & JOB END HAS OCCURRED |
| | | | | *C | | (DRIVESTF=0 & JOBENDF=1) |
| DDEF | E7 | 0007 | | CHKBRJEN | LR | SWST2R |
| DDF0 | 97 | 0007 | | | TP | DRIVESTF |
| DDF1 | 346A | DE6A | | | BNF | ENDPJEND |
| DDF3 | EC | 000C | | | LR | SOFTJOBR |
| DDF4 | B5 | 0005 | | | TR | JOBENDF |
| DDF5 | 356A | DE6A | | | BE | ENDPJEND |

Figure 10:
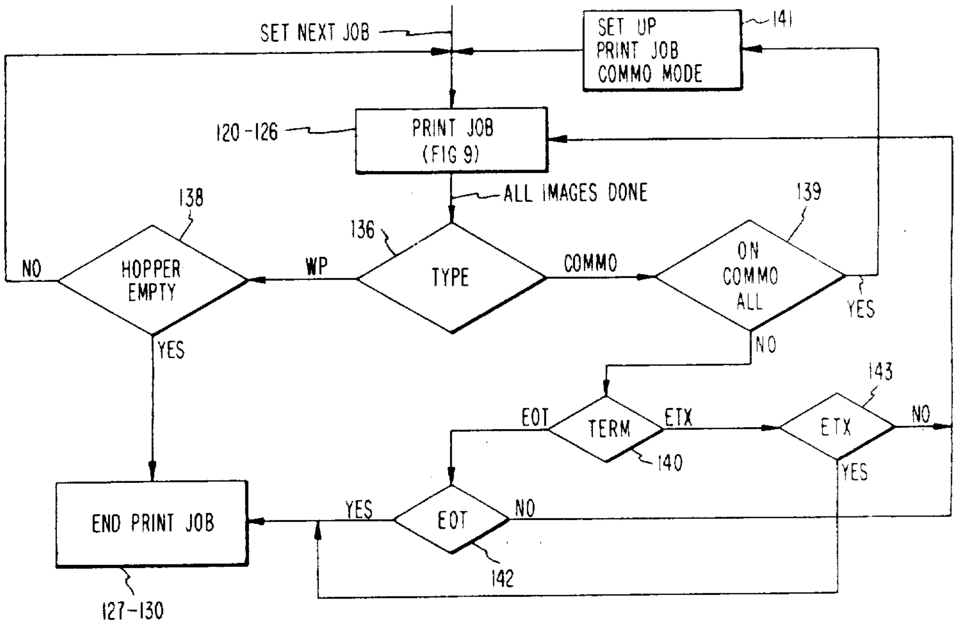
FIG. 10 is a flow chart detailing a job termination portion of the FIG. 9 flow chart.

As to SMP 62 terminating a print job, more detailed description of such termination is shown in FIG. 10. The print job control steps include items 120 through 126 of FIG. 9. When all the images are completed, the subroutine shown in FIG. 10 is entered at branch instruction 136, i.e., the FIG. 10 subroutine is interposed between branches 126 and 127 of FIG. 9. With different machine configurations, it is to be understood that the FIG. 10 subroutine would be changed accordingly.

SMP 62, having determined that all images are finished as at 126, then determines the type of image input at 136. If it is a word processing WP input from LT 16 then the LT 16, hopper 137 is checked to determine whether or not it is empty as at 138. If hopper 137 is not empty, the print job mode is left active. That is, in copy production machine 10, hopper 137 may receive a plurality of jobs to be automatically and successively printed. Each job would be started by a so-called OCL card which would specify the parameters of the print job to copy production machine 10. When a given print job from LT 16 is being completed it is necessary for the copy production machine 10 via SMP 62 to sense whether or not there are more jobs in hopper 137. If hopper 137 is empty, then the end print job routine of FIG. 9 which includes items 127–130 is entered including setting copy mode at 130.

On the other hand, if the images being printed are received via RTC 17 in the communications mode (COMMO), then the character of the job assignment must be examined by SMP 62. To this end, it first determines whether or not copy production machine has been placed in a dedicated receive mode, such as by the image sending remote station 18 via the OCL transmitted just prior to, during, or after the print job. On dedicated receive mode, copy production machine 10 automatically sets up the next communication job at 141 and then automatically performs the printing in accordance with the received image indicating signals. Accordingly, if copy production machine is in the dedicated receive mode, then it must always set up a print job in the communication mode at 141. Code listings for the routine of 141 are omitted for brevity in that programmed reception of image indicating signals are well known. Upon executing routine 141, SMP 62 then sets the next job via memory address E874 and starts printing again as soon as image indicating signals are received, if any. In the dedicated receive mode, copy production machine 10 always has the print mode as the normal active foreground operational state. In the dedicated receive mode, source 18 may typically be a data processing system 18A, 18B. In this instance, copy production machine 10 is a computer peripheral interruptible to perform a manually actuated function in the computer peripheral.

If, on the other hand, copy production machine 10 is not in the dedicated receive mode (not on communication all of the time) it, proceeds to determine what the image signal sending source 18 has indicated as a job termination. In accordance with known communication protocol, sessions, i.e., transmission periods, of sending image indicated signals to copy production machine 10 dictate that jobs can be ended by indicating end of text, ETX, or an end of transmission, EOT. Therefore, a branch at 140 determines the type of termination required by the sending source 18. If EOT, SMP 62 detects whether or not an EOT character has been received at 142. If not, the print job is then resumed; if so, the print job is ended. Similarly, ETX branch 143 looks for the character ETX and performs the same functions as described for EOT.

The above portions of the print job are for uninterrupted print jobs, i.e., where a print job has been requested and the print mode has been changed from a background mode to a foreground operating state. The copy mode, which is a foreground operating mode, is relegated to the background operational state while the print mode is active. However, upon a request that a copy mode be instituted in copy production machine 10, the print mode is automatically relegated to a background operational state while the copy mode is activated into the foreground operational state until all copies have been made. At that point, the print mode is automatically reinstituted as the active foreground state as will become apparent from the immediately following description.

Copy Selection Interruption of Active Print Mode

Figure 11:
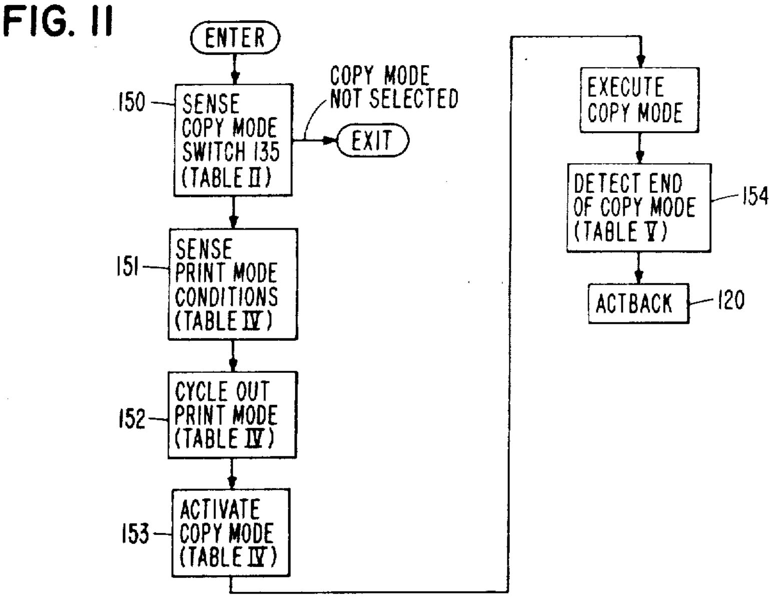
FIG. 11 is a flow chart showing copy selection interrupt of an active print mode.

The sequence of operations of copy production machine 10 in responding to a copy request during a print job or dedicated receive mode for interrupting the print job is shown in FIG. 11. SMP 62 periodically scans copy select switch 135 as set forth in Table II, supra. In FIG. 11, the sensing of copy mode switch 135 at 150 may result in a branch operation indicating that the copy mode was not selected. In such a situation, the FIG. 11 illustrated program is exited. On the other hand, if the copy mode switch 135 is set, then SMP 62 executes the program set forth in Table IV which implements the three functions identified in flow chart blocks 151, 152, 153 which respectively sense print mode conditions for cycling out the print job and activating the copy mode. All of these functions are set forth in Table IV immediately below.

MICROCODE TABLE IV - COPY MODE INTERRUPTS PRINT MODE

| LOC | OBJ | OP1 | OP2 | | | SOURCE STATEMENT |
|---|---|---|---|---|---|---|
| E2D9 | 31E8E9 | 0001 | E9E8 | | BAL | BAL1,BAL41 |
| E2DC | 246D | E36D | | | B | COPYEX |
| | | | | * | | 2. . . . ELSE PRINT STYSTEM NOT IDLE |
| | | | | * | | 3. . . . IF PRINT SYSTEM IS HALTED |
| | | | | *C | | (SUPHALTF=1) |
| | | | | PRNTBCK | SRG | GROUPSU |
| E2DE | A9C7 | 00C7 | | | | |
| E2E0 | A6E4 | 00E4 | | | LBL | SUBERB |
| E2E2 | B2 | 0002 | | | TR | SUPHALTF |
| E2E3 | A1E4 | 00E4 | | | STBL | SUPERB |
| | | | | | SRG | GROUPCD |
| E2E5 | A9D1 | 00D1 | | | | |
| E2E7 | 4C | E2EC | | | JE | CCIP |
| | | | | * | | 3. . . . THEN |
| | | | | * | | 4. . . . RESET PRINT SYSTEM HALT |
| | | | | *C | | FLAG-CODED ABOVE (SUPHALTF) |
| | | | | * | | 4. . . . RESET PG PROC. COPYMODE (PRNTINHF) |
| E2E8 | EC | 000C | | | LR | SOFTJOBR |
| E2E9 | B3 | 0003 | | | TR | PRNTINHF |
| E2EA | A12C | 022C | | | STBL | JOBFLGB |
| | | | | * | | 3. . . . ENDIF |
| | | | | * | | 3. . . . NOTE JAMS HAVE ALREADY BEEN LOOKED |
| | | | | *C | | FORE |
| | | | | * | | 3. . . . IF DRIVE HIGH (DRIVESTF=1) |
| E2EC | E7 | 0007 | | CCIP | LR | SWST2R |
| E2ED | 97 | 0007 | | | TP | DRIVESTF |
| E2EE | 3509 | E309 | | | BE | STDUPLX |
| | | | | * | | 3. . . . THEN |
| | | | | * | | 4. . . . STILL ACTIVELY PRINTING SO SET NOT |
| | | | | *C | | READY LIGHT AND COPY SWITCH |
| | | | | *C | | FLAG (NTRDYLTF, COPYSWF) AND |
| | | | | *C | | WAIT FOR PRINT TO FIND |
| | | | | *C | | CONVENIENT STOPPING POINT |
| | | | | | TSMR | LIGHTSR,P(NTRDYLTF) |
| E2F0 | E9 | 0009 | | | | |
| E2F1 | AF10 | 0010 | | | | |

-continued

MICROCODE TABLE IV - COPY MODE INTERRUPTS PRINT MODE

| LOC | OBJ | OP1 | OP2 | | | SOURCE STATEMENT |
|---|---|---|---|---|---|---|
| E2F3 | 89 | 0009 | | | | |
| | | | | | TSMBL | SWST3B,P(COPYSWF) |
| E2F4 | A637 | 0037 | | | LB | $REK494 |
| | | | | | OI | $CA1495+$CA2495+$CA3495+$CA4495+$CA5495+$CA6495+ $CA7495+X |
| E2F6 | AF04 | 0004 | | | | $CA8495 |
| E2F8 | A137 | 0037 | | | STB | $REK494 |
| | | | | * | | 4. . . . IF NOT IN DUPLEX STATE OR NO |
| | | | | *C | | COPIES IN DUPLEX TRAY (DSTF=0 |
| | | | | *C | | \| CIDTF=0) |
| E2FA | EF | 000F | | | LR | STATER |
| E2FB | 90 | 0000 | | | TP | DSTF |
| E2FC | 3502 | E302 | | | BE | PRNTSTOP |
| E2FE | E6 | 0006 | | | LR | SWST1R |
| E2FF | 96 | 0006 | | | TP | CIDTF |
| E300 | 3C6D | E36D | | | BNE | COPYEX |
| | | | | * | | 4. . . . THEN |
| | | | | * | | 5. . . . SET INHIBIT PRINTING FLAG |
| | | | | *C | | (PRNTINHF) |
| E302 | EC | 000C | | PRNTSTOP | LR | SOFTJOBR |
| E303 | AF08 | 0003 | | | TS | PRNTINHF |
| E305 | A12C | 022C | | | STBL | JOBFLGB |
| E307 | 2C6D | E36D | | | B | COPYEX |
| | | | | * | | 4. . . . ENDIF |
| | | | | * | | 3. . . . ELSE |
| | | | | * | | 4. . . . IF IN DUPLEX MODE (DSTF=1) |
| E309 | EF | 000F | | STDUPLX | LR | STATER |
| E30A | 90 | 0000 | | | TP | DSTF |
| E30B | 3D1D | E31D | | | BE | PRNTCOPY |
| | | | | * | | 4. . . . THEN |
| | | | | * | | 5. . . . IF COPIES IN DUPLEX TRAY |
| | | | | *C | | (CIDTF=1) |
| E30D | E6 | 0006 | | | LR | SWST1R |
| E30E | 96 | 0006 | | | TP | CIDTF |
| E30F | 3D1D | E31D | | | BE | PRNTCOPY |
| | | | | * | | 5. . . . THEN |
| | | | | * | | 6. . . . REMEMBER THAT PRESENTLY NO |
| | | | | *C | | ERROR RECOVERY FOR |
| | | | | *C | | PRINT DUPLEX |
| | | | | * | | 6. . . . SET FLAG TO WAIT FOR PRINT |
| | | | | *C | | DUPLEX JOB TO FINISH |
| | | | | *C | | (NTRDYLTF COPYSWF) |
| | | | | | TSMR | LIGHTSR,P(NTRDYLTF) |
| E311 | E9 | 0009 | | | | |
| E312 | AF10 | 0010 | | | | |
| E314 | 89 | 0009 | | | | |
| | | | | | TSMBL | SWST3B,P(COPYSWF) |
| E315 | A637 | 0037 | | | LB | $REK499 |
| | | | | | OI | $CA1500+$CA2500+$CA3500+$CA4500+$CA5500+$CA6500+ $CA7500+X |
| E317 | AF04 | 0004 | | | | $CA8500 |
| E319 | A137 | 0037 | | | STB | $REK499 |
| E31B | 2C6D | E36D | | | B | COPYEX |
| | | | | * | | 5. . . . ELSE |
| | | | | * | | 6. . . . CHECK PGERRCOV SUBROUTINE & |
| | | | | *C | | SET CONDITIONS TO GO TO |
| | | | | *C | | COPYMODE- DONE BELOW TO |
| | | | | *C | | SAVE CODE |
| | | | | * | | 5. . . . ENDIF |
| | | | | * | | 4. . . . ELSE SET UP CONDITIONS TO GO FROM |
| | | | | *C | | PRINT TO COPY MODE |
| | | | | * | | 5. . . . CALL PGERRCOV PAGE ERROR |
| | | | | *C | | RECOVERY SUBROUTINE |
| E31D | 31E8E8 | 0001 | E8E8 | PRNTCOPY | BAL | BAL1,PGERRCOV |
| | | | | * | | 5. . . . SET COPY REQUEST REGISTER = 1 |
| | | | | *C | | (CPYREQR) |
| E320 | 25 | | | | CLA | *** |
| E321 | 2E | | | | A1 | *** |
| E322 | 84 | 0004 | | | STR | CPYREQR |
| | | | | * | | 5. . . . RESET LIGHTLIGHT,DARK, |
| | | | | *C | | ALTERNATE, & DUPLEX IF ON |
| | | | | *C | | (CHNGLTF, CHNGDRKF, |
| | | | | *C | | CHNGALTF, CHNGDUPF) |
| E323 | EF | 000F | | | LR | STATER |
| E324 | A728 | 0228 | | | OBL | CPYCNTLB |
| E326 | A128 | 0228 | | | STBL | CPYCNTLB |
| | | | | * | | 5. . . . SAVE PRINT STATES TO BACKGRND |
| | | | | *C | | (HIGH NIBBLE-STATE2B) |
| | | | | * | | 5. . . . RESET FOREGROUND STATES (DDSTF,, |
| | | | | *C | | LDSTF, SSSTF, DSTF) |

-continued

MICROCODE TABLE IV - COPY MODE INTERRUPTS PRINT MODE

| LOC | OBJ | OP1 | OP2 | | SOURCE STATEMENT |
|---|---|---|---|---|---|
| E328 | EF | 000F | | LR | STATER |
| | | | | SHLM | 4 |
| E329 | 2B | | | | |
| E32A | 2B | | | | |
| E32B | 2B | | | | |
| E32C | 2B | | | | |
| E32D | A12F | 022F | | STBL | STATE2B |
| | | | * | | 5. . . . TURN ON DOCUMENT LAMP (DOCLMPF) |
| | | | * | | 5. . . . SELECT COPY EXIT POCKET |
| | | | *C | | (SELPRNTF=0) |
| | | | | TRMR | FLCNTLR,P(DOCLMPF,SELPRNTF) |
| E32F | E8 | 0008 | | | |
| E330 | AB6F | | | | |
| E332 | 88 | 0008 | | | |
| | | | * | | 5. . . . MOVE PRINT ACTIVE LIGHTS TO |
| | | | *C | | FLASHING & SET COPY LIGHT |
| E333 | E9 | 0009 | | LR | LIGHTSR |
| E334 | A638 | 0238 | | LBL | $LITESFB |
| E336 | 29 | | | TRA | *** |
| E337 | AF40 | 0006 | | TS | COPYLTF |
| E339 | 95 | 0005 | | TP | READLTF |
| E33A | A4 | E33F | | JE | CHKXMITL |
| E33B | 29 | | | TRA | *** |
| E33C | AF80 | 0007 | | TS | READFLF |
| E33E | 29 | | | TRA | *** |
| E33F | 92 | 0002 | CHKXMITL | TP | XMITLTF |
| E340 | 45 | E345 | | JE | CHKRCVL |
| E341 | 29 | | | TRA | *** |
| E342 | AF20 | 0005 | | TS | XMITFLF |
| E344 | 29 | | | TRA | *** |
| E345 | 91 | 0001 | CHKRCVL | TP | RECVLTF |
| E346 | 4B | E34B | | JE | CHKRCDRL |
| E347 | 29 | | | TRA | *** |
| E348 | AF10 | 0004 | | TS | RECVFLF |
| E34A | 29 | | | TRA | *** |
| E34B | 97 | 0007 | CHKRCRDL | TP | RECRDLTF |
| E34C | 29 | | | TRA | *** |
| E34D | 40 | E350 | | JE | SUBEX |
| E34E | AF02 | 0001 | | TS | RECRDFLF |
| E350 | A138 | 0238 | SUBEX | STBL | $LITESFB |
| E352 | 29 | | | TRA | *** |
| E353 | A139 | 0239 | | STBL | $LITES1B |
| | | | * | | 5. . . . RESET NUMBER PAGES & ADJUST |
| | | | *C | | LIGHTS (NUMPGLTF ADJUSLTF) |
| | | | | TRMR | LIGHTSR, P(NUMPGLTF,ADJUSLTF) |
| E355 | E9 | 0009 | | | |
| E356 | AB9F | 009F | | | |
| E358 | 89 | 0009 | | | |
| | | | * | | 5. . . . SET COPY FIRST ENTRY |
| | | | | TSMBL | CONFLG2B,P(CPYFRSTF) |
| E359 | A63D | 003D | | LB | $REK508 |
| | | | | OI | $CA1509+$CA2509+$CA3509+$CA4509+$CA5509+$CA6509+ |
| | | | | | $CA7509 |
| E35B | AF04 | 0004 | | | $CA8509 |
| E35D | A13D | 003D | | STB | $REK508 |
| | | | * | | 5. . . . SET CHANGES ACTIVE FLAG |
| | | | *C | | (CHNGACTF) |
| | | | | TSMBL | STATE1B,P(CHNGACTF) |
| E35F | A63F | 003F | | LB | $REK511 |
| | | | | OI | $CA1512+$CA2512+$CA3512+$CA4512+$CA5512+$CA6512+ |
| | | | | | $CA7512+X |
| E361 | AF02 | 0002 | | | $CA8512 |
| E363 | A13F | 0003F | | STB | $REK511 |
| | | | * | | 5. . . . RESET NOT READY LIGHT (NTRDYLTF) |
| | | | | TRMR | LIGHTSR,P(NTRDYLTF) |
| E365 | E9 | 0009 | | | |
| E366 | B4 | 0004 | | | |
| E367 | 89 | 0009 | | | |
| | | | * | | 5. . . . SET INHIBIT PRINTING FLAG |
| | | | *C | | (PRNTINHF) |
| E368 | EC | 000C | | LR | SOFTJOBR |
| E369 | AF08 | 0003 | | TS | PRNTINHF |
| E36B | A12C | 022C | | STBL | JOBFLGB |

At flow chart block 151, SMP 62 checks for print jams (misfeeds) and maintains the status of the copies requested, copies made, number of originals to be printed, and so forth, SMP 62 takes this print mode data and stores it in memory 64. In the alternative, SMP 62 can be programmed to store the print mode recovery information in NVS 19. In cycling out the print mode in flow chart step 152, which includes instructions stored at address E332, the print active lights are flashing indicating the print job has been interrupted. The cycling out of print mode also is synchronous to an image cycle. That is, a complete print copy has been made by CPP 13 before the copy mode is installed at step 153. When operating in the duplex print mode, because of the precollation of images by precollating image indicating signals, the interim storage unit 40 will never have more than one sheet of paper at a time during production of the first set. In such a situation the copy production machine 10 completes printing the second side of any sheet in interim storage unit 40. Therefore, the copy mode must wait until after a copy sheet has been completely imaged during the print mode. For subsequent sets in the duplex print mode, copy mode interruption occurs at the end of each set as later explained. In in simplex printing, i.e., images on only one side of the copy sheet, interim storage unit 40 is not used.

Included in setting up the copy mode in step 153 are resetting the number of sheets to be printed by CPP 13 and adjusting the lights of the operator's control panel 52 as achieved by the instructions stored beginning at E353.

From flow chart step 153, SMP 62 actuates CMC 16 to execute the copy mode. Since the operation of copy machines in copy modes is well known, that program is not further described for purposes of brevity, it being understood that any form of copy control may be used in connection therewith.

The next major step performed by SMP 62 is shown at flow chart step 154 which detects the end of the active mode and reestablishes the print mode as the foreground operating state of copy production machine 10. The microcode listings for achieving flow chart step 154 are shown in Microcode Table V immediately below.

MICROCODE TABLE V - DEACTIVATE COPY MODE

| LOC | OBJ | OP1 | OP2 | | | SOURCE STATEMENT |
|---|---|---|---|---|---|---|
| E277 | E8 | 0008 | | | LR | FLCNTLR |
| E278 | 94 | 0004 | | | TP | DOCLMPF |
| E279 | 3CA1 | E2A1 | | | BNE | CORYPM |
| | | | | * | | 1. THEN |
| | | | | * | | 2. . . . IF COPIER IS NOT BUSY (CPYBSYF=0) |
| E27B | E6 | 0006 | | | LR | SWST1R |
| E27C | 96 | 0006 | | | TP | CPYBSYF |
| E27D | 3C9F | E29F | | | BNE | LCOPYEX |
| | | | | * | | 2. . . . THEN |
| | | | | * | | 3. . . . IF PRINT SYSTEM IS NOT IDLE |
| | | | | *C | | (PRNTIDLE=0) |
| E27F | EC | 000C | | | LR | SOFTJOBR |
| E280 | 97 | 0007 | | | TP | PRNTIDLF |
| E281 | 346D | E36D | | | BNE | COPYEX |
| | | | | * | | 3. . . . THEN |
| | | | | * | | 4. . . . IF DRIVE IS UP (DRIVESTF=1) |
| E283 | E7 | 0007 | | CIF | LR | SWST2R |
| E284 | 97 | 0007 | | | TP | DRIVESTF |
| E285 | 4E | E28E | | | JE | CIFX |
| | | | | * | | 4. . . . THEN |
| | | | | * | | 5. . . . NOTE SAVE FACT COPY SWITCH |
| | | | | *C | | PUSHED |
| | | | | * | | 5. . . . SET COPY SWITCH (COPYSWF) |
| | | | | | TSMBL | SWST3B,P(COPYSWF) |
| E286 | A637 | 0037 | | | LB | $REK465 |
| | | | | | OI | $CA1466+$CA2466+$CA3466+$CA4466+$CA5466+$CA6466+ $CA7466+X |
| E288 | AF04 | 0004 | | | | $CA8466 |
| E28A | A137 | 0037 | | | STB | $REK465 |
| | | | | * | | BEGIN TIMEOUT COPIER TIME OUT SEGMENT |
| DE7E | E8 | 0008 | | TO | LR | FLCNTLR |
| DE7E | 94 | 0004 | | | TP | DOCLMPF |
| DE80 | 3406 | DF06 | | | BNE | TOPM |
| | | | | * | | 1. THEN |
| | | | | * | | 2. . . . PROCESS CKIDLPRT |
| | | | | | INCLUDE | CKIDLPRT |
| | | | | * | | BEGIN CKIDLPRT (SPLIT FROM TIMEOUT) |
| | | | | * | | 1. IF PRINT SYSTEM IS IDLE (PRNTIDLF=1) |
| DE82 | EC | 000C | | CMNJE | LR | SOFTJOBR |
| DE83 | 97 | 0007 | | | TP | PRNTIDLE |
| DE84 | EDF0 | DEF0 | | | BE | CMNI |
| | | | | * | | 2. . . . ENDIF |
| | | | | * | | 2. . . . IF DRIVE IS LOW & COPIER TIMEOUT HAS |
| | | | | *C | | OCCURRED (DRIVESTF=0 & TIMEOUTF=1) |
| DE73 | E7 | 0007 | | CKHCPYTO | LR | SWST2R |
| DE74 | 97 | 0007 | | | TP | DRIVESTF |
| DE75 | 3413 | DF13 | | | BNE | CHKADINT |
| DE77 | A636 | 0236 | | | LBL | SWST1B |
| DE79 | B6 | 0006 | | | TR | TIMEOUTF |
| DE7A | 3513 | DF13 | | | BE | CHKADINT |
| | | | | * | | 2. . . . THEN |
| | | | | * | | 3. . . . RESET COPIER TIMEOUT FLAG (TIMEOUTF) |
| DE7c | A136 | 0236 | | TOX | STBL | SWST1B |
| | | | | * | | 3. . . . PROCESS TIMEOUT COPIER TIMEOUT |
| | | | | *C | | SEGMENT |
| | | | | * | | 2. . . . ENDIF |
| | | | | * | | 1. ELSE PRINT SYSTEM NOT IDLE |

-continued

| LOC | OBJ | OP1 | OP2 | | | SOURCE STATEMENT |
|---|---|---|---|---|---|---|
| | | | | MICROCODE TABLE V - DEACTIVATE COPY MODE | | |
| | | | | * | | 2. . . . IF DUPLEX TRAY IS EMPTY (CIDTF=0) |
| | | | | * | | 2. . . . THEN |
| DEF0 | E8 | 0008 | | CMNI | LR | FLCNTLR |
| DEF1 | 96 | 0006 | | | TP | CIDTF |
| DEF2 | 3413 | DF13 | | | BNE | CHKADINT |
| | | | | * | | 3. . . . CALL ACTBACK ACTIVATE BACKGROUND |
| | | | | *C | | SUBROUTINE |
| DEF4 | 3174E8 | 0001 | E874 | TIMBACK | BAL | BAL1,ACTBACK |
| E372 | 344A | E44A | | | BNE | READEXIT ACTUALLY A BRANCH TO CKQUN |
| | | | | * | | 5. . . . THEN |
| | | | | * | | 6. . . . IF READ SWITCH WAS SELECTED & |
| | | | | *C | | NOT DUMP OF DUPLEX |
| | | | | *C | | (READSWF=1 & DODIPF=0) |
| E374 | A637 | 0237 | | | LBL | SWST3B |
| E376 | 95 | 0005 | | | TP | READSWF |
| E377 | 354D | 344D | | | BE | CHKRCD |
| E379 | A63F | 023F | | | LBL | STATE1B |
| E37B | 93 | 0003 | | | TP | DODIPF |
| E37C | 344D | E44D | | | BNE | CHKRCD |
| | | | | * | | 1. IF SYSTEM IS IN COPY MODE (DOCLMPF=0) |
| E391 | E8 | 0008 | | | LR | FLCNTLR |
| E392 | 94 | 0004 | | | TP | DOCLMPE |
| E393 | 3CF5 | E35F | | | BNE | READPM GO CHECK PRINT MODE |
| | | | | * | | 1. THEN |
| | | | | * | | 2. . . . IF COPIER IS NOT BUSY (CPYBSYF=0) |
| E395 | E7 | 0007 | | | LR | SWST2R |
| E396 | 96 | 0006 | | | TP | CPYBSYF |
| E397 | 344A | E44A | | | BNE | READEXIT GO EXIT READ SWITCH SEG |
| | | | | * | | 2. . . . THEN |
| | | | | * | | 3. . . . IF DRIVE = 1 & (COPIES IN DUPLEX |
| | | | | *C | | TRAY OR PRINT NOT IDLE) SHOULD |
| | | | | *C | | THIS BE FOR DRIVE=1 ONLY |
| | | | | *C | | ????????? (DRIVESTF=1 & |
| | | | | *C | | CIDTF=1) \| (DRIVESTF=1 & (IDTF=0 |
| | | | | *C | | & PRNTIDLF=0) |
| E399 | 97 | 0007 | | | TP | DRIVESTF |
| E39A | 3DAA | E3AA | | | BE | DRIVEDC |
| | | | | * | | 4. . . . IF COPIES ARE IN DUPLEX TRAY |
| | | | | *C | | (CIDTF=1) |
| E3AA | E6 | 0006 | | DRIVEDC | LR | SWST1R |
| E3AB | 96 | 0006 | | | TP | CIDTF |
| E3AC | 3D89 | E3B9 | | | BE | CHKIPI |
| | | | | * | | 4. . . . ELSE DUPLEX TRAY EMPTY |
| | | | | * | | 5. . . . IF PRINT SYSTEM IS IDLE |
| | | | | *C | | PRNTIDLF=1) |
| E389 | EC | 000C | | CHKIPI | LR | SOFTJOBR |
| E3BA | 97 | 0007 | | | TP | PRNTIDLE |
| | | | | * | | 6. . . . CALL ACTBACK ACTIVATE |
| | | | | *C | | BACKGROUND SUBROUTINE |
| E3F0 | 3174E8 | 0001 | E874 | BCKGRND2 | BAL | BAL1,ACTBACK |

Termination of the active copy mode can be achieved in several ways. The operator may re-press the copy select switch 135 which deactivates the copy mode. At such time the print mode is eligible to be elevated to the foreground operational state of copy production machine 10. The first portion of the microcode program in Table V is for sensing the copy mode switch 135 for reestablishing the activity of the print mode.

A second way of terminating the copy mode activity is a timeout (not shown) in the copier control CMC 61 which supplies a pulse indicating that a predetermined time has elapsed since the last copy was made. At this time the copy production machine 10 MPMC 15 automatically deactivates the copy mode and reactivates the print mode. This is achieved via the sequence of instructions beginning at memory address E372.

Another way of terminating the activity of the copy mode is the selection by an operator of local terminal 16 as an input to the copy production machine 10. This action is achieved by activating read switch 155 on control panel 52. Activation of read switch 155 signifies an operator wishes to go from a copy mode to a word processing input mode for printing copies. Accordingly, copy production machine 10 responds to such an indication on the part of the operator by deactivating the copy mode and reinstituting the activity of the print mode. At this time it should be noted that the print job currently interrupted will be completed before the word processing job requested by the operator will be started.

Upon detecting any of the three above described conditions, SMP 62 actuates the ACTBACK subroutine at memory routine E874 as set forth above in Table I. ACTBACK program is executed by SMP 62 in such a manner as to recover the information in flow chart step 151 such that the print job is reinstituted at the appropriate place and that no print copies are missed and that no excessive print copies are made.

Copy Selection Interruption Point Control

In Duplex and Simplex Printing

In either the simplex (single-sided printing) or the duplex (two-sided printing) made copy production machine 10 can receive images via either local terminal 16 or remote terminal connector 17. In either instance it is desired for throughput considerations to overlap the reception of image indicating signals and text processing of those received image indicating signals with the production of a first set of print copies to be made in accordance with received OCL instructions. Such overlapping and setting up is achieved as shown in steps 160 thru 167 of FIG. 12. In the production of subsequent print sets, all of the image signals have been processed and stored in NVS 19, hence the procedure for printing subsequent print sets varies from that for printing the first print set as will become apparent.

In step 160, MPMC 15 interprets the OCL for setting up a print mode as shown for a duplex print mode. Step 160, in the event of receiving image indicating signals from LT 16, is initiated when the read button switch 155 selects LT 16 as an input source followed by closure of start button 180. Then MPMC 15 actuates LT 16 to read the word processing first card (not shown) previously inserted into inlet slot 137. The first card (not shown) contains OCL indicating signals which include the selection of the duplex mode (duplex mode may also be selected via panel 52) as other parameters such as margins, line spacing, font style, and the like beyond the scope of the present description. In step 160, MPMC 15 decodes the received OCL signals and sends out instruction signals to the various portions of copy production machine 10 for implementing the received OCL. Once the OCL signals have been received and decoded, and copy production machine 10 has been set up for duplex printing operations, the machine is ready to read the second card (not shown) in the stack of cards (not shown) within slot 137. Reading a card (not shown) is performed at step 161 as receiving one image; one word processing card may correspond to one page of print, for example. Two such pages are on one copy sheet. Signals from the reader/recorder (not shown) of local terminal 16 are directed to page memory 64 under control of DMA 64A. Once the image indicating signals are in page memory 64, the completion of the reading of one track or line of a word processing card (not shown) causes LT 16 to signal SMP 62 to begin text processing. Once text processing is completed for the first or subsequent odd numbered pages, they are printed as shown at 162. Simultaneously therewith or in sequence, depending on construction of the machine,—in this particular instance the printing occurs simultaneously with the reception of the second image signals at 163 the second image is received. For odd page printing in duplex mode D, CPP 13 transfers the print copy to interim storage unit (ISU) 40, whereas in the simplex mode S the print copy goes directly from CPP 13 to output portion 14B. In this regard, the interrupt point XS (interrupt during simplex mode) 164 indicates the print production interruption point enabling interruption of the simplex print mode by copy mode selection.

As soon as the steps 162, 163 are completed, the second or subsequent even-numbered image received at 163, having been text processed, can be printed as an even numbered page in step 165. In both simplex and duplex print modes, the print copy goes to output portion 14B. This action represents completion of the printing of one more sheet of copy paper. At this point in time, the sheet of paper in the duplex mode sent to ISU 40 has been retrieved and processed through CPP 13 to output portion 14B. Accordingly, CPP 13 has no interim-stored, partially-completed print copies. CPP 13 is available for interruption in the duplex mode as indicated by the symbol XD 166. Accordingly, during the print copy production of any first print set, copy selection interruption may occur at the completion of the printing of any sheet of paper.

In branch step 167, MPMC determines whether or not the last page of the print set has been received. For example, the OCL decoded in step 160 may contain information indicating that 92 pages are to be printed on 46 sheets of copy paper. In executing the OCL instruction, the number of pages are merely counted through the end of the print job. Steps 161 thru 165 are repeated until the last page has been received from LT 16 or RTC 17 and printed as the first print set, at which time step 168 is entered. This step is a wait step waiting for the first print set to be substantially printed by CPP 13. In this regard, depending upon the error recovery or job receovery techniques employed with copy production machine 10, step 168 may be exited either when the last sheet of paper of the first print set leaves CPP 13, the last sheet has been picked from ISU 40, or the last sheet has been finally deposited in output portion 14B. It is preferred that the MPMC 15 program control exits step 168 to begin the printing of the second and subsequent sets of print copies as soon as the last copy sheet has been deposited in output portion 14B. This selection simplifies automatic job recovery procedures.

It has been stated earlier that the image indicating signals, as text processed by SMP 62, are stored in NVS 19. SMP 62 retrieves those stored image indicating signals in a predetermined order for insuring a proper collated set in output portion 14B. This collation is achieved by printing odd numbered pages first beginning with the highest odd numbered page and proceeding to the lowest odd numbered page. This production sequence of the odd numbered pages places the highest odd numbered page at the bottom of ISU 40 and the lowest odd numbered page as the top sheet in ISU 40. Then MPMC 15 actuates copy production machine to print the even numbered pages beginning with the lowest even numbered page. The first sheet picked from ISU 40 has the lowest odd numbered page. It also receives the lowest even numbered page. CPP 13 then deposits its in the bottom portion of output portion 14B odd numbered page facing down. The second sheet contains the next highest odd numbered page receives the next even numbered page and is deposited on top of the previously printed page in output portion 14B, and so forth. Accordingly, the collated sets as stacked in output portion 14B have the lowest odd numbered page facing downward at the bottom of each print set and the highest even numbered page facing up on top of each print set. The general equation for this procedure is, for even numbered pages, the page being printed at a given instant is $2(N-K)$, where N is the total number of sheets to be printed and K is the number of completed printing cycles for even numbered pages, i.e. page number. In the case of odd numbered pages the page being printed is $2K+1$ until the number of pages equals $2N-1$ where K is the number of complete print cycles in printing odd numbered pages.

Figure 12:
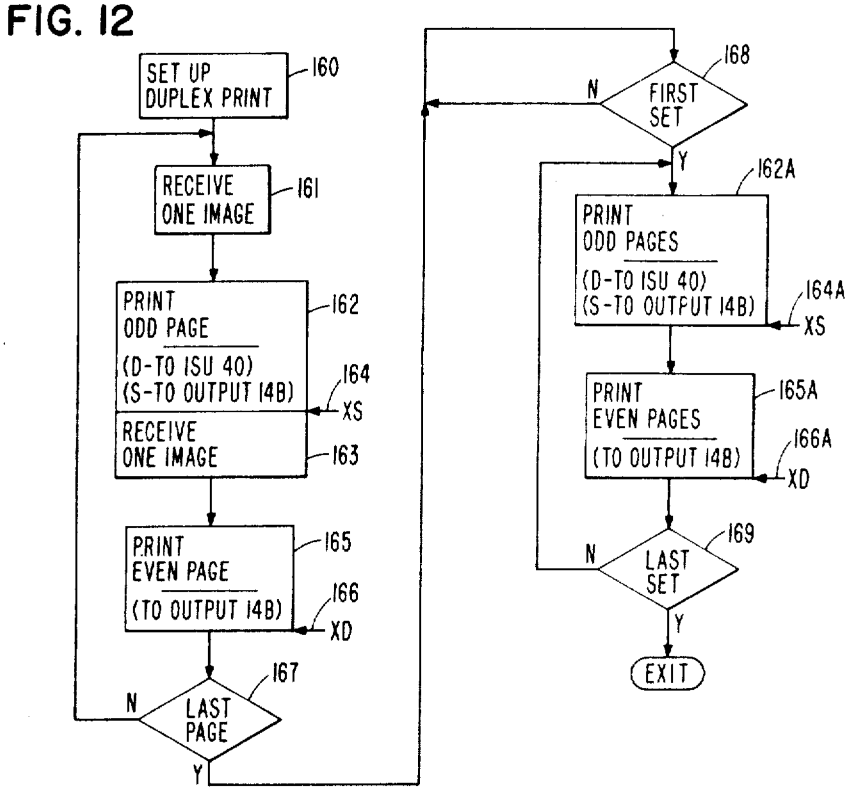
FIG. 12 is a flow chart showing copy selection interrupt of an active print mode in simplex and duplex copy printing operations showing sheet and set copy interrupt synchronization points.

In FIG. 12, step 162A executed by SMP 62 actuates copy production machine 10 to print the odd numbered pages and supply them to ISU 40 as above described. Then, at step 165A, copy production machine 10 prints the even numbered pages and supplies the printed pages to output portion 14B. Upon completion of step 165A all print copies have been removed from CPP 13 and supplied to output portion 14B. At this point CPP 13 is available for copy selection interrupt as indicated by the symbol XD 166A. At all other times during the execution of steps 162A, and 165A, copies reside in ISU 40. Since a copy selection may employ the duplex mode and since ISU 40 is shared between the copy mode and the print mode, CPP 13 must be clear of copies prior to permitting copy mode interruption. Of course, in a simplex mode any completion of each page allows interruptions, such as at access 164, i.e. copy mode interruption of the simplex print mode is at the end of each sheet.

From step 165, SMP 62 enters branch step 169. In step 169, SMP 62 determines whether or not the last set has been successfully printed and supplied to output portion 14B. If not, steps 162A and 165A are repeated for printing successive sets. After the last set has been successfully printed, the program is exited and the copy mode is again set up as the inactive foreground mode as described above.

Copy Selection Interruption Timing Control

Figure 13:
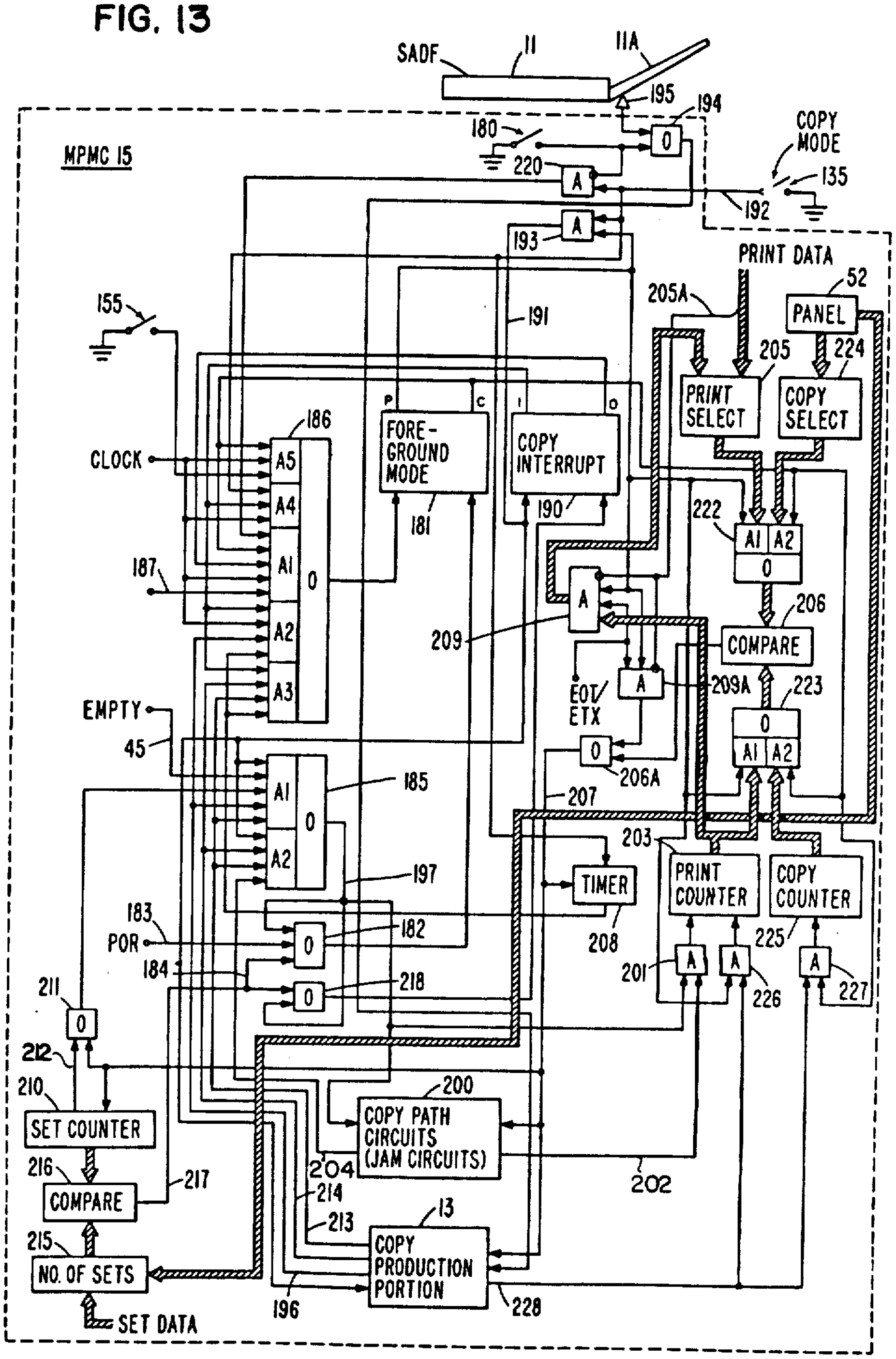
FIG. 13 is a diagram showing circuits for AND logic of print mode interrupt by a copy selection for maintaining print mode print copy count.

FIG. 13 illustrates the logic for determining when to interrupt the print mode. Auxiliary control logic for sequencing CPP 13 is not shown for simplifying the description and for making it more pertinent to the subject matter of the invention. The foreground mode is indicated by latch 181, the output P indicating print mode and output C indicating copy mode. Latch 181 is set to the C state via OR circuit 182 by the POR signal on line 183 during power on reset, upon completion of a print job by the signal on line 184 (and later explained), or by the output of AO (AND input, OR output) circuit 185 via line 197 for timing a copy selection interrupt. Latch 181 is set to the P state by AO circuit 186 at the end of a copy interrupt function or when the copy mode is inactive but still in the foreground state and a print request is received over line 187.

Copy interrupt latch 190 memorizes a copy selection interrupt request such that the illustrated circuits can force foreground mode latch 181 to the copy foreground state at the appropriate copy interrupt time. Copy interrupt latch 190 is set to the interrupt active state upon receiving a copy interrupt request signal over line 191. Such an interrupt signal can be generated in diverse ways. A copy interruption cycle is conditioned for activation by actuation of copy mode switch 135 which sets a memory latch (not shown) memorizing a single depression of the switch. Copy production machine 10 then becomes active in the copy mode. Start button 180 then can start actual copy production in the copy mode via OR circuit 194 which sends a copy request signal to CPP 13. Alternately, preentry switch 195 being actuated by an operator inserting a document into SADF 11 actuates copy production in the copy mode. Actuation of CPP 13 in the copy mode the same as Copier Series III is which is manufactured by International Business Machines Corporation, Armonk, N.Y. The above described control arrangement does not enable the operator to inhibit copy selection interruption of a print mode job. The copy mode is selected and must be deselected by timer 208 (later described) or terminated as described elsewhere. To enable operator override of the copy selection interrupt, a second depression of copy mode switch 135 can be made to reset the memory latch (not shown) removing the copy mode request selection.

When the copy mode is selected, an enabling signal travels over line 192 priming AND (circuit or interrupt detector) 193. AND circuit 193 is then enabled by the foreground mode latch 181 being in the P state. Copy interrupt latch 190 does not at that time actually interrupt copy production machine 10 print foreground mode. Actual timed interruption is determined by the logic of operations described below.

The copy selection interrupt can also be made dependent on OR circuit 194 indicating that the operator has readied the copy production machine 10 for copying. That is, the interrupt signal on line 191 would then be supplied by AND circuit 193 only when an output from OR circuit 194 indicates that start button 180 of panel 52 has been activated or the pre-entry switch 195 indicates a document resides in document tray 11A simultaneously with or after the copy mode switch 135 was activated and copy production machine 10 is in a print foreground mode. (This alternative is not shown in FIG. 13.)

In timing the interruption, AO circuit 185 responds to predetermined conditions to set foreground mode latch 181 to the copy state. The signal on line 191 goes to both the A1 and A2 AND circuit input portions of A0 185. The A1 input portion in one version interrupts the print mode when duplex has been selected in CPP 13 as indicated by a duplex signal on line 196 and ISU (Interim Storage Unit) 40 has switch 41 (FIG. 1B) supplying a signal over line 45 indicating whether or not a copy is in the storage unit. When switch 41 indicates ISU 40 is empty, the empty signal on line 45 completes the enablement of the A1 inout portion for supplying a latch setting signal over line 197 and through OR circuit 182 setting foreground mode latch to the C state. It is also preferred that all copies made for a print mode job be clear of CPP 13 before copy selection interrupt can occur. Jam circuits 200 supply a "paper path clear" signal over line 204 to both A1 and A2 input portions of A0 185 for inhibiting the interrupt until the paper path (not shown) of CPP 13 is clear.

Simultaneously with the above described actions, the timed copy selection interrupt signal on line 197 conditions copy path or jam detection circuits 200 for handling the transition between the print mode and the copy mode. Further, the line 197 timed copy selection interruption signal conditions AND circuit 201 to pass any jam correcting signals from jam circuits 200 received over line 202. Since the present invention is not concerned with job recovery of a paper jam occurring at the transition between the print mode and the copy mode, the operation of AND circuit 201 is not further described. Print counter 203 contains a count indicating the number of sheets of paper picked from blank paper supply 35 (FIG. 1). If three sheets of print copies are lost because of a jam, then three is substracted from the count in counter 203 via AND 201 for ensuring completion of the print job even under error conditions. Operation of counter 203 and the tally of copies produced will be described later.

In setting foreground mode latch 181 to the C state, the A1 input portion of A0 185 is also controlled by the copy production state in the duplex mode. In this regard the general counter control of copy production machine 10 for producing plural print sets will be described before the control of A0 185 is described. The number of pages to a print set may not be registered within copy production machine 10. Accordingly, during printing the first print set, the pages are counted in print counter 203, then transferred to print select register 205 when EOT or ETX (later described) signals indicate end of a print job set of print signals. AND circuits 209 respond to EOT/ETX in the print mode (latch 181 in P state) to pass the counter 203 signals. Simultaneously, AND circuit 209A passes the EOT-/ETX signal via OR circuit 206A as a later described end of set or complete signal on line 207.

On the other hand, OCL could contain signals indicating the number of sheets in a print set. In such an instance, decoded print data is inserted into print select register 205 with a decoded inhibit signal supplied over line 205A to inhibit operation of AND circuits 209 and 209A. That is, OCL signals previously decoded by MPMC 15 may include print data signals stored in print select register 205 which indicates the number of pages to be produced in one print set, for example, as stated above, 92 pages were printed in a print set. These 92 pages require 46 sheets; therefore, print select register 205 is set to 92 for counting the pages. Such print data signals could be either from OCL or from the control panel 52.

Compare circuit 206 compares the signal contents of print select register 205 and print counter 203 to determine when one print set has been printed. Compare circuit 206 then emits a complete signal over line 207 to CPP 13, jam circuits 200, timer 208 (used in the copy mode), and to print set counter 210. The complete signal also travels through OR circuit 211 for completing enablement of the A1 input portion of A0 185 for setting foreground mode latch 181 to the C state thereby effecting interruption of the print mode when one print set been completed.

It will be remembered that during the production of the first set the completion of even even numbered image production enables a copy selection interrupt. In this regard, print-set counter 210 supplies its "count equal to one" signal over line 212 through OR circuit 211 to enable the A1 input portion of A0 185 during the production of the first print set enabling interruption after production of any even numbered print copies. Additionally, it is desired to have the interruption actually occur in the predetermined portion of a print copy cycle. This timing is determined by CPP 13 supplying a timing signal over line 213 to both the A1 and A2 input portions of A0 185. Such timing signal is emitted at a predetermined synchronous point in CPP 13 cycles of operation determined by the operational characteristics of copy production. Therefore, the signal supplied by A0 185 over line 197 is synchronous to the operation of CPP 13.

The copy selection interruption of a simplex print mode is achieved through the A2 input portion of A0 185. This interruption occurs when the signal from line 207, the timing signal on line 213, the line 191 copy select signal, and a simplex operation mode indicating signal on line 214 supplied by CPP 13 are all simultaneously active.

Termination of the print mode is determined by print set counter 210 reaching equality with the requested number of sets in print set selection register 215 previously set either from panel 52 or by MPMC 15 responding to OCL signals. When MPMC 15 detects no OCL print set count, register 215 is conditioned to receive panel 52 ten key count input as well known in the arts. Compare circuit 216 supplies a print mode terminating signal over line 217, thence to line 184 and OR circuit 182 for setting foreground mode latch 181 to the C state. Simultaneously, the line 217 print mode termination signal flows through OR circuit 218 resetting copy interrupt latch 190 to the zero, or noninterrupt, state. That is, since copy production machine 10 has been returned to the foreground copy mode, the copy interrupt latch should be in a noninterrupt mode.

A0 circuit 186 sets foreground mode latch 181 to the print mode upon completion of the copy interrupt operation upon receiving a print request over line 187 when the copy mode is inactive or when copy mode (interrupt activated or otherwise) is overridden by operator selection. The copy mode being inactive is indicated by the C state of foreground mode latch 181 and copy interrupt latch 190 being reset and the output of AND circuit 220 indicating that start button 180 has not been actuated when copy mode switch 135 was selected. The A1 input portion of A0 186 then responds to a line 187 print request signal to set latch 181 to the P state.

The A2 and A3 input portions reset the copy mode to the print mode upon the termination of a copy selection interruption function. The A2 input portion responds to the duplex indicating signal received over line 196 from CPP 13. The copy interrupt latch active signal received from latch 190 indicating the copy mode was active because of a copy interrupt and the output of timer 208 to set the foreground mode latch 181 to the P state while resetting copy interrupt latch 190 to the noninterrupt state. A3 input portion to A0 186 performs the same function in the simplex mode. Deselection of the copy mode after an interrupt is detected by the A4 input portion of A0 186 for performing the same function. In this regard it may be noted that copy mode selection switch 135, when actuated in the copy mode, deselects the copy mode. During a copy mode run, switch 135 and start switch 180 are deactivated by circuits not shown. Actuating read switch 155 when the copy mode is the foreground mode (latch 181 is in the C state) actuates the A5 input portion of A0 186 to deselect the copy mode and activate the print mode. The read switch requests LT 16 to read a word processing card from slot 137. Therefore, such request is considered an operator override of copy mode selection including copy selection interrupt.

Compare circuit 206, which indicates the completion of a print set production, is also used in conjunction with copy production in the copy mode and the indication of the completion of a copy set. A difference between a print set and a copy set is that the print set contains a plurality of images corresponding to one complete set of original document image whereas a copy set is a plurality of reproductions of the same image from one original document. A pair of AND/OR circuits 222 and 223, respectively, provide selection and copy count input to compare circuit 206. The A1 input portions of A0s 222 gate the signal contents of print select register 205 to compare circuit 206 when foreground mode latch 181 has been set to the P state. Similarly, the A1 input portions of A0s 223 gate the signal contents of print counter 203 to compare 206 during the print mode. Similarly, a panel 52 selection indicates to copy production machine 10 the number of copies to be produced in the copy run. Copy select register 224 memorizes the selection and supplies its signal contents through the A2 input portions of A0s 222 during the copy mode. Similarly, copy counter 225 counts the copies during the copy mode and supplies such copy count through the A2 input portions of A0s 223 to compare 206. Compare circuits 206 operate identically in both the print and copy modes.

The A2 input portions of A0s 222, 223 respond to the C state of foreground mode latch 181 for passing the above-described signals. Further, AND circuits 226, 227 respond respectively to the P and C states of latch 181 to pass the copy count indicating signals supplied over line 228 by CPP 13 to counters 203 and 225, respectively. Operation of these circuits is well known and not further described. Further, during the interrupt, the signal on line 191 may go to CPP 13 for inhibiting further paper picking until completion of print mode selection.

In a constructed embodiment of the invention, it is preferred that the logic of operations illustrated in FIG. 13 be performed by microcode in SMP 62 and CMP 170. In this regard SMP 62 contains programming corresponding to the operation of set control circuits 210, 215, 216, foreground mode latch 181, copy interrupt latch 190, as well as mode selections. CMP 170 contains programming for performing the functions represented by circuit elements 205, 224, 222, 206, 223, 203 and 225. Jam circuits 200 are preferably primarily known hardware circuits for performing the detection and jam control functions. With respect to jam recovery and job recovery it is preferred that the computer programming in SMP 62 cooperate with the computer programming in CMP 170 for effecting a complete job recovery. Such job recovery techniques are beyond the scope of the present description. Programming required to effect a programmed constructed embodiment of the present invention is believed to be well within the skill of the ordinary programmer who can understand the logical operations described with respect to FIG. 13. Such combination of programming and response of computer circuits to such computer programming or the illustrated hardware logic circuits is couched in terms of means plus a function in several of the apparatus claims.

Image-Indicating Signal Source Selection and Control

Figure 14:
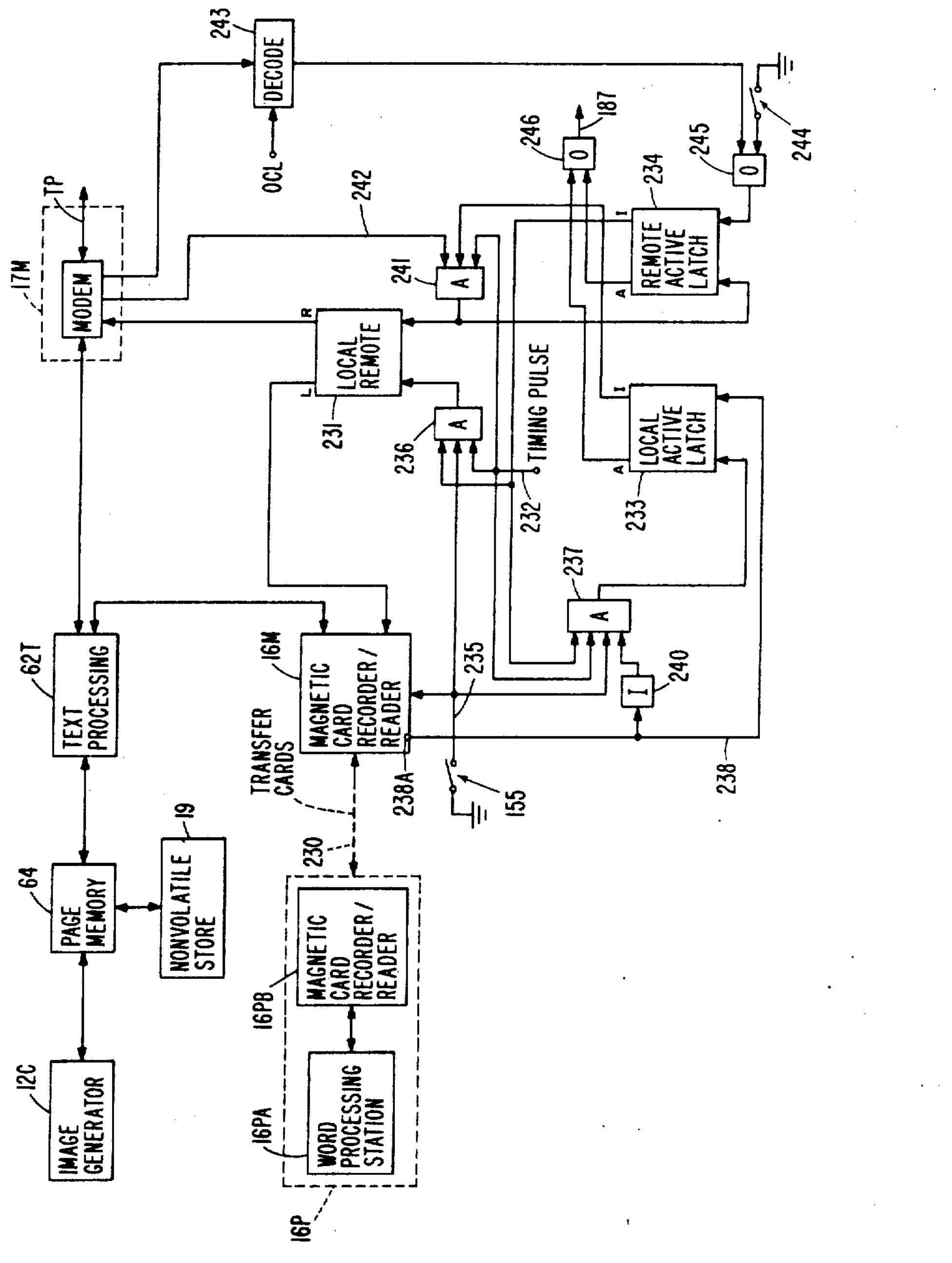
FIG. 14 is a diagram of circuits for AND logic of alternating image sources in the print mode.

FIG. 14 illustrated circuits show the logic of selection between local terminal LT 16 and remote terminal connector 17 as image sources for image generator 12C which is a portion of the laser input 12B. Text signal flow can come from the remote terminal connector 17, illustrated in FIG. 14 as a modem 17M. The signals from modem 17M are text processed at 62T which is a symbolic representation of the text processing computer programs (not shown) residing in ROS (or RAM) control store 63, (FIG. 2) for example, or alternatively in page memory 64 and operated upon by SMP 62. The text processed signals are temporarily stored in page memory 64, as previously described. From page memory 64, the text processed signals are transferred to image generator 12C for generating images on copy sheets as described above. The text processed signals in page memory 64 are also transferred under SMP 62 control to nonvolatile store 19 for use in production of the second and subsequent print sets. Similarly, local terminal 16 is shown in FIG. 14 as magnetic card recorder/reader 16M. Signals from recorder/reader 16M are text processed at 62T and thereafter treated within copy production machine 10 the same as those image indicating signals or text signals received via modem 17M.

The signals in recorder/reader 16M are generally generated in the same physical proximity with copy production machine 10, no limitation thereto intended. That is, a word processing apparatus 16P includes a word processing station 16PA which includes a typewriter, a memory for storing text or word processing signals, and associated control circuits, such as used in the Magnetic Card Selectric Typewriter Model II produced by International Business Machines Corporation, Armonk, New York. Also in apparatus 16P is a magnetic card recorder/reader 16PB. Magnetic cards are recorded under control of the word processing station 16PA by recorder/reader 16PB. Once the cards are recorded, which includes recording a top or a lead card for the OCL signals, the cards are manually transferred as indicated by the double-headed arrow 230 to recorder/reader 16M by inserting same in slot 137 (FIG. 1B). Reader 16M then reads the previously recorded text signals and supplies same to page memory 64 as previously described as image indicating signals. Similarly, recorder/reader 16M may receive text processed signals via logic step 62T for recording same on magnetic cards. Magnetic cards are then transferred to the recorder/reader 16PB as indicated by double-headed arrow 130 for production of word processing station 16PA. Further, signals received via modem 17M can be text processed by copy production machine 10 and then recorded on magnetic the card being recorder/reader 16M, cards transferred as indicated by double-headed arrow 230 for operation by word processing station 16PA or for storage in a central file in a copy production room (not shown). Also, it should be noted that the received signals recorded on recorder/reader 16M can also be supplied to image generator 12C for copy production.

It is apparent because of the serial path including items 62T, 64, 12C that either but not both modem 17M and reader/recorder 16M can be used at a given time. As constructed in the illustrated copy production machine 10, receipt of signals by copy production machine 10 is alternated on a job group basis between modem 17M and reader 16M. Control is effected by local-remote latch 231 which activates modem 17M in the remote (or R) signal state and reader/recorder 16M in the local (or L) signal state. Switching between the L and R states is under control of a timing pulse received over line 232 from clock 75 and hence is synchronous with respect to the operation of CPP 13. A pair of latches 233, 234 respectively indicate whether the local or remote image sources are active. When both latches 233, 234 are in the I state (inactive), neither image source is receiving signals. Only one of the two latches 233, 234 can be in the A or active state at a given time.

Assume that both image sources are inactive. To select LT 16, the operator actuates read switch 155 on control panel 52. Actuation of switch 155 sets a latch (not shown) which memorizes that a read selection has been made. Cancel switch 244 resets the latch (not shown) deselecting the read selection. Assume that switch 155 has been actuated to supply a read request signal over line 235 signalling magnetic card reader/recorder 16M that a read selection has been made. Recorder/reader 16M responds by turning on certain motors and doing some automatic preparatory steps for reading the cards inserted into slot 137 (FIG. 1B). The line 235 read request signal also goes to AND circuit 236 for setting local-remote latch 231 to the L state. The only other requirement for setting local-remote latch 231 to the L state is that latch 234 is in the I state. Simultaneously, the line 235 signal also goes to AND circuit 237 for setting local active latch 233 to the A state. This action is achieved at timing pulse 232 time when latch 234 is in the I state and cards have been inserted into the slot 137. Recorder/reader 16M has a sensing switch 238A sensing the presence of magnetic record cards in slot 137. Line 238 carries the signal indicating that no cards are in slot 137 and resets local-active latch 233 to the I state. Inverting circuit 240 inverts the hopper or slot empty signal on line 238 for activating AND circuit 237 whenever cards are in slot 137. AND circuit 237, having sensed all of the input conditions are being fulfilled, sets latch 233 to the active state thereby indicating that recorder/reader 16M is to supply image indicating signals as an image source for image generator 12C.

Similarly, remote active latch 234 is set to the active or A state whenever local remote latch 231 is in the R state by AND circuit 241. AND circuit 241 responds to the timing pulse on line 232, local active latch 233 being in the I state and a request received over line 242 from modem 17M indicating signals are to be received by telephone line TP to set local remote latch 231 to the R state while simultaneously setting latch 234 to the A state. Latch 234 remains in the A state and local remote latch 231 remains in the R state until signals are received by modem 17M from the communication system indicated by line TP that the communication session has been terminated. Termination of the communication session (job group) is detected by decode circuit 243 responding to a preset condition set by SMP 62 in response to OCL decoded signals. When the proper code has been detected by decode 243, latch 234 is set to the I state freeing copy production machine 10 to receive image signals from recorder/reader 16M.

There are three states of control for decode 243. The first two respond respectively to EOT (end of transmission) or ETX (end of text) coded signals received over TP by modem 17M. In response to receiving these signals, when conditioned by the OCL language signals via SMP 62, decode 243 sets the remote active latch to the I state. Until these control signals are received, copy production machine 10 is in the so-called receive mode for receiving signals over line TP. Although FIG. 14 shows that decode 243 receives signals directly from modem 17M it is to be understood that the functions of illustrated modem 17M include not only signal communication functions but also text analysis functions which include analysis and decoding of OCL signals. All of the latter two functions are preferably performed by SMP 62 in computer program form, hence, SMP 62 performs communication related tasks. Therefore, decode 243 in a constructed embodiment preferably comprises of a computer program routine decoding the received TP line signals.

The third state for OCL control of copy production machine 10 is a so-called dedicated receive mode wherein the OCL signals received over line TP indicate that the communication session is not to be terminated. Accordingly, when a receive mode is established in copy production machine 10 remotely via control signals received over line TP, copy production machine 10 is maintained in the receive mode until manual intervention is achieved at control panel 52 by an operator actuating a cancel button 244 which resets remote active latch 234 to the I state thereby disengaging machine 10 from the dedicated receive mode. OR circuit 245 combines the signals from decode 243 and cancel switch 244 for resetting latch 234.

When either latch 233 or 234 are in the active state, indicating that image indicating signals are to be transferred to image generator 12C, OR circuit 246 passes such active signals to line 187 as a print request signal for A0 186, described with respect to FIG. 13. Accordingly, when the OCL language signals received over line TP set decode 243 to a nonterminating condition, latch 234 remains in the A state until a signal from cancel button 244 has been received. Therefore, by the OCL programming of document production machine 10 via the OCL control of decode 243, the print mode becomes a programmed "permanent" foreground mode of operation as opposed to the copy mode being the dominant foreground mode. This mode state is maintained irrespective of whether or not CPP 13 is actively producing copies from images supplied by modem 17M. Accordingly, copy production machine 10 can have a foreground mode of convenience copying when in the inactive state or a print mode when in the dedicated receive state. In the latter dedicated receive condition all copy requests result in a copy interrupt of the programmed but inactive print foreground mode.

When in the dedicated receive mode copy production machine 10 can still recognize OCL signals interleaved among signals supplied over line TP for changing the dedicated receive mode to a mode for terminating the communication session by either EOT or ETX; that is, copy production machine 10 can be initially set up at the beginning of a work shift in a dedicated receive mode, then later in the day under remote control, OCL signals can be transferred changing the dedicated receive mode to that of selected communication session termination by EOT or ETX.

From all of the above it is readily seen that the type of controls provided by the present invention in the utilization of CPP 13 for producing copies from diverse image sources results in a maximal utilization of the copy production machine while maintaining convenience copying facilities in a word processing area. While a copy production machine has been illustrated as a transfer electrographic copy producer, no limitation thereto is intended. For example, so-called noncontact printing of the ink jet type may be equally employed with success; impact printers may also be used. Further, while the invention has been described in the word processing environment, the use of image transfer such as facsimile, i.e., pictures can be imposed on copy production machine 10 interleaved with text signals, all of the latter being determined by the construction of image generator 12C as well as the programming of MPMC 15 in controlling copy production machine 10.

It should also be noted that the termination of a local image input is based upon slot 137 sensing switch 238A indicating no more cards in recorder/reader 16M. Accordingly, recorder/reader 16M when activated can contain a plurality of actual print jobs and maintain reader/recorder 16M as the image source for image generator 12C throughout a succession of such jobs, that is, or example, four OCL cards may be interposed in slot 137 such that four word processing print jobs can be automatically performed by copy production machine 10 in active succession. Further, if a print job is being performed by copy production machine 10 and additional cards are added to slot 137, copy production machine 10 will then respond to those newly added cards before allowing modem 17M to receive text signals in a receive mode. Accordingly, remote control of copy production remote image indicating signals whereas the local terminal 16 can also be programmed via the insertion of cards in slot 137 for maintaining a dedicated print mode in copy production machine 10 for receiving locally generated images. On the other hand, recorder/reader 16M and copy production machine 10 may be programmed to respond to detecting an OCL card in slot 137 for sensing whether or not signals are to be received via modem 17M thereby allowing a greater interleaving of images being received locally and remotely. However, it is believed that the arrangement shown in FIG. 14 wherein hopper or slot 137 must be empty of cards is a convenient control mechanism for copy production machine 10 in that all local jobs are grouped together in output portion 14B whereas all remote generated jobs received via modem 17M are also grouped together in output portion 14B. The programming represented by FIG. 14 circuits therefore enables job grouping by image sources while enabling convenience copying interruption of those grouped print jobs without interferring with such print functions. Separate output portions can also be provided for each image signal source. Such image sources can be based on image bearing documents, electrical signal sources, and the like. Instead of determining a foreground mode and a background mode when no copies are being produced, an IDLE mode can be established. An IDLE mode deselects both copy and print mode, i.e., both copy mode and print mode are background modes. There may also be more image sources with an operational mode associated with each source with a hierarchy of interruption levels for copy production. Each image source may or may not have an associated output portion, either dedicated by hardware design or dynamically under program control. A single output portion may be shown by offsetting copies from the various image sources. The copy production interruption may take the form of dynamic interleaving as described above.

In the copy mode, the copy production machine operates as any convenience copier; the number of copies are predetermined usually via panel 52. In the print mode, the panel 52 selections on the OCL select the number of print sets to be produced. Until the first print set has been printed, the number of pages in a print set are unknown or not registered in copy production machine 10, i.e., a predetermined number of print sets are to be produced, each print set having an indeterminate number of pages. Each print set can be produced without actually counting the pages in each set. Since NVS 19 contains image indicating signals for all pages of a set, CMP 62 merely reads all recorded image-indicating signals for a set to produce a printed set. Of course, billing meter M tallies the number of sheets employed in producing the print set. Counting the number of pages in a set and knowing the number of pages to a set facilitates error recovery, a subject beyond the scope of the present invention.

In the duplex print mode, SMP 62 is preferably programmed so that the number of print set pages is always even. For an odd number of received images (in the physical form of image-indicating signals), an additional page (blank) is added to the odd-numbered page duplex print set. Instead of printing the last image as a blank page, CPP 13 can be constrained in operation so that photoconductor drum 20 receives no toner ink, i.e., CPP 13 operates in a so-called dummy or no transfer cycle for keeping the last page blank.

There is no copy production machine control over the number of pages to be included in a print set. Copy production machine 10 has interim storage unit 40 used in the duplex print mode. The finite capacity of this unit could be executed in any given print set. When this situation arises, the print job is automatically divided into parts determined by the capacity of interim storage unit 40. For example, when interim storage unit 40 has a capacity of 100 sheets, each 500 page (250 sheets) print job for 43 print sets is handled as follows. NVS 19 receives the first 200 pages of the print job as described in steps 121-126 of FIG. 9. When 200 images (100 sheets of printing in duplex print mode) have been received, RTC 17 or LT 16, as appropriate, is put in a hold status while LI 12B and CPP 13 print the first 100 sheets of all 43 print sets and supply same to output portion 14B. Then, SMP 62 under program control, automatically restarts RTC 17 or LT 16 to receive the next 200 images. Then, RTC 17/LT 16 is again put on hold while LI 12B and CPP 13 supply the next 100 sheets of duplex copies to output portion 14B. The last 50 sheets of 100 images are handled in a like manner, all as shown in FIG. 9, except for the automatic job requesting to accommodate limited capacity of copy production machine 10 while automatically performing a complete print job having a requirement exceeding capacity of copy production machine 10. The same technique is employed when NVS 19 fills up with a partial print job image-indicating signals.

In the event blank paper supply 35 becomes empty, all print operations of copy production machine 10 cease. In the print mode, it is preferred that the receipt of image indicating signals may continue until page memory 64 is filled or 200 images have been received. Alternately, receipt of image indicating signals may also be interrupted.

As stated above, various text parameters are imposed upon copy production machine 10 via OCL. In some instances, OCL may not include sufficient parameters for successfully doing a print job. In such an instance document production machine 10 via SMP 62 scans the panel for those parameters insertable by an operator, for example, duplex mode, number of copies, and so forth. If there are no appropriate panel selections, then SMP 62 fetches default parameters data from NVS 19. That is, upon initializing, document production machine 10 NVS 19 stores so-called default parameters for operation of document production machine 10. In the absence of any parameter selection, these stored default parameters are fetched by SMP 62 and inserted for text processing purposes and subsequent printing of copies. Accordingly, the parameter selection hierarchy is OCL first, panel second (limited selections), and finally default parameters stored in NVS 19. Further, a plurality of default sets may be stored on NVS 19. For example, it may be desirable to have a first set of default parameters for signals received over the communication line via RTC 17 and a second set of default parameters for the word processing input from LT 16. Other variations on selection of text processing parameters can be easily envisioned. Of course, when the panel is being used in an active copy mode, the panel selections are disregarded. This means when copies are being produced in a copy mode, panel selection buttons are disabled; at all other times the buttons are enabled.

The interruption of the print mode by the copy mode and vice versa illustrates dynamic interleaving of image sources for producing diverse copies of the copy and print type with a single CPP 13. As described for a constructed embodiment, a photoconductor drum 20 has a pair of image areas for transferring images to copy sheets. When interrupting the print mode, the copy mode has exclusive use of the image areas. No such limitation thereto is intended. For example, depending upon the characteristics of the automatic image sources, i.e., RTC 17 and LT 16, it may be desirable to limit the number of copies made in a given copy mode run so as not to delay operation of the image sources in an unduly manner. Primarily, cost considerations will affect this decision. Accordingly, in a print mode that is interruptible by a copy mode, the copy mode functions can be dynamically interleaved with print mode functions on a one out of two image area basis, one out of four image area basis, and so forth. Such is particularly easily implemented in a belt type of xerographic reproduction section CPP 13 wherein, for example, seven image areas on a belt. In such a case, one, two, or more displaced or adjacent image areas may be intermittently or repeatedly assigned the copy mode upon receiving a copy mode interrupt request. In any event, many instances may require a judicious balancing between copy mode operations and print mode operations. In a broader sense, images received from diverse image sources are dynamically interleaved in a single CPP 13 and supplied to the similar diverse output portions. Of course, in all these dynamic interleaving design decisions, jam recovery aspects must be fully considered.

The number and types of image sources that can be used with the present invention are substantially unlimited. The constructed embodiment combines an optical image source with an electrical image source. Image sources may be all optical such as that provided by a semiautomatic document feed, plus a manual feed (not shown), a semiautomatic document feed and an automatic document feed which supplies successive originals from a stack of documents to be reproduced. Alternatively, the image sources may be all electronic. For example, the SADF 11 may be replaced by an electrical scanning system which scans a document to be reproduced and produces noncoded information signals which then, in turn, are supplied to LI 12 for operation as aforedescribed when in a facsimile mode. Further, word processing and analog (facsimile) signals may be dynamically interleaved as well, the latter being determined by the characteristics of LI 12, the details of which are beyond the present invention.

While the invention has been particularly shown and described with reference to preferred embodiments thereof, it will be understood by those skilled in the art that various changes in form and details may be made therein without departing from the spirit and scope of the invention.

What is claimed is:

1. A copy production machine having an image processing portion for printing successive images on copy sheets to produce copies, a plurality of copy output units, a first image source operatively connected to said portion for automatically supplying images to said portion to automatically produce print copies, a second image source operatively connected to said portion and capable of supplying at least one image to said portion to produce a convenience copy from said supplied image, interrupt means to indicate a given copy is to be made by one of said image sources, control means responsive to said interrupt means indicating said given copy is to be made by said one image source to interrupt operation of another of said image sources to enable copy production based on an image supplied by said one image source interleaved with copy production based on images supplied by said another image source and, means responsive to said control means to separate copies made from said image sources to two of said separate output units, respectively, so that said image sources can operate independently of each other.

2. The copy production machine set forth in claim 1 wherein said second image source includes a semiautomatic document feed (SADF).

3. The copy production machine set forth in claim 1 wherein said interrupt means includes manually actuated means to select copy production from said second image source means.

4. The copy production machine set forth in claim 1 wherein said first image source includes means for receiving electrical signals indicative of an image to be used in copy production.

5. The copy production machine set forth in claim 1 wherein said control means includes a programmable computer, a memory for containing instruction word signals for said computer, an electrically alterable nonvolatile memory addressable by said computer and for storing image-indicating signals, and said first image source connected to said computer for receiving image defining electrical signals.

6. The copy production machine set forth in claim 1 wherein said first image source includes means for receiving electrical signals indicative of an image to be used in copy production, means in said first image source to create an optical image from said received signals and to supply said optical image to said image processing portion for copy production, a word processing station for receiving word processing documents having word processing indicia, reader means in said word processing station to sense said word processing indicia and means to supply electrical signals in accordance with said word processing indicia as said image-indicating signals to said first image source.

7. The copy production machine set forth in claim 1 wherein said one image source is said second image source and said another image source is said first image source, said second image source being a slower copy producing source than said first image source and said interrupt means enables said slower producing source to interleave slower and normally shorter duration copy production with said automatic copy production.

8. The copy production machine set forth in claim 7 further including means indicating an image breakpoint in said first image source successive image processing, said image processing portion indicating a copy production breakpoint, and interrupt control means in said control means for timing said interruption in accordance with both said breakpoint indications.

9. The copy production machine set forth in claim 1 wherein:

said first image source includes an image cycle indicator for indicating interruption points, and means in said control means responsive to said interrupt means and said image cycle indicator to interrupt said first image source.

10. The copy production machine set forth in claim 1 wherein said image processing portion includes copy production cycles and cycle indicating means indicating a copy production interruptible point in a given one of said cycles, and means in said control means responsive to said cycle indicating means to enable interruption of said first image source.

11. The copy production machine set forth in claim 1, further including word processing means supplying signals indicative of a word processing document, said first image source having means responsive to said word processing signals to generate an image to be printed and supplying said image to said image processing portion, said second image source including a document glass for receiving an original document to be copied, means indicating that an original document is to be placed in copying position on said document glass, and said interrupt means being responsive to said original document indication for enabling indicating a copy is to be made by said second source.

12. The copy production machine set forth in claim 11 further including in combination, means in said first image source for receiving data processing signals and for supplying same to said word processing signal receiving means as word processing signals.

13. The copy production machine set forth in claim 12 wherein said second image source includes means for receiving manually inserted original documents, manually actuatable means for indicating copy production parameters associated with copy production from an image on said inserted original documents, and said interrupt means including manually actuable means to indicate desired interruption of copy production from said first image source for copy production from images to be supplied by said second image source.

14. The copy production machine set forth in claim 13 wherein said receiving means is a semiautomatic document feed.

15. The copy production machine set forth in claim 1 further including means in said control means to select said second image source whenever no images are to be produced from said first image source whereby said copy production means is prepared to receive images from said second image source whenever no copies are being produced, and means in said control means to select said first image source.

16. The copy production machine set forth in claim 1 further including a plurality of electrical signal receiving means for receiving electrical signals, means in said first image source responsive to said received electrical signals to generate an image to be produced as a copy, and selection means logically interposed between said first image source and said plurality of electrical signal receiving means to select from any said electrical receiving means for supplying electrical signals to said first image source.

17. The copy production machine set forth in claim 1 further including error recovery means for restarting said copy production machine after a job error, and said control means responsive to said error recovery means for adjusting control of said copy production machine in accordance with last print copies when restarting said copy production machine to receive images from said first source after copy production from said second source has been completed.

18. The copy production machine set forth in claim 1 wherein one of said image sources receives electrical signals from one of a plurality of data signal sources, means in said one image source to convert said electrical signals to an optical image and means alternating said data signal sources whereby said one image source generates interleaved images from said data signal sources.

19. The copy production machine set forth in claim 1 wherein copy production from said image sources includes copy production in one of a plurality of copy producing modes respectively, and mode interrupt means in said control means responsive to said copy producing mode to select a copy production interruption point in accordance with a present copy producing mode.

20. The copy production machine set forth in claim 19 wherein one of said copy producing modes is a duplex mode, another mode is a simplex mode, means indicating a predetermined copy production state in said duplex mode, means indicating end of an image cycle, and said mode interrupt means responsive to said duplex mode to interrupt copy production at said predetermined copy production state and to said simplex mode to interrupt copy production at the end of any image cycle.

21. The copy production machine set forth in claim 20 further including interlock means preventing interruption of copy production until duplex copies of a given print set have been completed.

22. The copy production machine set forth in claim 20 further including an interim storage means for storing partially produced duplex copies, means indicating copies in said interim storage means, said interlocked means being responsive to said interim indication to inhibit interruption of print copy production.

23. The copy production machine set forth in claim 1 having a copy producing mode requiring plural passes of copies through said image processing portion to produce final images on a sheet of copy paper, means indicating said multi-pass producing mode, means indicating partially produced copies in said multi-pass producing mode, means in said control means inhibiting interruption of copy production until said partially produced indication is removed.

24. The copy production machine set forth in claim 1 having first and second output portions, respectively, for receiving copies produced from images supplied by said first and second image sources, said first image source including precollating means for generating precollated images whereby copies are produced in a collated sequence and said first output portion being capable of receiving such precollated copies.

25. The copy production machine set forth in claim 24 wherein said second output portion includes means for collating copies received from said image processing portion.

26. The copy production machine set forth in claim 25 wherein said second output portion includes a copy exit tray and control means in said copy production machine operative wherein said second image source is active to supply images to said image processing portion to select either said collator or said copy tray as an output portion.

27. The copy production machine set forth in claim 24 further including interim storage means in said image processing portion control means operative with said interim storage means for enabling duplex copying from images supplied by either of said image sources and means inhibiting mode changing when copies reside in said interim storage means.

28. The copy production machine set forth in claim 24 wherein said first image source includes an electronic signal processor for processing image-indicating signals and supplying same to an image generator which generates optical images in response to said received image-indicating signals and means in said electronic signal processor for precollating said image-indicating signals for supplying precollated images to said image processing portion from said image generator.

29. The copy production machine set forth in claim 1 further including a plurality of electrical signal receiving means, one of said electrical signal receiving means including a word processing input for receiving word processing memory media and including means for sensing said memory media for generating image indicating signals;

said first image source including an image generator for receiving said image indicating signals for generating an image, and a nonvolatile store in said copy production machine for storing said received word processing supplied image-indicating signals for facilitating precollation of said images by said image generator.

30. The copy production machine set forth in claim 29 including a random access, high speed memory operatively connected to said image generator and capable of containing at least enough signals to generate a single image, means for transferring signals from said nonvolatile store to said random access memory and means inhibiting interruption of image generation by said first image source until all signals from said random access memory indicating a given image to be copied have been supplied to said image generator at least once.

31. The copy production machine set forth in claim 29 wherein one of said signal receiving means is a local signal receiving station;

another of said signal receiving means being a remote terminal connector in said machine for connecting to a communication line for receiving image-indicating signals on a remote basis; and said copy production machine responding to said remote signals in the same manner as for said local signals.

32. The copy production machine set forth in claim 29 wherein said second image source includes a semiautomatic document feed and means operatively associated with said semiautomatic document feed to actuate said interrupt means.

33. The copy production machine set forth in claim 1 wherein said first image occurs is capable of supplying images at a substantially constant rate and said second image source supplies images at an intermittent rate and said interrupt means being responsive to said second image source to interrupt the constant supplying of images by said first image source.

34. The copy production machine set forth in claim 33 wherein said first image source is the prodominant copy production image supplying source and said second image source intermittently causes copy production.

35. The copy production machine set forth in claim 1 wherein said control means further includes a control computer having program means in said control computer for selecting parameters for copy production from said first image source and manually actuated means on said copy production machine operative to select parameters for images received from said second image source, all with respect to said copy production.

36. The copy producing machine set forth in claim 35 wherein said control computer senses said manually actuated means and selects said manually actuated parameters in the absence of computer designated parameters.

37. The copy production machine set forth in claim 1 including means for initializing the copy production machine during a power on sequence and said initializing means selecting a copy mode of production only for using said second image source, and means for requesting a print mode for using said first image source, and means responsive to a request for a print mode copy production to activate the print mode in said copy production machine in the absence of copies being produced.

38. The copy production machine set forth in claim 1, further including in combination:

a plurality of image signal receiving means;

means for transferring received image signals to said first image source;

image generating means in said first image source for generating images based upon said received image signals; and priority means in said control means for alternating receiving images for said first image source from one of said a plurality of image signal receiving means.

39. The copy production machine set forth in claim 38 wherein said signal receiving means generate an end of job group signal, and said priority means includes source switching means responsive to said end of job group indication from any of said signal receiving means for transferring image reception to another of said image signal receiving means.

40. The copy production machine set forth in claim 39 wherein one of said signal receiving means includes a word processing record media reader, a hopper in said reader, means for transferring media from said hopper to a reading station, thence to an output station, a hopper empty signal means, and said priority means responsive to said hopper empty signal means to transfer signal reception to another one of said image-indicating signal receiving means whereby a plurality of print jobs can be inserted into said word processing station while maintaining local control of said copy production machine until all jobs are finished from said one station.

41. The copy production machine set forth in claim 1 including a plurality of image signal receiving means;

means connecting one of said image signal receiving means to said first image source for supplying image-indicating signals thereto;

means in said one image signal receiving means for grouping a plurality of print jobs in succession to the exclusion of others of said signal receiving means whereby print copies produced from said one image signal receiving means supplied image-indicating signals are in one group; and means separating copies made from images from said image sources.

42. A combination word processing and copying machine, including in combination;

a copy production portion having an image input and being for imposing images on copoy sheets, a copy output portion having plural copy receiving units for receiving image-bearing copy sheets from said copy production portion;

page processing means for generating electrical signals indicative of an image to be copied;

image generator means responsive to said image-indicating signals to supply an image to said image input;

word processing means for exchanging word processing signals with said page processing means;

an optical image means for receiving original documents to be copied and for supplying images thereof to said image input;

image interrupt means operative to enable said optical image means to supply images to said image input to the exclusion of said image generator means even though said image-indicating signals have been received and including means to interrupt said page processing means to stop supplying said image-indicating signals only while said optical image means is to supply images to said image input; and means directing all copies bearing images from said optical image means and said image generator means to respective ones of said copy receiving units whereby copies are separated in accordance with sources of the copy borne images.

43. The combination word processing and copying machine set forth in claim 42, said optical image means including a semiautomatic document feed having preentry switch for sensing documents, copy production control means responsive to said preentry switch being actuated to actuate said copy production portion to produce a copy in the absence of copy production based upon images received from said image generator means, means inhibiting responsiveness of said copy production control means to said preentry switch;

a manually-actuated copy-mode selection switch for interrupting said word processing means and enabling said copy production control means to actuate said copy production portion in the middle of a word processing operation, and means for automatically restarting said word processing operation upon completion of the copying of documents in said semiautomatic document feed.

44. The combination word processing and copying machine set forth in claim 42 wherein said copy receiving units are respectively first and second units and exclusively for those copies bearing images based upon said word processing means generating the optical images via said optical image means for receiving copies bearing images received from said optical image means.

45. The combination word processing and copying machine set forth in claim 44 wherein said second unit includes means for collating copies received from said copy production portion and said word processing means includes means for precollating image-indicating signals prior to supplying same to said image generator means whereby collated copy sets are generated from said copy production portion irrespective of the source of images.

46. The combination word processing and copying machine set forth in claim 42 wherein said word processing means includes first and second image signal receiving means, one of said signal receiving means adapted to receive data processing generated signals, another of said image signal receiving means adapted to receive word processing generated signals, and means for connecting either of said signal receiving means to said page processing means for supplying image-indicating signals thereto.

47. The combination word processing and copying machine set forth in claim 42 wherein said machine has a programmable computer, a program memory for containing program signals, a memory for containing word processed signals, and wherein said page processing means and said word processing means are constituted by said computer in combination with program signals in said program memory and said image generator means including means for fetching signals from said word processed signal containing memory and program means in said computer for transferring all word processed signals to said word processed memory.

48. The combination word processing and copying machine set forth in claim 42 including manually actuable means for overriding said copy interrupt and means reactivating said page processing means irrespective of state of completion of copy production based on images from said optical image means.

49. The combination word processing and copying machine set forth in claim 42 wherein said copy production portion has means for duplex copy production, means indicating a clear state of duplex copy production, and means in said copy interrupt means to delay interruption of said page processing means until said clear state is indicated.

50. A copy production machine having a copy production portion with an image input to receive images to be copied and supplying imaged copy sheets as output;

the improvements being, in combination;

a first image source automatically supplying to the image input a set of images to be copied as a print job;

a second image source capable of supplying to the image input a set of images from serial set of original documents as a copy job;

means for dynamically interleaving a copy job and a print job irrespective of copy production job completion status and means for separating said output of said copy production portion into print job and copy job sections.

51. The copy production machine set forth in claim 50, further including in combination;

electronic memory means for storing image-indicating signals in groups of images;

a character generator responsive to the image-indicating signals supplied by said electronic memory to generate images to be printed;

control means for sequencing operations of said electronic memory means and said image generator for constituting said first image source whereby successive images are electronically supplied in automatic succession;

means in said control means indicating a predetermined image supplying signal state indicating at least an intervening point between a succession of two of said electronically supplied images, and means responsive to said indication for enabling said dynamic interleaving means to interleave copy production from said second image source between successive ones of said electronically supplied images.

52. The copy production machine set forth in claim 51, further including word processing signal receiving means for receiving word processing text signals including control signals and symbol indicating signals and coupled to said electronic memory means for supplying received signals thereto for use by said image generator for generating images whereby said copy production machine enables convenience copying interruption of an automatically controlled copy production machine wherein signals are receivable from outside said machine during automatic print job production.

53. The copy production machine set forth in claim 52, including means in said control means for electronically arranging said image-indicating signals for collating the output of said copy production machine into print sets, and said control means including means enabling convenience copy interruption of said electronically collating print job irrespective of print job completion by a convenience copy operation.

54. The copy production machine set forth in claim 53, further including in combination;

post collating means for collating imaged copies output from said copy production portion whereby said first image source enables collation of images prior to copy production, and said second image source enables collation of imaged copies after copy production including interleaved collation independent of collation of said first image source collation.

55. The copy production machine set forth in claim 50, further including in combination:

interim storage means in said copy production portion for storing partially completed copies, and means responsive to said interim storage means storing copies to inhibit said dynamic interleaving means.

56. The copy production machine set forth in claim 50 including means indicating produced copies are in said copy production portion, and means responsive to said indication to inhibit said dynamic interleaving means.

57. A device controlled by a computer means, said device having a common operating portion for producing end result items and having a common input, including, in combination:

first means for receiving control signals from said computer means for automatically supplying end item defining signals to said common input, second means independent from said computer means for receiving manually supplied means for supplying end item defining signals to said common input, control means responsive to said second means to interrupt said computer-supplied end item defining signals for enabling said common operating portion to produce end result items from said second means to the exclusion of said computer means, means for separating said end result items such that said computer means and second means actuated end result items are maintained independent and separated from each other after being produced by said common operating portion, and wherein said common operating portion is a copy printer, said second means is an original document feed and includes optional scanning means for scanning documents in said document feed for supplying said end item defining signals as optical signals for replication of an image on said original document such that said computer controlled device constitutes a computer output printer having convenience copying capabilities.

58. The computer controlled device set forth in claim 57 further including third means for receiving electrical image indicating signals as word processing signals, and said first means capable of receiving said word processing signals for automatically supplying said end item defining signals to said common input.

59. The computer controlled device set forth in claim 58 including manually actuable means for establishing supplying of images to said common operating portion from said second means to the exclusion of said first means whereby said first means supplies signals to said common input only if said second means is inactive, and means in said computer controlled device responsive to predetermined ones of said received control signals for automatically establishing said computer controlled device as being dedicated to receiving signals from said computer to the exclusion of said second means subject to interruption thereof.

60. The computer controlled device set forth in claim 59 wherein said second means includes a semiautomatic document feed for receiving manually carried documents, one at a time, and for supplying serial signals to said common input.

61. A copier-printer having a copy production portion for reproducing received images on copy sheets, plural image sources for supplying images to said portion, plural output means for receiving imaged copy sheets from said portion, said copy production portion having a copy mode wherein copy sheets are supplied to a first one of said output means with images received from a given one of said image sources, means indicating said copy mode is not actively producing copies, means operative in response to said indication to enable a print mode in said copy production portion wherein images are supplied by other than said given one image source to said portion such that said copy mode is a foreground mode capable of being instituted to the exclusion of said print mode and said print mode is a background mode capable of being instituted ony when said foreground mode is inactive and means in said portion for directing copies made during said print mode to a second one of said output means.

62. The copier-printer set forth in claim 61 further including in combination;

means indicating that one of said modes is active as a foreground operational state while another of said modes is in a background operational state, means forcing said print mode to said foreground operational state irrespective of copy production state, and means interrupting copy production in said print mode by said copy mode whereby said copy mode is active to produce copies in said foreground operational state in an interleaved manner with said print mode copy production.

63. The copier-printer set forth in claim 61 further including in combination:

an operator's control panel on said copier-printer normally used for inputting operator selected copy job parameters to said machine for operation during said copy job, a computer in said copier-printer for receiving operator control language signals for selecting operator parameters for use by said copier-printer during said print mode and said computer selecting said operator control panel selections in the absence of operator control language signals indicating a given parameter is selected.

64. The copier-printer set forth in claim 61 further including in combination:

a semiautomatic document feed for supplying images to said copy production portion in said copy mode, an operator's control panel for receiving operator selections via manually actuated switches and control means establishing said copy mode as said foreground mode in response to said operator control panel selections even though said print mode is active.

65. A copy production machine having an image processing portion for printing an image on paper to produce a copy, a first image source operatively connected to said portion, a second image source operatively connected to said portion, both said image sources capable of supplying an image at a common area of said portion whereby said portion can produce copies from either source, said first source including means for automatically supplying successive images for copy making by said portion, said second source having means for successively receiving images to be reproduced, interrupt means to indicate a copy is to be made by said second source, and control means responsive to said interrupt means indicating that a copy is to be made to interrupt said first source automatically supplying successive images whereby images supplied to said portion from said second source are dynamically interleaved with images from said first source and output means responsive to said control means to separate copies made from said image sources so that said sources operate independent of each other.

66. The copy machine claimed in claim 65 wherein one of said image sources includes means for automatically precollating images supplied and the other of said image sources includes no such precollation means, and said output means includes copy collation means for receiving and collating copies based on images supplied by said other image source.

67. The copy production machine claimed in claim 65 wherein said interrupt means includes manually actuable means indicating that a copy is desired to be made, manually actuable means operative after said first mentioned manually actuable means has been actuated to initiate operation of said copy production machine using said second source as an image source, third manually actuable means for overriding said first manually actuable means, and timeout means for overriding said first manually actuable means whenever said second mentioned manually actuable means is not actuated within a predetermined time after said first manually actuable means has been actuated.

68. The copy production machine claimed in claim 65 wherein said control means includes programmed computer means responsive to said interrupt means for timing operation of said first image source such that images are no longer supplied at a predetermined intermediate end one of said images and inhibiting operation of said second image source until all copies from said first image source have cleared the machine into said output means, and means in said programmed computer for restarting copy production from said first image source, and program means in said computer means for terminating said copy production from said second image source for enabling restarting copy production from said first image source.

69. The copy production machine set forth in claim 68 further including an interim storage unit in said image processing portion for storing partially completed imaged copy paper, means indicating copies in said interim storage unit, and means in said computer means for inhibiting changing image sources while copies reside in said interim storage unit.

70. The copy production machine set forth in claim 69 further including manually actuable means for overriding said inhibition signal from said interim storage unit.

71. A copy production machine adapted for mixed manually actuated and automatically actuated copy production, a copy production portion having an image receiving point, a paper supply, paper path means for transporting paper from said paper supply for receiving images from said image receiving point and outputting imaged paper from said copy production portion, a copy microprocessor control connected to said copy production portion for controlling same in accordance with a predetermined stored program of instructions, means for manually inserting images to be copied at said image receiving point, means for automatically inserting images to be copied at said image receiving point, and including means for receiving and storing a plurality of such images to be automatically inserted and having means to automatically select said images to be inserted, a system microprocessor control connected to said copy microprocessor control for actuating same to operate said copy production portion and to said automatic image inserting means for controlling same, all in accordance with given programs of instructions, an operator control panel having a plurality of manually actuable switches and indicators and being connected to said controls for receiving indicating signals and supplying operator control signals, one of said switches, when actuated, supplying a first control signal indicating manually inserted images are to be copied, a second of said switches, when actuated, supplying a second control signal indicating automatically inserted images are to be copied, means operatively connected to said first switch for supplying said first control signal to said system microprocessor control indicating interruption of operation of said automatic image insertion means, said system microprocessor control having a program of instructions arranged that when operated upon in response to said first control signal to enable interleaving image reception at said image receiving point of images from said manual image inserting means with images from said automatic image insertion means whereby said copy production machine operates as a printer when using images from said automatic image insertion means while maintaining convenience copying capabilities via said first control signal.

72. The copy production machine set forth in claim 71 further having an output portion for receiving imaged copies from said copy production portion respectively from each of said inserting means whereby operation of each said inserting means is independent of operation of each and every other inserting means.

73. The copy production machine set forth in claim 72 wherein said automatic inserting means includes electronic control means for precollating images such that each set of imaged paper constitutes a print set having one image of a document with plural different images constituting the document, and said manual inserting means supplying multiple copies of a single image as a copy set to said copy production portion whereby its corresponding output portion receives noncollated imaged copies.

74. The copy production machine set forth in claim 71 wherein said automatic image inserting means includes electronic control means and data handling means for manipulating image-indicating electrical signals, memory means for storing said image-indicating electrical signals and means for sequencing said image-indicating signals for supplying successive images, and a storage unit for storing said image-indicating signals for a plurality of images to be copied.

75. The copy production machine set forth in claim 74 further including in combination, a magnetic medium reader/recorder unit capable of receiving image signal bearing media for exchanging image-indicating signals therewith and means connecting said recorder to said memory for exchanging image-indicating signals therewith, said second switch when actuated selecting said recorder as a source of image-indicating signals for said automatic insertion means, and means in said electronic control means responsive to actuation of said second switch to deselect any selection made by said one switch.

76. The copy production machine set forth in claim 74 further including in combination, a remote terminal connector connected to said memory for exchanging image-indicating signals therewith and having a connection means for exchanging image-indicating signals with a communication system, and means in said electronic control means responsive to predetermined signals received from said remote terminal connector for establishing said automatic inserting means as an image source for said copy production portion.

77. The copy production machine set forth in claim 74 further including in combination, a plurality of electronic image-indicating signal receiving means, each of said electronic image-indicating signal receiving means being connected to said memory for exchanging image-indicating signals therewith, and control means operatively connected to said electronic signal receiving means for activating same one at a time for effectively providing communications between said memory and a given one of said electronic image signal receiving means.

78. The copy production machine set forth in claim 77 wherein a first of said electronic image signal receiving means is a magnetic media recorder unit capable of receiving image-indicating signal bearing magnetic media and having means for exchanging image-indicating signals therewith, and a second given one of said electronic image-indicating signal receiving means being a remote terminal connector for exchanging image-indicating signals between said memory and, a communication network.

79. The copy production machine set forth in claim 78 wherein said remote terminal connector is capable of receiving control signals from a communication network and said electronic control means being responsive to predetermined ones of said electronic control signals to dedicate said copy production machine to receiving image-indicating signals only from said remote terminal connector to the exclusion of said recorder.

80. The copy production machine set forth in claim 74 including electronic precollation means in said electronic control means for operation in said copy production machine when one of said image inserting means is active, and collation means for receiving imaged copies from said copy production portion for collating same.

81. The copy production machine set forth in claim 71 wherein, said one switch is a copy mode switch, a start button on said operator control panel for instituting operations of said copy production machine in said copy mode, a semiautomatic document feed means having a document sensing switch which when actuated actuates copy production in said copy mode, and a timer responsive to actuation of said one switch and nonactuation of said start button or said semiautomatic document feed sensing switch after a predetermined time to deselect said copy mode.

82. The copy production machine set forth in claim 81 wherein said second switch is a switch selecting said recorder and means responsive to actuation of said second switch to deselect said copy mode.

83. The copy production machine set forth in claim 81 wherein said document feed is a semiautomatic document feed and said sensing switch is a preentry sensing switch indicating that a document to be copied has been placed in a receiving tray at the entry of said semiautomatic document feed.

84. The method of operating a copy production machine having a copy production portion for producing copies of images and a plurality of image sources for supplying images to be copied by said copy production portion, the steps of:

selecting one of said image sources to supply images to said copy production portion, actuating said one image source to supply a succession of a predetermined number of images to said copy production portion, selecting a second one of said image sources to supply images to said copy production portion, interrupting said one image source supplying of images before said predetermined number of images have been supplied, and supplying images from said second one image source to said copy production portion during said interruption, and automatically restarting said supplying of images from said one image source from said point of interruption after said second one source has supplied images during said interruption and, a plurality of output portions for receiving copies from said copy production portion;

the method further including the steps of:

denominating one of said output portions for each of said image sources; and selecting such denominated output portion to receive copies when selecting the corresponding one of said image sources.

85. The method set forth in claim 84, further including the steps of:

receiving image-indicating signals;

manipulating said received image-indicating signals;

supplying a succession of image-indicating signals and generating images therefrom and supplying said images as images from said one image source;

supplying image-bearing original documents for images from said second one of said image sources; and scanning said image-bearing original documents for generating images from said second one image source.

86. The method set forth in claim 85 further including the steps of:

receiving in said second image source a manually carried image-bearing original document and interrupting said one image source after said second image source has received said manually carried image bearing original document.

87. The method set forth in claim 85 further including the steps of:

storing said received image-indicating signals in a memory and counting the images represented by said image-indicating signals as they are received; and generating images for said one image source based upon said stored image-indicating signals.

88. The method set forth in claim 87 further including a plurality of image-indicating supplying sources;

the steps of:

selecting one of said image-indicating supplying sources for supplying image-indicating signals to said memory;

alternating selection of said image-indicating supplying means; and directing all copies made from said image-indicating signals irrespective of image-indicating signal supplying source to said denominated one output portion for said one image source.

89. The method set forth in claim 89 further including the steps of:

producing duplexed copies from either of said image sources including producing partially completed duplex copies in a first step and completed duplex copies in a second step; and delaying said interruption until all of said partially produced duplex copies have been completed when producing copies from images supplied by said one image source.

90. The method set forth in claim 84 further including the steps of:

collating images of said one image source prior to copy production; and collating copies produced by images from said second image source after copy production.

91. The method of operating a copy production machine having a copy production portion, plural image sources connected to said copy production portion for supplying images to be copied to said portion, plural copy outputs for receiving image-bearing copies from said copy production portion, the steps of:

selecting one image source to supply first images to said copy production portion and one copy output to receive image-bearing copies based upon said first images supplied by said one image source, producing first image-bearing copies in said portion based upon said supplied first images, and before completing production of said first image-bearing copies, automatically interleaving copy production of image-bearing copies based upon second images supplied by a second image source and supplying said second image-bearing copies to a second one of said copy outputs whereby the interleaved copy production of said first and second image-bearing copies are independent.

92. The method set forth in claim 91 further including the steps of:

automatically successively supplying first images to said copy production portion, and manually supplying image-bearing original documents as said second images.

93. The method set forth in claim 92 further including the steps of:

receiving image-indicating signals from one of a plurality of image-indicating signal sources, manipulating said received image-indicating signals to produce an optical image as said first images.

94. The method set forth in claim 93 further including the step of altering said image-indicating signals whereby said first image relate to said received image-indicating signals and to locally selected image-indicating parameters.

95. The method set forth in claim 93 further including the steps of;

in a word processing station recording image-indicating signals, transferring said word processing recorded image-indicating signals to said one image source whereby said copy production portion produces images in accordance with said word processing station operation.

96. The method set forth in claim 95 further including the steps of:

receiving data processing signals from a data processing system, and interleaving said data processing received signals as image-indicating signals with signals received from said word processing station.

97. The method set forth in claim 91 further including the steps of:

producing copies in said copy production portion from said one image source as duplexed copies, and inhibiting said automatic interleaving of copy production from images supplied from said second image source until any partially completed duplexed copies have been completed.

98. The method set forth in claim 91 further including the steps of;

receiving image indicating signals for creating images by said one image source, storing said image-indicating signals in a memory, accessing said memory to supply successive sets of image-indicating signals as images to be supplied by said one image source, and interrupting said accessing for said automatic interleaving of copy production based upon images from said second image source.

99. The method set forth in claim 98 further including the steps of:

electronically collating said image-indicating signals whereby image bearing copies leaving said copy production portion based upon images supplied by said one image source are in a predetermined collated sequence, and successive images received from said second image source leave said copy production portion in other than said predetermined collated sequence.

100. The method of operating a word processing machine having a copy production portion, the steps of:

receiving and storing a plurality of image-indicating signals, each said signal representing one image to be produced, automatically successively supplying image-indicating signals to said copy production portion for making successive image bearing copies, indicating that image-bearing copies are to be made of an original document, interrupting copy production based on said image-indicating signals irrespective of copy production completion based upon said image-indicating signals to make copies from said original document, automatically separating copies produced from said original document from copies produced from said image-indicating signals, and automatically continue making copies from said image-indicating signals after copies have been made of said original document.

101. The method set forth in claim 100 further including the steps of;

receiving a manually inserted document to be copied, establishing predetermined interruption points in the automatic production copy based upon said image-indicating signals, and delaying scanning of said original document until at least one of said interruption points has been reached in copy production based upon said image-indicating signals.

102. The method set forth in claim 100 further including the steps of:

producing a first set of copies from said received image-indicating signals while receiving predetermined ones of said image-indicating signals, producing successive sets of copies based upon said received and stored image-indicating signals after all of said image-indicating signals have been received and stored, and interrupting copy production based upon said received image-indicating signals at first predetermined interruption points during said first set and at second predetermined interruption points during production of said successive sets.

103. The method set forth in claim 102 further including the steps of:

interrupting copy production of said first set at the end of any image-indicating signal, and interrupting copy production of successive sets only at the end of each said set.

104. The method set forth in claim 100 further including the steps of:

producing a first set of copies based upon said image-indicating signals while receiving said image-indicating signals, producing successive sets of copies based upon said stored image-indicating signals after reception of said image-indicating signals, producing copies from said received image-indicating signals on a single side of copies and interrupting such copy production at the end of any of said image-indicating signals in any of said sets, producing duplex copies from said received image-indicating signals, storing in said copy production portion partially completed duplexed copies, and interrupting production of copies from said received image-indicating signals when producing duplexed copies only when all of said partially completed copies have been completed and removed from said copy production portion.

105. The method set forth in claim 100 further including the steps of;

receiving image-indicating signals for automatically supplying same to said copy production portion, storing said received image-indicating signals for production of successive sets of copies based upon said received image-indicating signals, interrupting the reception of said image-indicating signals based upon the storage capacity for said image-indicating signals, and automatically producing all partial sets of copies based upon the received image-indicating signals, and reactivating reception of image-indicating signals upon completion of the production of all partial sets of copies to be made from image-indicating signals to be received whereby partial sets of image-bearing copies are produced from said image-indicating signals.

106. The method set forth in claim 105 further including the steps of;

counting said received image-indicating signals, producing a first set of copies based upon said received image-indicating signal upon reception and producing successive sets of copies based upon said received image-indicating signals based upon the received count generated during said production of said first set.

107. The method set forth in claim 105 further including the step of;

automatically printing a summary sheet of copy production upon completion of the last one of said successive sets being produced.

108. The method set forth in claim 100 further including establishing a quiescent state in said copy production portion, during said quiescent state establishing a copy producing selection mode, receiving a request to print copies from said image-indicating signals, changing said copy mode to a print mode for the production of said copies from said image-indicating signals, and upon interruption of copy production in said print mode reestablishing said copy mode during said interruption and upon completion of said print mode reestablishing said copy mode in said quiescent state.

109. The method set forth in claim 100 further including receiving image-indicating signals for said copy production, storing said image indicating signals for producing successive sets of copies based upon said received image-indicating signals, and establishing a receive mode in said copy production portion whereby said copy production portion is dedicated to copy production based upon received image-indicating signals subject to said interruption.

110. The method set forth in claim 100 further including the steps of;

activating a plurality of image-indicating signal sources, selecting one of said image-indicating signal sources for supplying successive image-indicating signals to said copy production portion, producing copies from a plurality of jobs from said one selected image-indicating signal source for grouping copies produced thereby, and upon completion of copy production of a group of said jobs selecting a second of said image-indicating signal sources for supplying a group of copy print job image-indicating signals.

111. The method of producing multiple copies and convenience copies in a copy production machine having a programmable controller for effecting program-initiated control for said copy production machine, the steps of;

programming said controller to establish production of multiple copies as a mode of copy production, selecting a convenience copy mode of copy production, and interrupting said multiple copy mode upon said selection irrespective of copy production activity therein.

112. A copy production machine having a copy production portion, an image input and a copy output including in combination:

an operator's control panel normally used for inputting operator selected copy job parameters to said machine for operation during said copy job, a computer in said machine for receiving operator control language signals for selecting operator parameters for use by said machine during copy production, and said computer being programmed to select said operator control panel parameters in the absence of received operator control language signals indicating a given parameter is selected.

113. A copy production machine having a plurality of image sources, a plurality of output portions, and a copy production portion to be shared by said image sources and said output portions, and control means for dynamically coupling said copy production portion to said image sources and to said copy output portions after completion of individual images but irrespective of lack of completion of all images being reproduced from any of said image sources whereby images being produced are dynamically interleaved from said image sources and copies produced based upon said images are dynamically directed to predetermined ones of said plurality of output portions.

114. The method of operating a copy production machine having an operator's control panel for selecting first copy production parameters, a means for receiving word processing indicating signals including signals indicating second copy production parameters, a store for storing third copy production parameters, said operator's control panel and said store having machine selected copy production parameters, some parameters being in all said first, second and third parameters, the steps of:

setting said machine for copy production based upon said received second copy production parameters to the exclusion of any conflicting first or third copy production parameters selected at said operator's control panel or stored in said store, and for copy production parameters normally received as said first copy production parameters and not received, setting up said machine in accordance with a respective one of said machine selected copy production parameters.

115. The method set forth in claim 114 further selecting said machine selected parameters, as follows, for said first copy production parameters not received, setting up said machine in accordance with first copy production parameter selections, and with no selections in said first or second copy production parameters for each given copy production parameter to be selected, setting up said machine in accordance with said third copy production parameters stored in said store.

116. A copy production machine comprising, in combination:

a first plurality of input means for supplying images of which copies are to be made, copying means for producing copies of said images;

a plurality of output means for receiving copies from said said copying means, and control means for actuating said copying means to produce copies from particular ones of said first plurality of input means and to deliver copies produced therefrom to predetermined corresponding ones of said plurality of output means according to which one of said first plurality of input means supplied an image for the produced copies.

117. The machine claimed in claim 116 further comprising:

a second plurality of input means comprising a subset of said first plurality of input means for supplying images of which copies are to be made; and means in said control means for delivering copies made from images supplied by said second plurality of input means to a certain one of said plurality of output means.

118. The machine claimed in claim 117 further comprising:

means included in said second plurality of input means for supplying image-indicating signals; and signal processing means in said copying means for receiving said image-indicating signals to convert same to an optical image for making copies.

119. The machine claimed in claim 118 further comprising:

means included in said second plurality of input means for supplying signals representative of text; and text processing means included in said signal processing means for text processing said signals representative of text to generate said optical image as text messages.

120. The method claimed in claim 119 further including means in said control means operative with said first plurality of input means and said signal processing means for dynamically interleaving images supplied to said copying means between said text processing type images and others of said images.

121. The machine claimed in claim 119 further including priority means operative with said second plurality of input means for selecting a source of input images to be supplied to said copying means from among said second plurality of input means.

122. The machine claimed in claim 121 wherein said second plurality of input means includes means for grouping images from each input means of said second plurality to be supplied to said copying means.

123. The machine claimed in claim 122 including means manually operable for supplying a select signal and means responsive to said select signal for interrupting said grouping means to select one of said second plurality of input means to supply images to said copying means to the exclusion of the remaining input means of said second plurality of input means.

124. The machine claimed in claim 123 wherein said selected one of the second plurality of input means is physically located proximate to said copying means and the remaining input means of said second plurality of input means are physically located remote to said copying means.

125. The copy production machine claimed in claim 116 wherein each of said plurality of output means receives copies of images supplied from one of said first plurality of input means and one of said first plurality of input means supplies images for copies to be selectively sent to more than one of said plurality of output means.

126. An image reproducing machine having a copy production portion with an image input area and a produced copy output, means for receiving produced copies from said copy output, the improvement including in combination, text input means for receiving text-indicating signals, a data store, a programmable computer connected to said text input means and said data store for processing and storing said received text-indicating signals, said copy production portion being connected to said programmable computer for being controlled thereby, original input optics having an electronic image supply connected to said programmable computer and said data store for receiving said text-indicating signals and control signals to create an optical image and supplying said created optical image to said image input area for copy production, an optical image supply in said original input optics to supply an optical image to said image input area, and output control means in said produced copy receiving means indicating which of said image supplies supplied images for said produced copies, respectively.

127. The image reproducing machine set forth in claim 126 wherein said produced copy output means has an alterable copy sheet path whereby produced copies travel differently in accordance with said alteration, and said output control means operative to alter said copy sheet path in accordance with which of said supplies supplied images for said respective produced copies to thereby indicate the appropriate image supply.

128. The image reproducing machine set forth in claim 127 wherein said text input means includes a plurality of text signal reception means and said programmable computer being connected to each said text signal receptor means for controlling same whereby copies produced from said text signal reception means are interleaved in a predetermined manner.

129. The image reproducing machine set forth in claim 127 wherein said programmable computer has a first portion for text processing and overall system control and a second portion for operating said copy production portion and said produced copy receiving means.

130. The image reproducing machine set forth in claim 127 wherein said text input means has a first input portion for receiving word processing text-indicating signals and a second input portion for receiving data processing input signals, and means in said machine to select said one of said input portions to the exclusion of another of said input portions.

131. A copy production machine having a copy production portion with a common image receiving area, an output portion for receiving produced copies from said copy production portion, the improvement comprising, an optical image source for supplying images to-be-copied to said common image receiving area, an electronic optical image generating source for supplying optical images to-be-copied to said common image receiving area, a plurality of signal sources for supplying image-indicating signals to said electronic image source for optical image generation, automatic means to select which of said signal sources are to supply image-indicating signals to said electronic image source, and operator control means including means for deselecting any of said automatic selections and manually reselecting another of said sources for copy production.

132. The copy production machine set forth in claim 131 further including means enabling automatic reselection of said automatic selection upon completion of copy production based upon said manual selection.

133. The copy production machine set forth in claim 131 wherein said automatic means includes means to sense said operator control means to mix automatic and operator control selections for copy production.

134. The copy production machine set forth in claim 133 including a nonvolatile store in said automatic means for storing predetermined copy production parameters and said automatic means selecting ones of said predetermined copy production parameters for copy production.

135. The copy production machine set forth in claim 131 wherein said operator control means includes first means to manually select said optical image source to the exclusion of said electronic image source and second means to manually select one of said signal sources to the exclusion of others of said signal sources for overriding any automatic selections.

136. The copy production machine set forth in claim 135 wherein said first means only interrupts operation of said electronic image source, and memory means operatively associated with said electronic image source for storing image-indicating signals and capable of receiving additional image-indicating signals during said first means interruption.

137. A copy production machine having a copy production portion, an image input portion for supplying images to said copy production portion to produce copies thereof, a copy output portion for receiving produced copies, the improvement including in combination, a control for interleaving a given plurality of independent copy producing operations having:

a given plurality of copy select registers for indicating a number of copies to be produced in respective ones of said independent copy producing operations, a given plurality of copy count registers for respectively keeping a tally of copies produced in individual ones of said independent copy producing operations, respectively, means identifying which of said independent copy producing operations is active so that said copy production portion is currently producing copies, control means responsive to said identifying means to control copy production and connected to said given plurality of copy select registers and to said given plurality of copy count registers for comparing contents of respective ones thereof as each copy is produced in each such identified independent copy producing operation and means indicating completion of such independent copy producing operation when said contents of said respective copy select register and said copy count register compare, and selection means coupled to said identifying means to select which one of said independent copy producing operations is to produce copies.

138. The copy production machine set forth in claim 137 wherein said selection means is operative during all phases of copy production of any said independent copy producing operations, intermediate means indicating copy production status including indicating a given intermediate status of a current copy producing run, and means in said selection means responsive to said intermediate means to delay said interruption as long as said intermediate means indicates said given intermediate status.

139. The copy production machine set forth in claim 138 having duplex control means for indicating duplex copy production as a copy production parameter, interim storage means for temporarily retaining single-imaged duplex copies during a duplex copy production operation, interim indicating means indicating copies in said interim storage means, and means in said intermediate means responsive to said interim indicating means to indicate said given intermediate status as long as copies are indicated in interim storage means.

140. The copy production machine set forth in claim 137 further including an operator's control panel, a convenience copy selection switch in said operator's control panel connected to said selection means for actuating same to select a convenience copy mode in said machine, and another selection switch on said operator's control panel connected to said selection means to actuate same to select a copy producing operation other than said convenience copy mode.

141. The copy production machine set forth in claim 140 further including:

a timeout timer responsive to said completion indication to time out a predetermined time period, and said timeout timer being connected to said selection means for actuating said selection means to select a predetermined one of said independent copy production operations as a next operation to be performed.

142. The copy production machine set forth in claim 137 further including:

electronic image-receiving means in said image input portion for receiving electrical image-indicating signals and associated control signals, optical image generating means in said image input means responsive to said image-indicating signals to generate optical images for copy production, and said selection means connected to said image input portion for being responsive to said associated control signals with respect to selection of said independent copy producing operations.

143. The copy production machine set forth in claim 142 further including a memory in said image input means for receiving and storing said image-indicating signals, cycling means in said control means for cyclically transferring said stored image-indicating signals to said optical image generating means to produce collated sets of images, job control means connected to said cycling means to enable a plurality of collated sets to be produced.

144. The copy production machine set forth in claim 143 wherein said job control means receives predetermined ones of said associated control signals to select a number of collated sets to be produced, and other means connected to one of said copy select registers to indicate a number of images to be produced for each of said collated sets.

145. The copy production machine set forth in claim 144 wherein said other means includes means connected to said electronic image receiving means for counting a number of images represented by said received image-indicating signals and supplying said count to said one copy select register whereby the number of images in each set need not be indicated by said associated control signals.

146. The method of operating a copy production machine, the steps of:
- electronically simultaneously memorizing a plurality of copy selections respectively for a plurality of independent copy producing operations,
- sequentially selecting ones of said plurality of independent copy producing operations as a current copy producing operation,
- electronically tallying and comparing copy production of said current copy producing operation adjacent a one of said electronically memorized copy selections for indicating a comparison therebetween as a completion of such independent copy producing operation,
- electronically memorizing all of said tallies, and
- erasing said one electronically memorized copy selection and said electronically memorized tally associated therewith after said completion for enabling a subsequent selection.

147. The method set forth in claim 146 further including the steps of:
- electronically memorizing a number of collated sets to be produced in one of said independent copy producing operations, each set having a number of images indicated by a corresponding one of said electronically memorized copy selection,
- tallying and electronically memorizing a number of collated sets produced, and
- delaying erasing a respective one of said electronically memorized copy selections until said tallied number of sets equals said memorized number of sets and then also erasing said selected number of sets and said tallied number of sets.

148. The method of operating a copy production machine,
the steps of:
- initiating copy production of multiple copies in a given copy producing run,
- selectively interleaving copy production of copies not associated with said given copy producing run during such run, and
- electronically memorizing copy producing parameters for an intermediate copy production status at time of interleaving of said given copy producing run for enabling continuing said given copy producing run irrespective of said interleaving.

149. The method set forth in claim 148 further including the steps of:
- manually indicating a desired copy production to be interleaved,
- electronically memorizing said manual indication,
- indicating copy production status of said given copy producing run including predetermined interleaving status, and
- delaying said interleaving until said interleaving status and then automatically and selectively interleaving said desired copy production with said given copy producing run.

150. The method set forth in claim 149, further including the steps of:
- during copy producing being interleaved, manually indicating another desired copy production, and
- automatically substituting said desired copy production for said interleaved copy production and said initiated copy production.

151. The method of operating a copy production machine,
the steps of:
- initiating a first copy production run to make a first predetermined number of copies greater than one in a first copy production run,
- memorizing said first predetermined number in a first electronic register,
- keeping tally of copies produced in said first copy production run in a second electronic register,
- interrupting said first copy production run with a second copy production run, maintaining said memorized first predetermined number and memorizing said tally at time of said interrupting in a given electronic register during said interruption,
- producing a second predetermined number of copies in said second copy production run,
- indicating approval to restart said first predetermined copy production run, and
- automatically restarting said first copy production run based upon said memorized first predetermined number and said memorized tally.

152. The method of claim 151 further dynamically interleaving copy production of said second copy production run with copy production of said first copy production run until one of said first or second copy production runs is completed.

153. The method set forth in claim 151 further including the step of clearing a production portion of said machine of all copies in an intermediate state of copy production before enabling said second copy production run to ensue.

154. The method set forth in claim 151 further including the steps of:
- in said first copy producing run producing one copy each of a plurality of images, and
- in said second copy producing run producing one or more copies of a single image.

155. The method set forth in claim 154 further including:
- during said interruption producing copies in a series of copy producing runs, and
- each run having but a single image to be copied.

156. The method set forth in claim 155 further including the steps of:
- supplying images to be copied for said first copy production run for a first image source, and
- supplying each image for said second copy producing run from a second image source.

157. The method set forth in claim 156 further including the steps of:
- automatically supplying images from said first image source in a predetermined sequence of images, and
- manually supplying each image in an original document via said second image source.

158. The method set forth in claim 157 further including the steps of:
- repeatedly manually supplying said images for effecting a series of said second copy producing runs, and
- limiting the time duration between said second copy producing runs and if said limited time is exceeded automatically resuming said first copy producing run.

159. The method set forth in claim 157 further including the steps of:

in said first image source;

receiving electrical image-indicating signals representing a sequence of images to be copied, automatically generating a sequence of optical images based upon said received image-indicating signals for producing a first set, and when producing subsequent ones of said collated sets altering the sequence of images presented in said subsequent sets from the received sequence order.

160. The method of operating a copy production machine, the steps of:

automatically producing multiple image-bearing copies in a given copy producing run, manually indicating that a certain number of image-bearing convenience copies are to be made of a given image other than in said given copy producing run, interrupting copy production of said given copy producing run to make said certain number of image-bearing copies, electronically memorizing copy producing parameters and copy production status at said interruption of said given copy producing run, and continue making copies in said interrupted given copy producing run after said certain number of copies has been made of said given image.

161. Apographic apparatus including copiers, duplicators, or printers having controller means for executing production runs, means for interrupting the operation of said controller means while executing a present production run to cause a higher priority production run to be executed, upon the completion of which the execution of the interrupted present production run is resumed, comprising, in combination:

means for supplying an interrupt signal when a higher priority production run is to be executed;

means responsive to said interrupt signal for causing said controller to suspend the execution of said present production run and to execute said higher priority production run; and means responsive to the completion of said higher priority production run for causing said controller means to resume execution of suspended said present production run.

162. The invention as claimed in claim 161 further including means for receiving production run parameters and means for coupling said means for receiving to said controller means.

163. In a copier/duplicator apparatus for producing production runs having predetermined copies of documents, priority interrupt apparatus for interrupting a first lower priority production run and producing a second higher priority production run and thereafter completing the first production run comprising:

(a) memory means for receiving and storing first and second individual production run signals indicating the number of copies of first and second documents to be made respectively;

(b) switch means effective when actuated for producing a first production run interrupt signal indicating that a second production run has a higher priority than said first production run;

(c) means responsive to said interrupt signal for stopping said first production run and for storing in said memory means production run completion signals which are a function of the remaining number of copies of said first production run which have to be made;

(d) means responsive to said second production run signals for causing said copier/duplicator to complete said second production run; and (e) means conditioned after said second production run has been completed to be responsive to said completion signals for causing said copier/duplicator to complete the remaining copies of said first production run.

164. In copier/duplicator apparatus for producing production runs having predetermined copies of documents, priority interrupt apparatus for interrupting a first lower priority production run and producing a second higher priority production run and thereafter completing the first production run comprising:

(a) memory means for receiving and storing first and second individual production run signals indicating the number of copies of first and second documents to be made respectively;

(b) switch means effective when actuated for producing a first production run interrupt signal indicating that a second production run has a higher priority than said first production run;

(c) means responsive to said interrupt signal for stopping said first production run;

(d) means responsive to said second production run signals for causing said copier/duplicator to complete said second production run; and (e) means conditioned after said second production run has been completed for causing said copier/duplicator to complete the remaining copies of said first production run.

165. An image forming apparatus comprising:

processing means for forming an image on a recording medium, numeral keys for presetting the number of repetitions of image forming operations to be made, interruption copy means for interrupting a first repeating image forming operation, for holding a number in accordance with the remaining number of repetitions preset by said numeral keys and for enabling the carrying out of a second image forming operation without cancelling said number, and timer means for clearing a condition of the second image forming operation enabled by said interruption copy means when said apparatus is left unused for a predetermined time before said second image forming operation is started during an interruption of said first repeating image forming operation by said interruption copy means.

* * * * *